United States Patent
Koti et al.

(10) Patent No.: US 11,909,078 B2
(45) Date of Patent: Feb. 20, 2024

(54) SYSTEMS AND METHODS TO UTILIZE WATER OUTPUT OF FUEL CELL SYSTEMS FOR EVAPORATIVE COOLING OF RADIATORS

(71) Applicant: CUMMINS INC., Columbus, IN (US)

(72) Inventors: Archit Koti, Sunnyvale, CA (US); Rohit Saha, Columbus, IN (US); Sumit Tripathi, Columbus, IN (US); Christopher Nelson, Columbus, IN (US); Agneya Turlapati, Columbus, IN (US); Jairo A. Martinez Garcia, Albany, CA (US); Sachin Vinayak Damle, Maharashtra (IN); Suhas Deutkar, Maharashtra (IN); Pradheepram Ottikkutti, Pune (IN); Sunil Suryakant Bahulikar, Pune (IN); Sandesh Sadawarte, Maharashtra (IN)

(73) Assignee: CUMMINS INC., Columbus, IN (US)

( * ) Notice: Subject to any disclaimer, the term of this patent is extended or adjusted under 35 U.S.C. 154(b) by 75 days.

(21) Appl. No.: 17/591,532

(22) Filed: Feb. 2, 2022

(65) Prior Publication Data
US 2022/0293972 A1 Sep. 15, 2022

Related U.S. Application Data

(60) Provisional application No. 63/161,223, filed on Mar. 15, 2021.

(30) Foreign Application Priority Data

Jan. 12, 2022 (IN) .............................. 202244001790

(51) Int. Cl.
*H01M 8/04* (2016.01)
*H01M 8/04029* (2016.01)
*H01M 8/04007* (2016.01)

(52) U.S. Cl.
CPC ... *H01M 8/04029* (2013.01); *H01M 8/04059* (2013.01); *H01M 8/04067* (2013.01); *H01M 2250/20* (2013.01)

(58) Field of Classification Search
CPC ......... H01M 8/04029; H01M 8/04059; H01M 8/04067; H01M 2250/20
USPC .......................................................... 429/434
See application file for complete search history.

(56) References Cited

U.S. PATENT DOCUMENTS

| | | |
|---|---|---|
| 6,852,435 B2 | 2/2005 | Vuk |
| 8,216,736 B2 | 7/2012 | Kwon |
| 2003/0177771 A1 | 9/2003 | Maisotsenko |
| 2008/0302505 A1* | 12/2008 | Kato ................... F28D 15/0266 165/61 |
| 2011/0003224 A1 | 1/2011 | Scheibert |
| 2017/0263955 A1* | 9/2017 | Kwon ............... H01M 8/04067 |
| 2018/0166711 A1* | 6/2018 | Kwon ............... H01M 8/04029 |
| 2019/0270419 A1 | 9/2019 | Martin |
| 2022/0055762 A1* | 2/2022 | Clarke .................. B64D 27/24 |
| 2022/0158203 A1* | 5/2022 | Pratap ............... H01M 8/04022 |

FOREIGN PATENT DOCUMENTS

JP 5248176 7/2013

* cited by examiner

*Primary Examiner* — James M Erwin
(74) *Attorney, Agent, or Firm* — Barnes & Thornburg LLP

(57) ABSTRACT

The present disclosure generally relates to systems and methods of using water output from a fuel cell system to aid in heat dissipation and evaporative cooling of radiators.

19 Claims, 25 Drawing Sheets

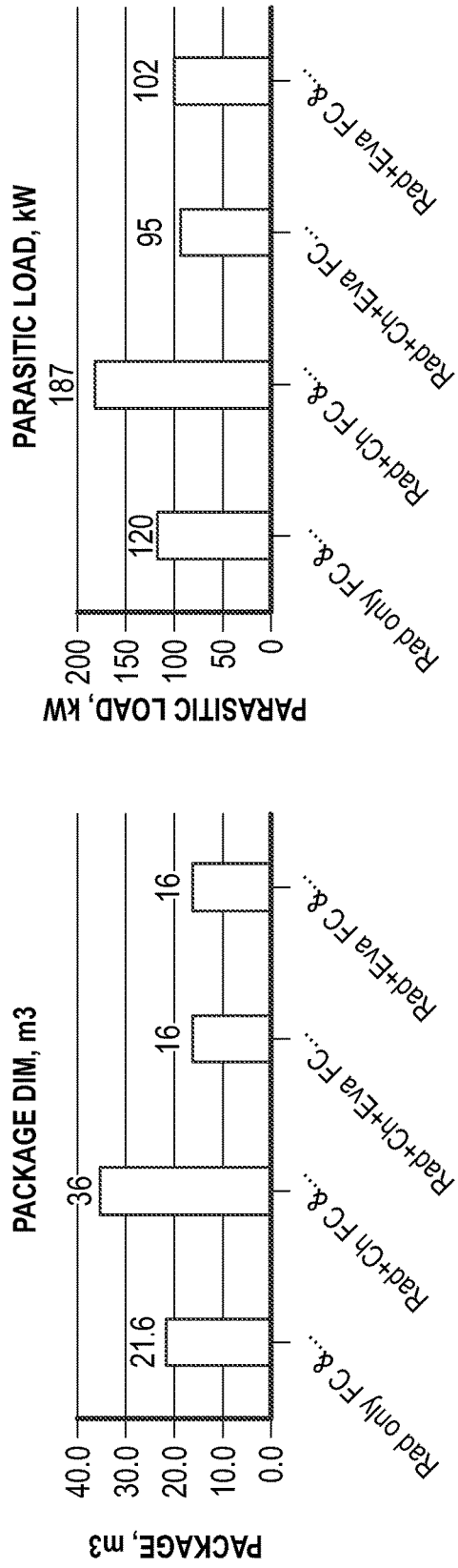
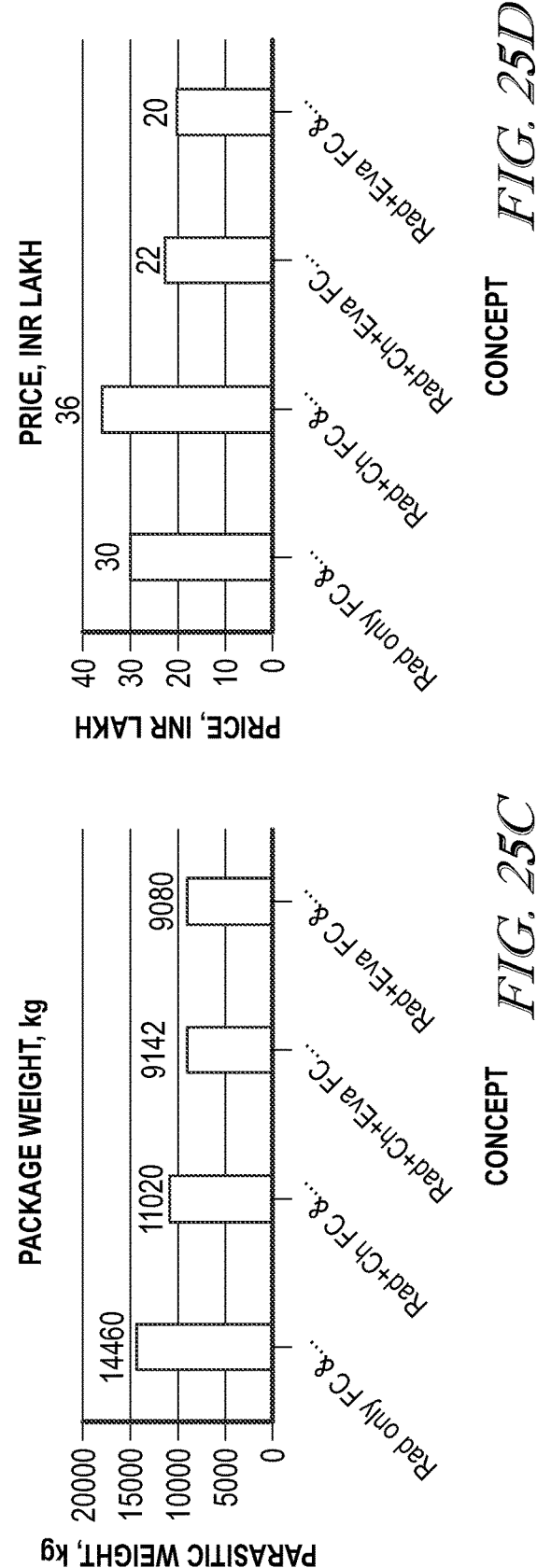
FIG. 25A  FIG. 25B  FIG. 25C  FIG. 25D

SYSTEMS AND METHODS TO UTILIZE WATER OUTPUT OF FUEL CELL SYSTEMS FOR EVAPORATIVE COOLING OF RADIATORS

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/161,223 filed on Mar. 15, 2021 and Indian Nonprovisional Application No. 202244001790 filed on Jan. 12, 2022, the entire disclosures of all of which are hereby expressly incorporated herein by reference.

TECHNICAL FIELD

The present disclosure generally relates to systems and methods of using water output from a fuel cell system to aid in heat dissipation and evaporative cooling of radiators.

BACKGROUND

Fuel cell systems are known for their efficient use of fuel to develop direct current (DC) and/or alternating current (AC) electric power. Certain fuel cells, such as solid oxide fuel cells (SOFCs), operate in large-scale power systems that provide electricity to satisfy industrial and municipal needs. Others are useful for smaller portable applications, such as powering cars, trucks, or other industrial equipment and vehicles. Other common types of fuel cells include phosphoric acid fuel cells (PAFCs), molten carbonate fuel cells (MCFCs), and proton exchange membrane fuel cells (PEMFCs), all generally named after their electrolytes.

A fuel cell produces electricity by electrochemically combining a fuel and an oxidant across an ionic conducting layer. Fuel cells are typically amassed in electrical series in an assembly of fuel cells to produce power at useful voltages or currents. Therefore, interconnected structures are used to connect or couple adjacent fuel cells in series or parallel to form a fuel cell stack or a fuel cell system.

Fuel cell systems reject heat and require active liquid cooling on a regular basis. Piping components, such as pipes, valves, and joint connectors, are coupled to the fuel cell to channel fluids, such as the fuel, oxidant, coolant, and byproducts into and away from the fuel cell. The temperature of the coolant entering the fuel cell system is maintained within a certain range.

When a system is supplied power by an internal combustion engine, heat from the system may be controlled and/or dissipated through at least two paths: (1) a radiator in thermal communication with the engine, and (2) through the emission of heated exhaust products via various components, such as catalytic converter(s), tailpipes and the like. Unlike engines that have robust exhaust systems, the heat from a system that is supplied power by a fuel cell system is rejected primarily through a radiator. In most cases, the heat rejected by a fuel cell system is rejected through a coolant.

While fuel cell systems generally operate at a lower coolant temperature such as at about 55° C. to about 90° C. compared to engines, the radiators used in fuel cell systems are usually attempting to dissipate the heat generated by the fuel cell at that lower coolant temperature to the ambient temperature. Under normal circumstances, the coolant temperature of a fuel cell system is maintained around about 55° C. to about 90° C. The difference in the temperature of the coolant compared to that of the ambient temperature is relatively small. Thus, in most cases, large radiators are required for heat dissipation in a system powered by a fuel cell system.

Water is a by-product of most fuel cell systems. Usually, water is output along with the exhaust from a fuel cell system, drained, and discarded from the system. Thus, there is a need to determine a better means of enabling heat dissipation in fuel cell systems. In addition, there is also a need for a better means of disposing of water that is output from fuel cell systems during the course of use.

By effectively using the water that is output by the fuel cell system to cool the heated portions of the system, such as the radiators, it may be possible to further dissipate heat by evaporation (i.e., evaporative cooling). Use of evaporative cooling can result in improved fuel cell systems, better vehicle and fuel cell system operating efficiency, and the reduced size of a radiator. Depending on operating conditions, the size of a radiator can be reduced by up to about 40%. For example, the reduction of the radiator size may range from about 2% to about 40%, including any percentage comprised therein. In some embodiments, the reduction of the radiator size may range from about 5% to about 40%, from about 10% to about 35%, from about 15% to about 30%, from about 20% to about 25%, from about 10% to about 40%, from about 15% to about 40%, from about 20% to about 40%, from about 25% to about 40%, from about 30% to about 40%, and from about 35% to about 40%.

Described herein is a method and system (e.g., a vehicle, powertrain system, or a stationary system) that utilizes the water output by a fuel cell system to create an evaporative cooling effect on the radiator of the system powered by one or more of the fuel cell systems. The present disclosure relates to a method or system that may reduce the radiator size required by a fuel cell application as less air flow will be required to achieve heat rejection. The methods or systems of the present disclosure may also reduce the power drawn from the radiator fans and is especially effective in hot and/or dry ambient temperatures and conditions when rejection of heat from a fuel cell system through a radiator is particularly difficult. For these and other reasons, the present specification provides a method and system for using the water output from a fuel cell system for the purpose of heat dissipation by evaporative cooling of radiators.

SUMMARY

Embodiments of the present invention are included to meet these and other needs. In one aspect, a method of dissipating heat in a system comprises passing a coolant used in a fuel cell system through a radiator, and using the water produced by the fuel cell system to create an evaporative cooling effect on the radiator through which the coolant is passed. If the coolant bypasses the radiator, the water is drained and is not used to create an evaporative cooling effect on the radiator.

In some embodiments of the present method, the evaporative cooling effect is a direct evaporative cooling effect such that no additional heat exchanger is used. In other embodiments of the present method, the evaporative cooling effect is a passive direct evaporative cooling effect such that little to no energy consumption occurs during the evaporative cooling process. In further embodiments of the present method, the evaporative cooling effect is an indirect evaporative cooling effect such that a secondary heat exchanger may be used.

In some embodiments of the present method, the evaporative cooling effect is a direct evaporative cooling effect comprising a wetted membrane. In other embodiments of the present method, the evaporative cooling effect is a direct evaporative cooling effect created by a mister or a nozzle.

In some embodiments of the present method, the water produced by the fuel cell system is collected in a sump/tank before creating the evaporative cooling effect on the radiator through which the coolant is passed. In some embodiments of the present method, the water produced by the fuel cell system is collected in a sump/tank based on input from a look ahead estimator. In other embodiments of the present method, water produced by the fuel cell system that is collected in a sump/tank is passed through a pump before creating the evaporative cooling effect on the radiator through which the coolant is passed.

In some embodiments, the present method further comprises passing the water that is collected in a sump through a heat exchanger. The coolant is passed through the heat exchanger before being passed through the radiator.

In other embodiments of the present method, the method further comprises passing the water that is collected in a sump through a heat exchanger before being passed through the radiator. The coolant is also passed through the heat exchanger before being passed through the radiator.

In some embodiments, the method further comprises passing the water collected in the sump to the radiator either directly or after passing through a heat exchanger. The coolant is passed through the heat exchanger before being passed through the radiator. In some embodiments, the present method further comprises using a controller.

The controller can determine in real time when it is useful to create an evaporative cooling effect. In some embodiments, the controller communicates with actuators. Actuators may be located at the pump for water sump, at an overflow valve on the sump, or at the radiator fan in the fuel cell system. In some embodiments, the controller has input or communication from one or more sensors providing information about coolant temperature, radiator fan speed, fuel cell power, fuel cell coolant temperature target, sump water level, sump pump speed, vehicle speed, or other parameters.

In some embodiments, the controller comprises a look ahead estimator, a fuel cell water estimator, and an evaporative cooling benefit calculator. In some embodiments, the fuel cell liquid water estimator gets input or communication from the look ahead power estimator. In some embodiments, the evaporative cooling benefit calculator gets input or communication from the fuel cell liquid water estimator. In some embodiments, the evaporative cooling benefit calculator provides input or communication to a valve or pump controller that is connected to the water produced by the fuel cell system. In some embodiments, the evaporative cooling benefit calculator provides input or communication to a radiator fan controller.

In some embodiments, the method further comprises determining an ambient temperature. If the ambient temperature is below freezing, the water produced by the fuel cell system is not used for evaporative cooling of the radiator. In other embodiments, if the ambient temperature is conducive to the formation of ice, the water produced by the fuel cell system is not used for evaporative cooling of the radiator.

In some embodiments, the method further comprises determining a magnitude of the evaporative cooling effect on the radiator by a system controller or a thermal management controller. The magnitude of the evaporative cooling effect is determined based on an ambient temperature, humidity, temperature of the water, and temperature of the coolant.

In some embodiments, a method of cooling a system comprises passing coolant used in a fuel cell system through a radiator, and using the water produced by the fuel cell system to create an evaporative cooling effect of the radiator through which the coolant is passed. The system of the present method has at least one pump or at least one radiator fan. If the coolant bypasses the radiator, the water is drained and not used to create an evaporative cooling effect of the radiator.

In some embodiments, the present method further comprises determining a parasitic load of the at least one pump or the at least one radiator fan on the evaporative cooling effect of the radiator by a system controller or a thermal management controller. In some embodiments, the method further comprises optimizing usage of the at least one pump or the at least one radiator fan, as compared to the evaporative cooling effect on the radiator, by a system controller or a thermal management controller. The method further comprises determining an amount of water needed for the evaporative cooling effect on the radiator.

In another aspect, a system comprises a fuel cell system, a coolant, water output from the fuel cell system, and a radiator. The water output from the fuel cell system is used to dissipate heat from the radiator through which the coolant passed by evaporative cooling.

In some embodiments, a system comprises a fuel cell system, a coolant, water output from the fuel cell system, and a radiator. The water output is used to dissipate heat from the radiator through which the coolant is passed by evaporative cooling and the water output is passed through a wetted membrane next to the radiator. In some embodiments, the water output is channeled through a nozzle or a mister near or comprised by the radiator. In some embodiments, the water output is simultaneously passed through a wetted membrane next to the radiator and channeled through a nozzle or a mister next to the radiator.

In some embodiments, a system comprises a fuel cell system, a coolant, water output from the fuel cell system, and a radiator. The water output is used to dissipate heat from the radiator through which the coolant is passed by evaporative cooling and the water output used for evaporative cooling is collected in a sump. In some embodiments, the water output collected in a sump is passed through a pump before being passed through the radiator.

In some embodiments of the present system, the water output collected in a sump is passed through a heat exchanger and to the pump. The coolant is passed through the heat exchanger before being passed through the radiator.

In some embodiments, a system comprises a fuel cell system, a coolant, water output from the fuel cell system, a radiator, and a heat exchanger. The water output is passed through a heat exchanger before being passed through the radiator, wherein the coolant is passed through the heat exchanger before being passed through the radiator. In other embodiments of the present system, the water output is passed through the heat exchanger at the same time as it is passed through the radiator, wherein the coolant is passed through the heat exchanger before being passed through the radiator.

In some embodiments, a system comprises a fuel cell system, a coolant, water output from the fuel cell system, a radiator, and at least a pump or a radiator fan. In other embodiments, a system comprises a fuel cell system, a coolant, water output from the fuel cell system, a radiator, and a system controller or a thermal management controller for determining in real time when it is useful to create an evaporative cooling effect.

BRIEF DESCRIPTION OF THE DRAWINGS

FIG. 25A is a graph demonstrating a comparison of package size or dimensions (dim) required by different cooling combinations described in FIG. 24A.

FIG. 25B is a graph demonstrating a comparison of parasitic load required by different cooling combinations described in FIG. 24A.

FIG. 25C is a graph demonstrating a comparison of package weight required by different cooling combinations described in FIG. 24A.

FIG. 25D is a graph demonstrating a comparison of price required for different cooling combinations described in FIG. 24A.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present disclosure is directed to a system of dissipating heat or a heat dissipating system. The heat dissipating system of the present disclosure comprises any system using a fuel cell, fuel cell stack, and/or fuel cell system. For example, a heat dissipating system of the present disclosure includes, but is not limited to, a vehicle, a powertrain system, a stationary system, a mobile or portable system, and any system for use on highway, off highway, on rail, and/or in mining.

The heat dissipating system of the present disclosure manages the heat produced by a radiator and/or an exhaust system either individually or in combination with each other. The heat dissipating system comprises one or more of the following components: a fuel cell system, a coolant, water output from the fuel cell system, a radiator, a pump, and a radiator fan. An exemplary heat dissipating system of the present disclosure is a vehicle and/or a powertrain system.

Figure 1:
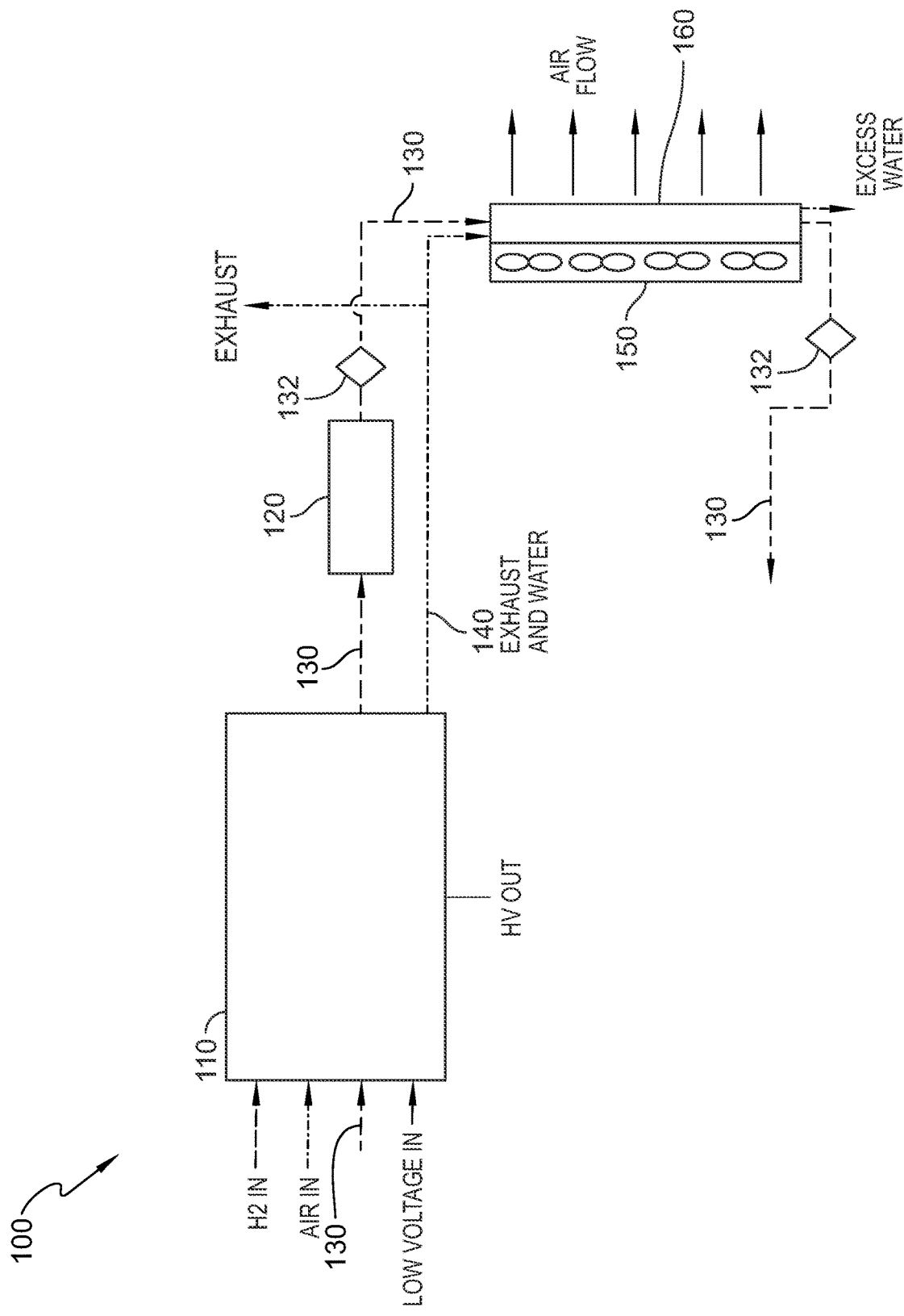
FIG. 1 is a block diagram of a heat dissipating system showing the use of water output from a fuel cell system aiding in the heat dissipation of the radiator by evaporative cooling.

As illustrated in FIG. 1, a fuel cell system 110 in a heat dissipating system 100 may manage the heat produced by the fuel cell system 110 using a radiator 160. Water, air, and coolant 130 may be input in the fuel cell system 110. Coolant 130 may exit the fuel cell system 110 at a higher temperature and reach the radiator 160 after passing through a thermal management system 120.

In some embodiments of the present system 100, to aid in heat dissipation, a system 100 may further comprise one or more fans 150 to provide airflow and/or to speed the dissipation of heat from the heat dissipating system 100, respectively. In other embodiments, a fan 150 may be provided to help dissipate heat away from the radiator of the heat dissipating system 100. Such fans may be rated to supply a desired air speed (e.g., at or about 50 mph) in order to cool the heat dissipating system 100.

For example, a fan 150 may help with heat dissipation and to ensure that water and/or water droplets contact the radiator, such as the radiator tubes. One or more fans 150 may be located near, next to, or comprised by the radiator 160 (see FIG. 1). In some embodiments, the fan 150 may direct air flow to the radiator 160 from left to right or in the East-to-West direction. In some embodiments, the fan 150 may direct air flow to the radiator 160 from right to left, or in the West-to-East direction. In some further embodiments, more than one fan 150 may direct air flow to the radiator 160 from both directions.

In addition or as an alternative to one or more fans 150, it may be desirable to have a heat dissipating system 100 designed to comprise a thermal management system 120. The thermal management system 120 may automatically, electronically, or manually measure, sample, and/or otherwise calculate heat dissipated by the radiator 160 and/or the exhaust. Further, the thermal management system 120 may comprise one or more airflow fans 150, external coolant flow passages, ports, nozzles, misters, and/or other components to provide sufficient heat dissipation in order to keep the heat dissipating within desired temperature specifications.

The thermal management system 120 of the heat dissipating system 100 may predict or estimate the temperature of the system 100 with a fixed amount of coolant 130 or a flow of coolant in the radiator 160. The flow of coolant refers to the flow of coolant or the flow of air, either separately or combined. Alternatively, the thermal management system 120 may predict the temperature of the system 100 using airflow over the radiator 160.

A controller 1800 in the heat dissipating system 100 and/or the thermal management system 120 may have access to such heat and/or temperature data to control internal coolants. In addition, a controller 1800 may control any external water, air, and/or heat management required by the heat dissipating system 100 and/or the thermal management system 120. For example, a water management system, an air management system, and/or a heat management system may be comprised by the thermal management system 120.

One or more sensors 132 may be comprised by the present heat dissipating system 100 and/or the thermal management system 120. In particular, sensors 132 may be configured to be coupled, connected, and/or attached to one or more components of the present heat dissipating system 100 and/or the thermal management system 120. For example, as illustrated in FIG. 1, one or more sensors may be coupled to a fuel cell system 110, a radiator 160, and/or a thermal management system 120.

The one or more sensors 132 may also be used to detect and/or measure features, characteristics, parameters, metrics, and/or values related to operations of the system 100. For example, operational features of the thermal management system 110, fuel cell system 120, and/or radiator 160 ascertained, detected, or measured by sensors 132 may include, but are not limited to ambient temperature, coolant temperature, relative humidity, radiator fan speed, fuel cell power, fuel cell coolant temperature target, fuel cell operating mode, fuel cell power, pump power, sump water level, sump pump speed, air flow and vehicle speed.

The one or more sensors 132 may be a temperature sensor, a flow sensor, or any other sensor known in the art. In an exemplary embodiment, temperature sensors 132 are utilized in the present system 100 to capture heat and/or temperature data. The sensors 132 may then immediately, in real-time, or in a specified time period communicate the heat and/or temperature data to the controller 1800 in the heat dissipating system 100 and/or the thermal management system 120.

During operation of the system 100, exhaust and/or water 140 may exit the fuel cell system 110. The exhaust may contain water vapor. The water 140 is directed to the radiator 160, which is preferably placed below the fuel cell system 110 (i.e., in a lower plane than the fuel cell system) for evaporative cooling to take effect instead of discarding the exhaust and/or water 140. The coolant 130 is returned to the fuel cell system 110 after being passed through the radiator 160.

The availability of rapid air movement assists in evaporative cooling. However, as illustrated, one or more radiator fans 150 may be used to develop a draft of air to initiate the evaporative cooling effect. Water output 140 from a fuel cell system 110 is expected to be at a maximum temperature of about 30° C. to about 35° C. The radiator 160 is usually at a higher temperature, such as in some instances, the radiator 160 is at temperatures ranging from about 60° C. to about 65° C. Thus, the water 140 drippage in contact with the radiator 160 can help extract heat from the radiator 160.

Such an evaporative effect can be extended to other radiators and systems on a heat dissipating system 100 and can be used for power electronics cooling, battery cooling, traction system cooling, fuel cell ambient air cooling, cabin cooling, and any other cooling functionality known in the art. In some embodiments, direct evaporative cooling may be used in the present systems 100 for heat dissipation. In other embodiments, passive direct evaporative cooling may be used in the present systems 100 for heat dissipation. In further embodiments, indirect evaporative cooling may be used in the present systems 100 for heat dissipation.

The effect of evaporative cooling is based on evaporation, which is the conversion of a liquid substance into a gaseous state. When water evaporates from a surface of an object, a component, a substance, or even a liquid, that surface becomes much cooler because heat is used to change the liquid into a gas or a vapor (e.g., water vapor). Furthermore, when air moves across or over a surface of water, the air causes some of the water to evaporate.

Thus, evaporation results in a reduced temperature and an increased vapor content in the air. The bigger the area of contact between the air and the water on the surface, the more evaporation that will occur. The more evaporation that occurs, the more enhanced is the cooling and the more addition of moisture to the air. In the case of evaporative cooling, the heat from the air is used to cool the surface of the object or component.

Direct evaporative cooling is a process that lowers the temperature and increases the humidity of air by using latent heat of evaporation, which changes liquid water to water vapor. In this process, the energy in the air does not change. Warm dry air is changed to cool moist air. The heat of the outside air is used to evaporate water. The room humidity increases to about 70% to about 90%. The moist air must be continually and externally released (e.g., to outside) or the air becomes saturated and evaporation stops.

Depending on the ambient conditions it may not be efficient to always use basic evaporative cooling as described herein. In some embodiments of the present system 100, additional features, and/or enhancements may be implemented to optimize the evaporative cooling for a fuel cell system. For example, additional components of the present method and system 100 may be incorporated to improve the evaporative cooling effect.

Figure 2:
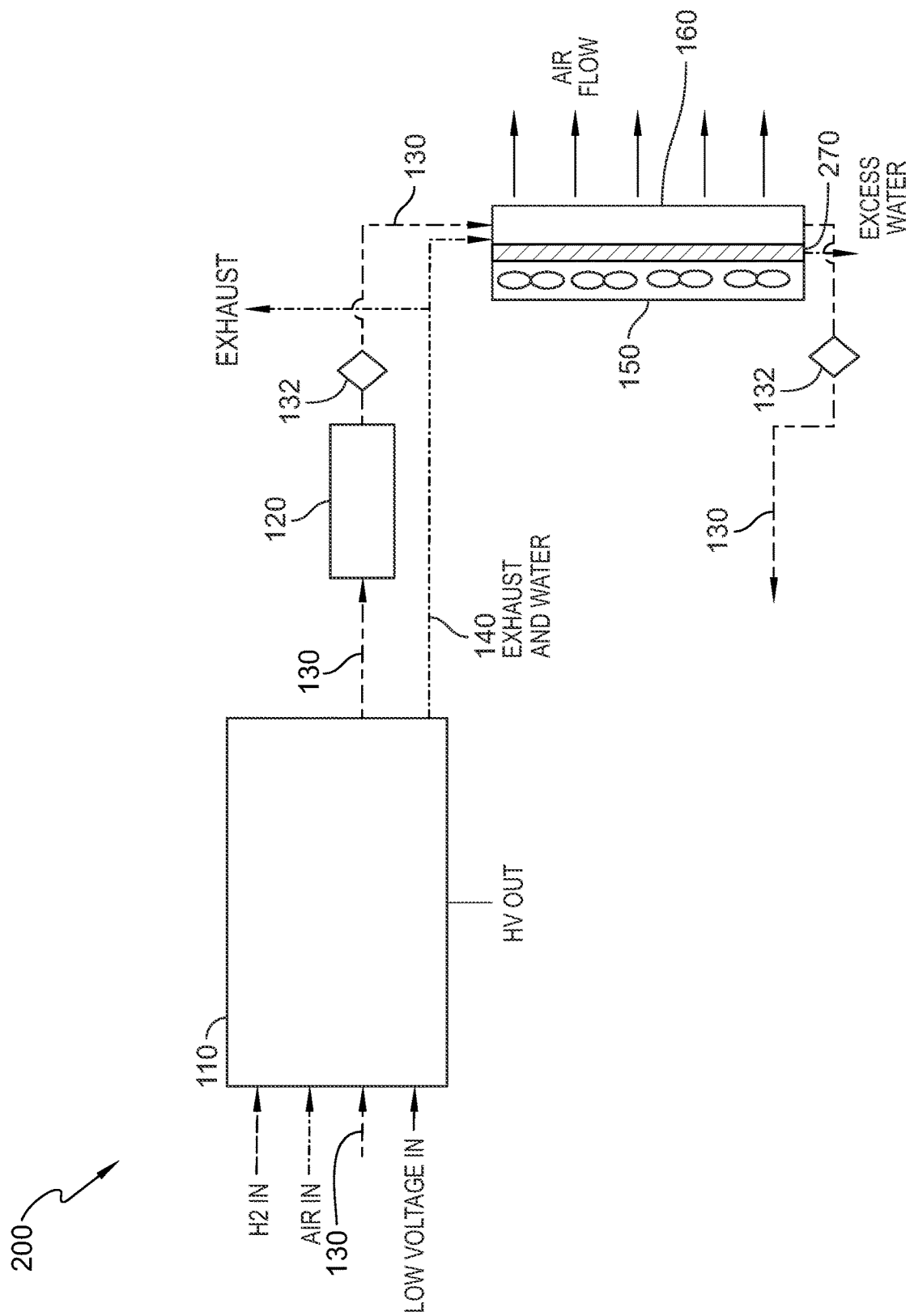
FIG. 2 is a block diagram of a heat dissipating system showing the use of water output from a fuel cell system aiding in the heat dissipation of the radiator by evaporative cooling by passing through a wetted membrane.

As illustrated in FIG. 2, the present system 200 may comprise a wetted medium or membrane intermediary 270. The wetted medium or membrane intermediary 270 may be used in conjunction with the fan 150 that is next to the radiator 160, and the radiator 160 is placed below or in a lower plane than the fuel cell system 110 of a heat dissipating system 200. Water 140 from the exhaust is directed to the medium, membrane, or membrane intermediary 270 ("membrane") that is next to the radiator 160 to make it a wetted medium or membrane intermediary 270. In an exemplary embodiment of the present system 200, the wetted medium or membrane intermediary 270 is located between the radiator 160 and the fan 150. The wetted medium or membrane intermediary 270 may be in contact with one or both of the radiator 160 and/or the fans 150.

Gravity causes water 140 to be absorbed through the medium or membrane intermediary 270. In some embodiments, the medium or membrane intermediary 270 may be made of any absorbing material. For example, in some embodiments the medium or membrane intermediary 270 may be made of cellulose. In other embodiments, the medium or membrane intermediary 270 may be made of hay.

In further embodiments, the wetted medium or membrane intermediary 270 may be made of any material that allows passage of air and water through it. In some embodiments, the medium or membrane intermediary 270 may be made of any material that is water absorbent. In an exemplary embodiment, the medium or membrane intermediary 270 may be made of any material that allows air flow at a rate of about or above 450 m$^3$/min.

Figure 3:
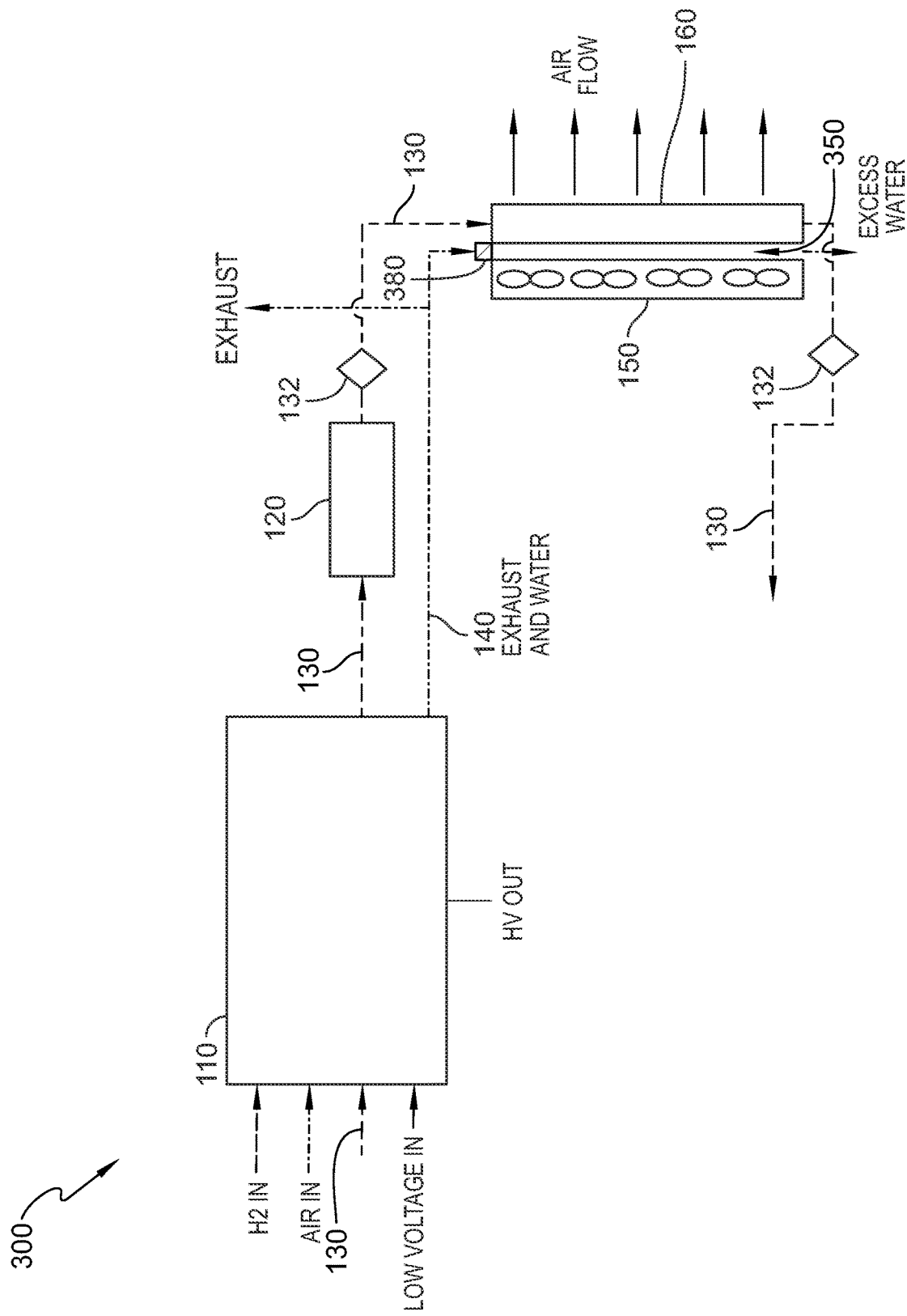
FIG. 3 is a block diagram of a heat dissipating system showing the use of water output from a fuel cell system aiding in the heat dissipation of the radiator by evaporative cooling by passing through a nozzle or a mister.

In one embodiment of the present system 300, as illustrated in FIG. 3, a nozzle or a mister 380 in the gap 350 may be used to channel water 140 from the exhaust to the radiator 160 by creating a water mist. In some embodiments, the nozzle or the mister 380 may be an ultrasonic misting apparatus. In other embodiments, the nozzle or the mister 380 may be similar to one used in a humidifier.

In further embodiments, the nozzle or the mister 380 may produce one or more, such as a plurality, of water particles. The water particles may comprise a diameter of about 1 mm in diameter to about 2 mm in diameter, and any diameter comprised therein. In some embodiments, formation of such small water particles by the nozzle or the mister 380 may result in more effective and/or improved heat removal.

In one embodiment, the exhaust and water 140 from the fuel cell system 110 is passed through a convergent or a divergent nozzle 380 causing a temperature drop across the nozzle. As the temperature drops, the water vapor saturation pressure may also drop. For example, the water vapor saturation pressure may drop from about 90 kPa at about 70° C. to about 1.7 kPa at about 15° C. Hence, the water will condense when it comes out of the nozzle.

Figure 4:
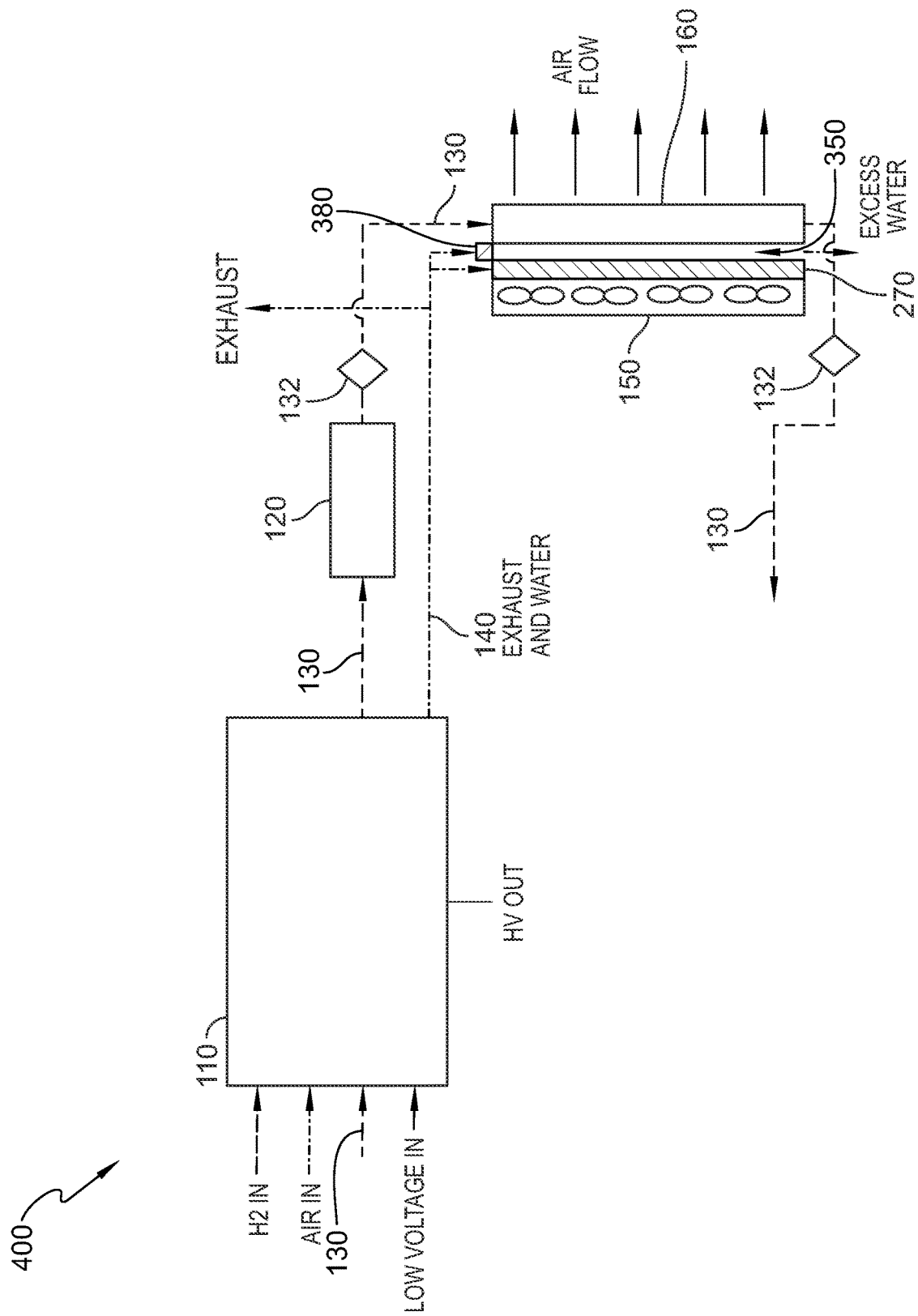
FIG. 4 is a block diagram of a heat dissipating system showing the use of water output from a fuel cell system aiding in the heat dissipation of the radiator by evaporative cooling by passing through a nozzle or a mister and a wetted membrane.

In one embodiment of the present system 400, as illustrated in FIG. 4, a nozzle or a mister 380 may be used along with a wetted medium or membrane intermediary 270. A gap 350 where the mist enters and evaporates because of the fans 150 may exist on either side of the wetted medium or membrane intermediary 270 and between one or more surfaces of the wetted medium or membrane intermediary 270 and one or both of the radiator 160 and/or the fans 150.

A nozzle or a mister 380 may be used to channel the water 140 through a gap or passage 350 between the medium or membrane intermediary 270 and the radiator 160 placed below the fuel cell system 110 in a heat dissipating system 400. Water 140 may simultaneously be directed onto the medium or membrane intermediary 270 via the gap or passage 350 placed next to the radiator 160.

Figure 5:
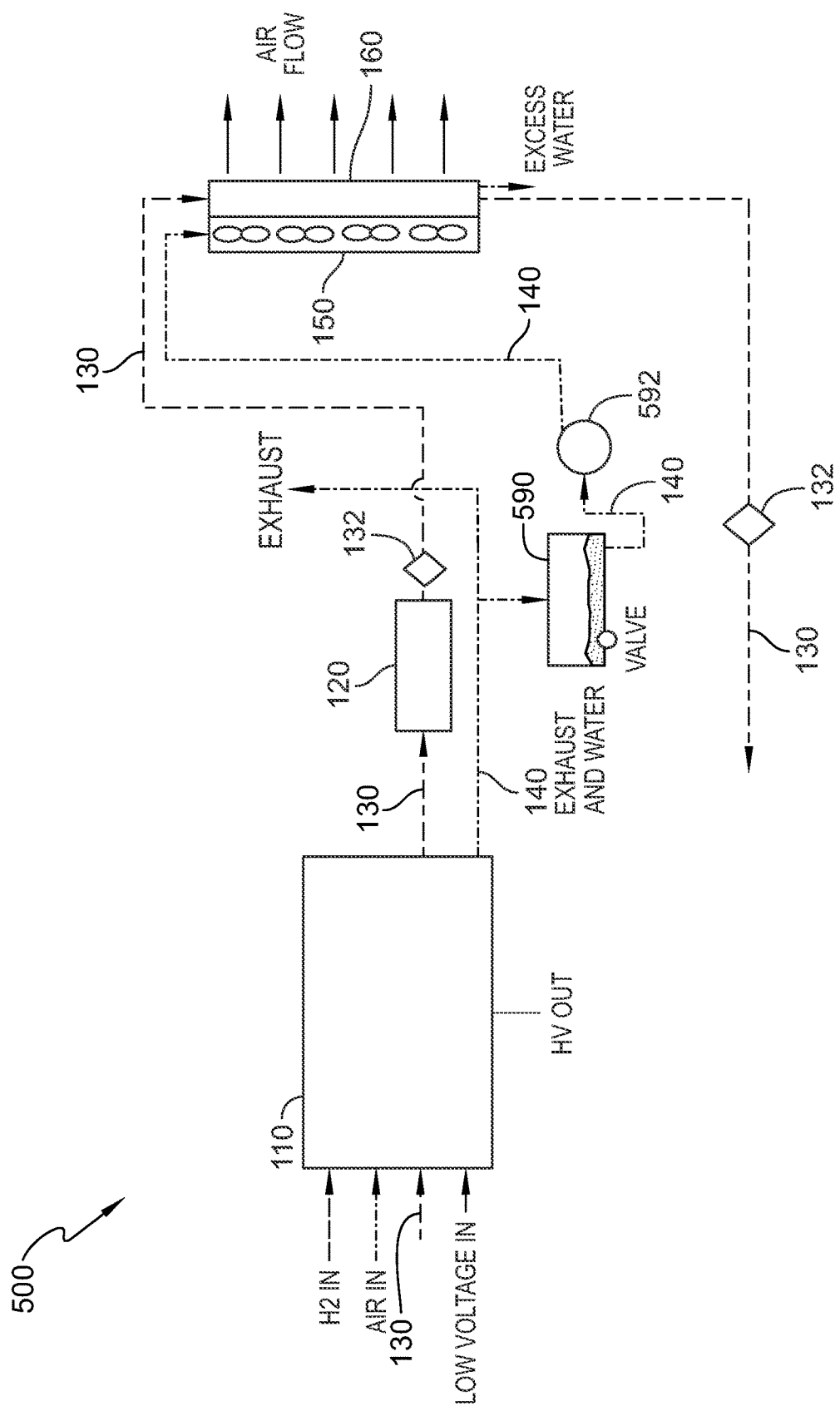
FIG. 5 is a block diagram of a heat dissipating system showing the use of water output from a fuel cell system being collected in a sump and aiding in the heat dissipation of the radiator by evaporative cooling by passing through pump connected to the sump.

In one embodiment of the present system 500, as illustrated in FIG. 5, the radiator 160 may not be placed below or in a lower plane as the fuel cell system 110. Instead, the radiator 160 may be located above or in a higher plan than the fuel cell system 110. In some of these such embodiments, a sump 590 may be used to collect the water 140 from the exhaust of a fuel cell system 110. A pump 592 attached to the sump 590 may drive the water 140 against gravity to the radiator 160 located above the fuel cell system 110.

In some embodiments of the present system 500, the water 140 may be used along a wetted medium or membrane intermediary 270 or passed through a nozzle or a misting apparatus (e.g., a mister) or both (see FIGS. 3 and 4) after passing through the pump 592 attached to the sump 590. The coolant 130 is passed through the radiator 160 before being returned to the fuel cell system 110.

The sump 590 is also useful to collect water 140 because the water production by a fuel cell system 110 is different under different operating conditions. Under some conditions the production of water 140 may outpace the need for evaporative cooling and vice versa. In such instances, the water 140 may be stored in the sump 590 for future use. In some embodiments, the exhaust from the fuel cell system 110 may be passed through a mechanical cyclone separator to separate the exhaust and the water 140 before the water 140 is collected in the sump 590.

Figure 6:
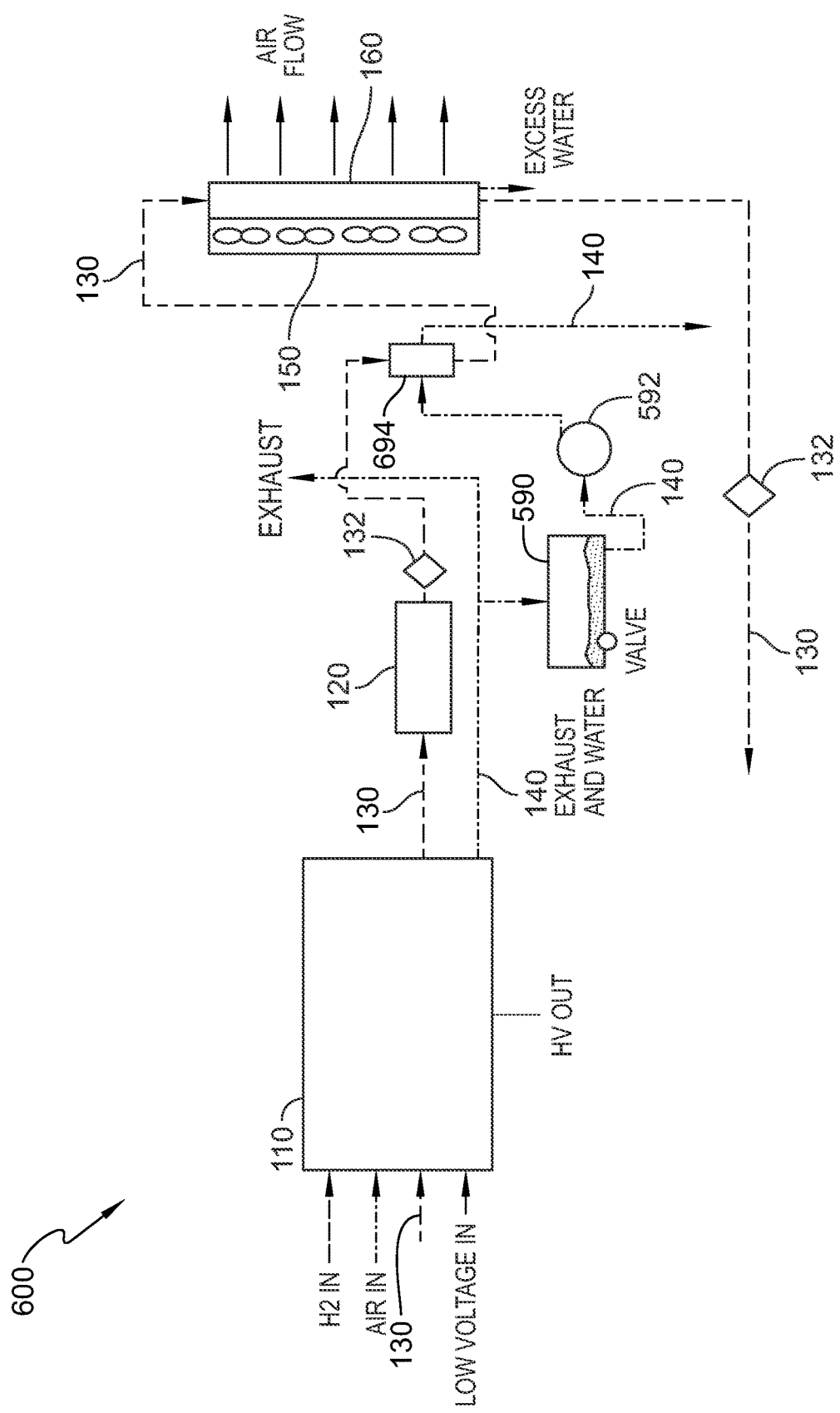
FIG. 6 is a block diagram of a heat dissipating system showing the use of water output from a fuel cell system being collected in a sump and passing through a heat exchanger through which the coolant used in the fuel cell system is also passed.

In one embodiment of the present system 600, as illustrated in FIG. 6, heat exchangers are used to transfer heat to the water 140 from coolant 130. The coolant 130 is passed through the heat exchanger 694 through which the water 140 is passed. In some embodiments, the water 140 is passed through the heat exchanger 694 after passing through a pump 592. After passing through the heat exchanger 694, the coolant 130 is passed through the radiator 160 before being directed back to the fuel cell system 110.

Figure 7:
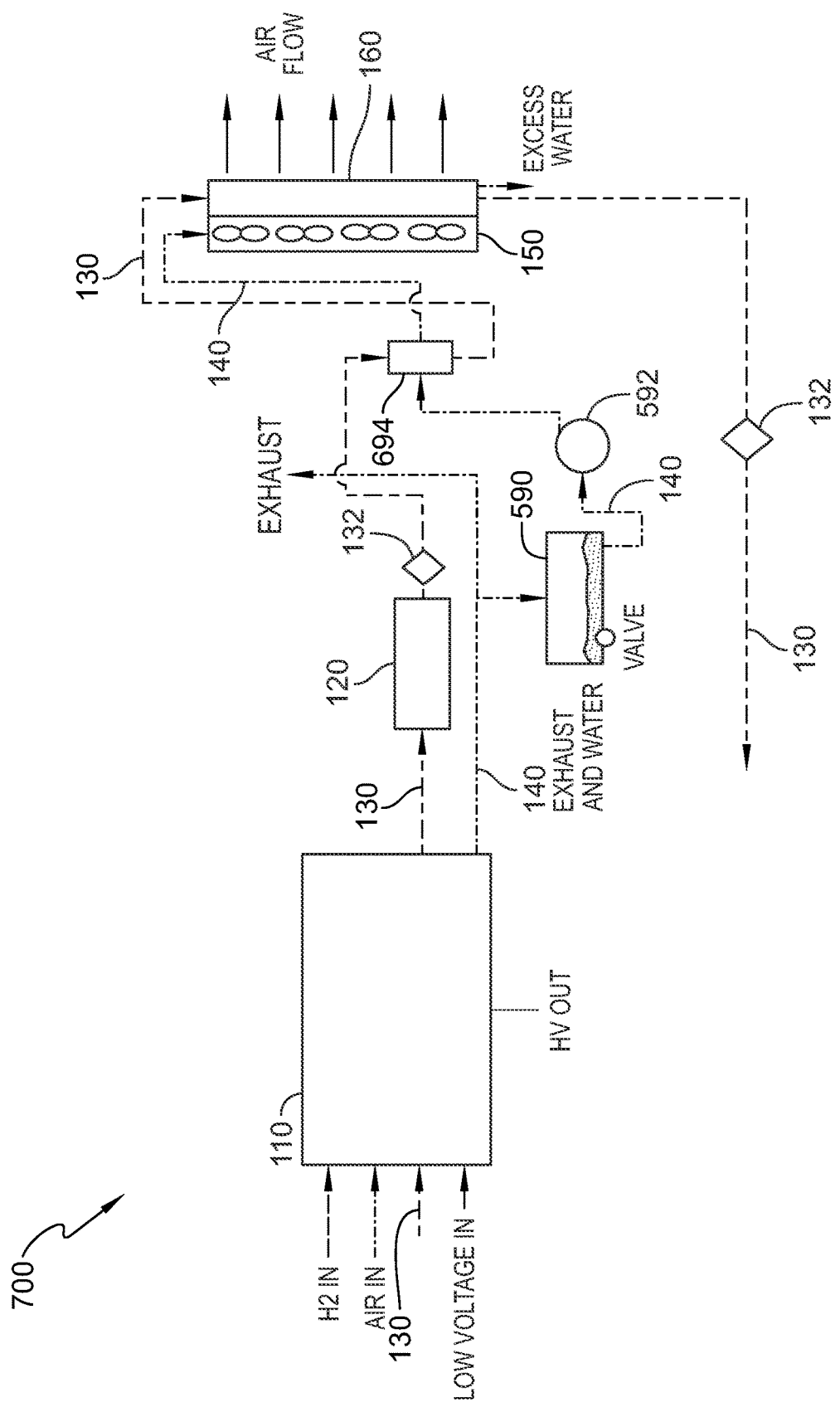
FIG. 7 is a block diagram of a heat dissipating system showing the use of water output from a fuel cell system being collected in a sump and passing through a heat exchanger through which the coolant used in the fuel cell system is also passed before being passed through the radiator.
Figure 8:
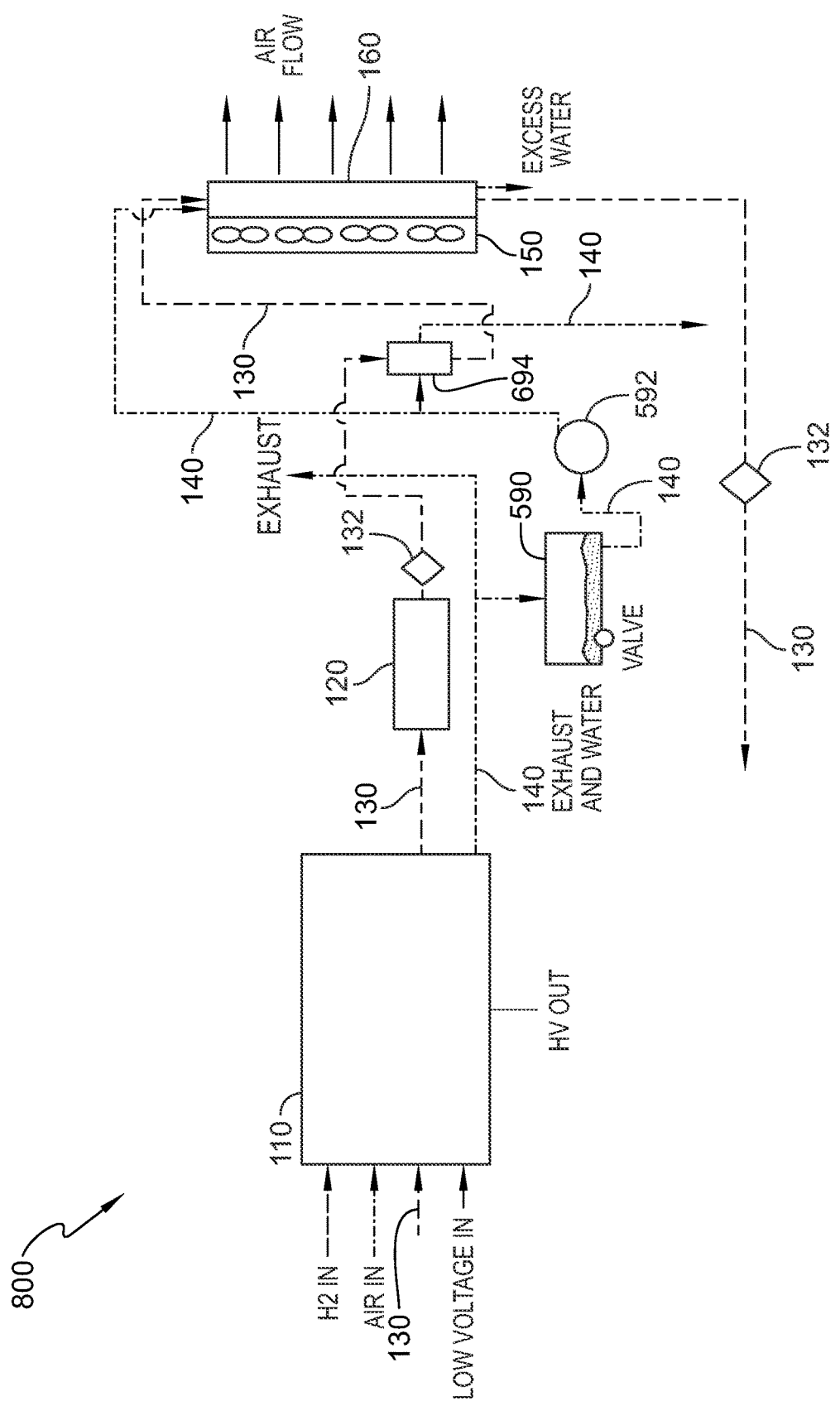
FIG. 8 is a block diagram of a heat dissipating system showing the use of water output from a fuel cell system being collected in a sump and passing through a heat exchanger through which the coolant used in the fuel cell or passing through the radiator.

In one embodiment of the present heat dissipating system 700, as illustrated in FIG. 7, the water 140 and the coolant 130 are passed through the heat exchanger 694 before being passed to the radiator 160. In other embodiments of the heat dissipating system 800, as illustrated in FIG. 8, the water 140 is passed to both the heat exchanger 694 and the radiator 160. The water 140 and the coolant 130 are passed through the heat exchanger 694 before being passed to the radiator 160. Alternatively, the water 130 is simultaneously passed directly to the radiator 160 without being passed through the heat exchanger 694 at all.

Figure 9:
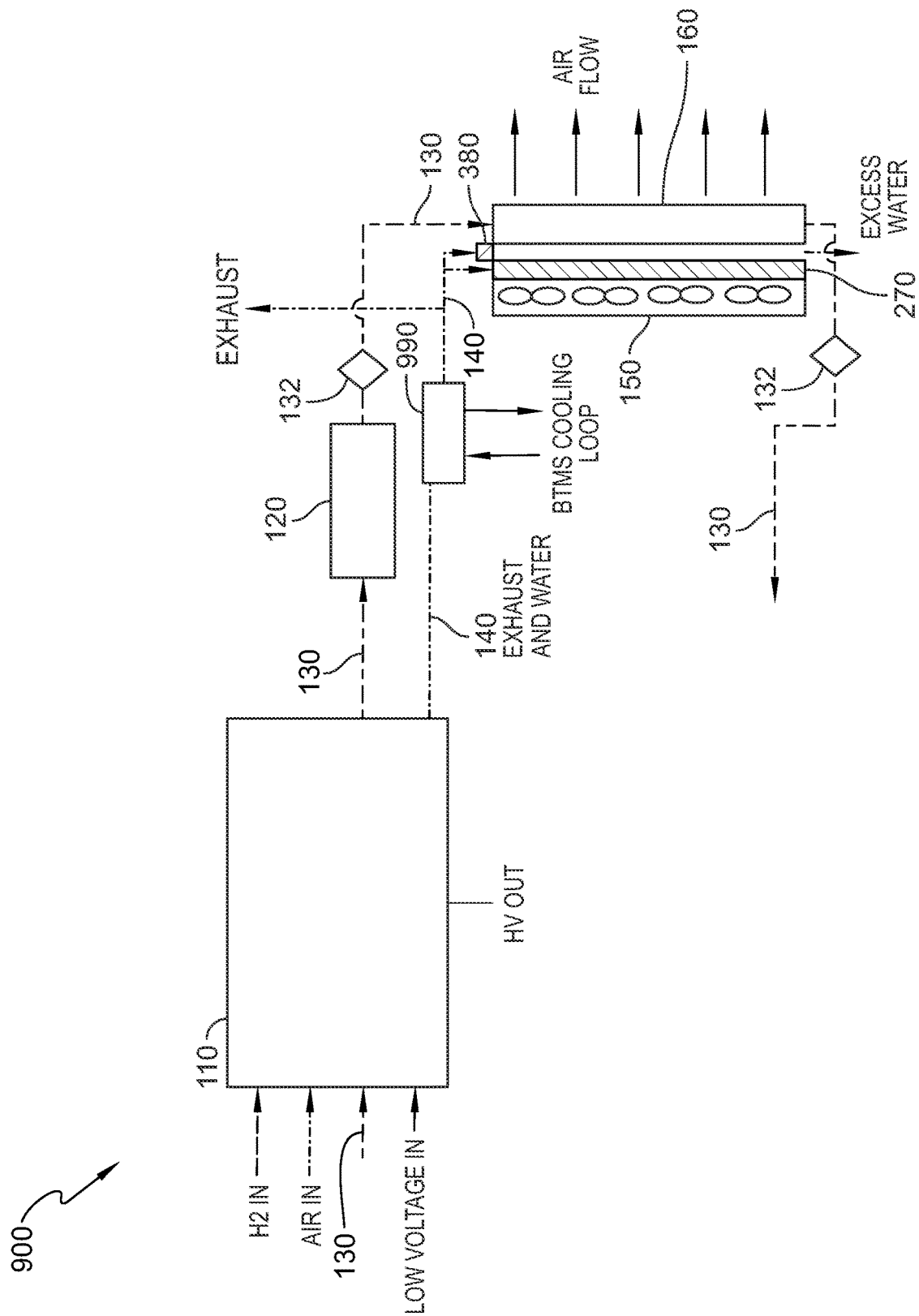
FIG. 9 is a block diagram of a heat dissipating system showing the use of water output from a fuel cell system being passed through a heat exchanger with a BTMS (Battery Thermal Management System) loop before aiding in the heat dissipation of the radiator by evaporative cooling by passing through a nozzle or a mister and a wetted membrane.

In one embodiment of the present heat dissipating system 900, as illustrated in FIG. 9, the water 140 is passed through a heat exchanger 990 prior to being passed to the radiator 160. Since the fuel cell size may be smaller than a battery used in a battery-electric vehicle, a battery thermal management system (BTMS) may be used to offset some of the cooling load and condense more water 140 from the fuel cell exhaust prior to being used in the radiator 160 as illustrated.

Figure 10:
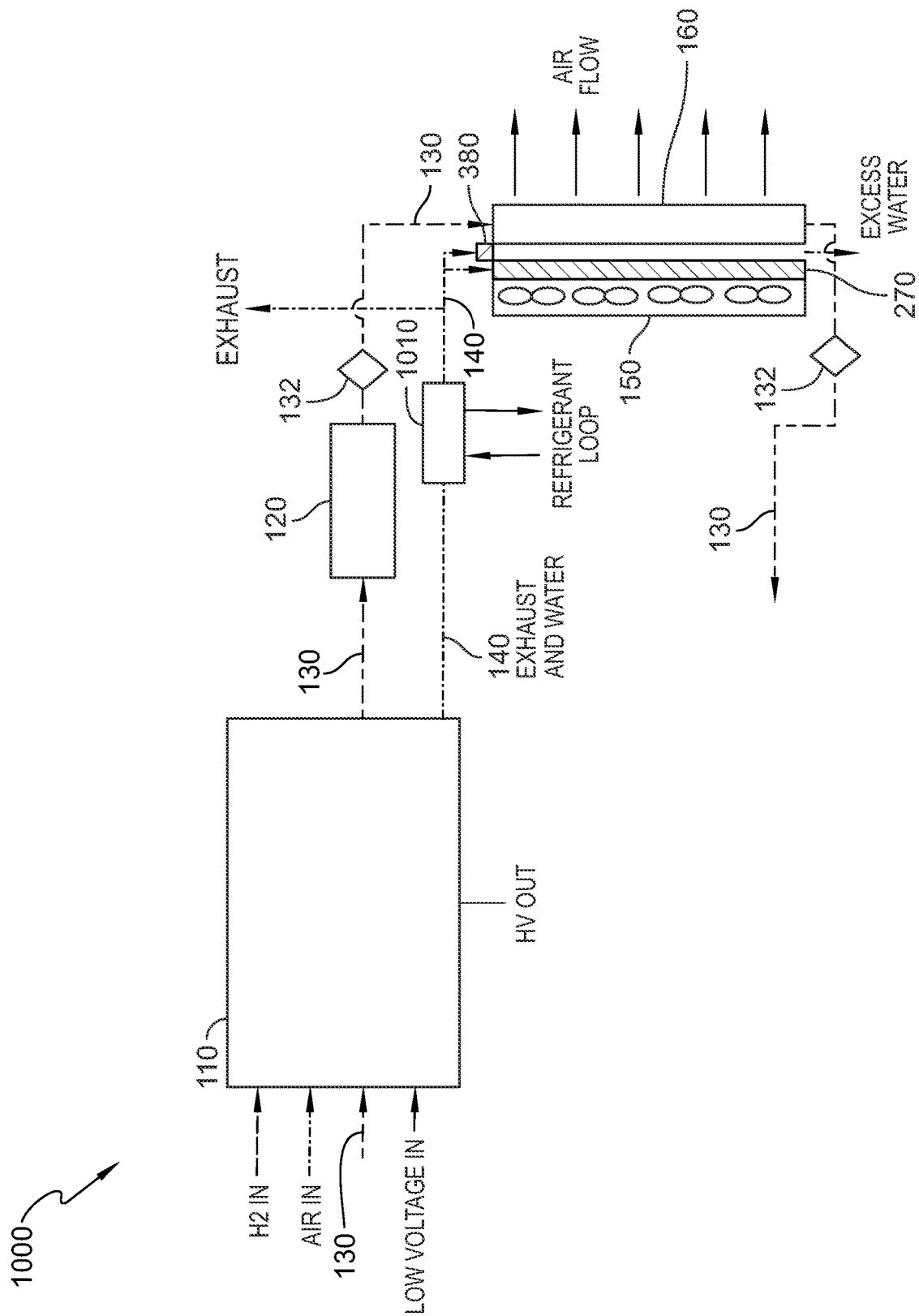
FIG. 10 is a block diagram of a heat dissipating system showing the use of water output from a fuel cell system being passed through a chiller with a refrigerant loop before aiding in the heat dissipation of the radiator by evaporative cooling by passing through a nozzle or a mister and a wetted membrane.

In some embodiments of the heat dissipating system 1000, as illustrated in FIG. 10, the water 140 is passed through a chiller 1010 prior to being passed to the radiator 160. In some embodiments, instead of a battery thermal management system (BTMS) loop, a refrigerant loop may be used to condense more water from the exhaust stream. In some embodiments, this water is directed to the medium or membrane intermediary 270 that is next to the radiator 160, and may or may not comprise a gap or passage 350. In some embodiments, a nozzle or a mister 380 may be used along with or without the wetted medium or membrane intermediary 270.

Figure 11:
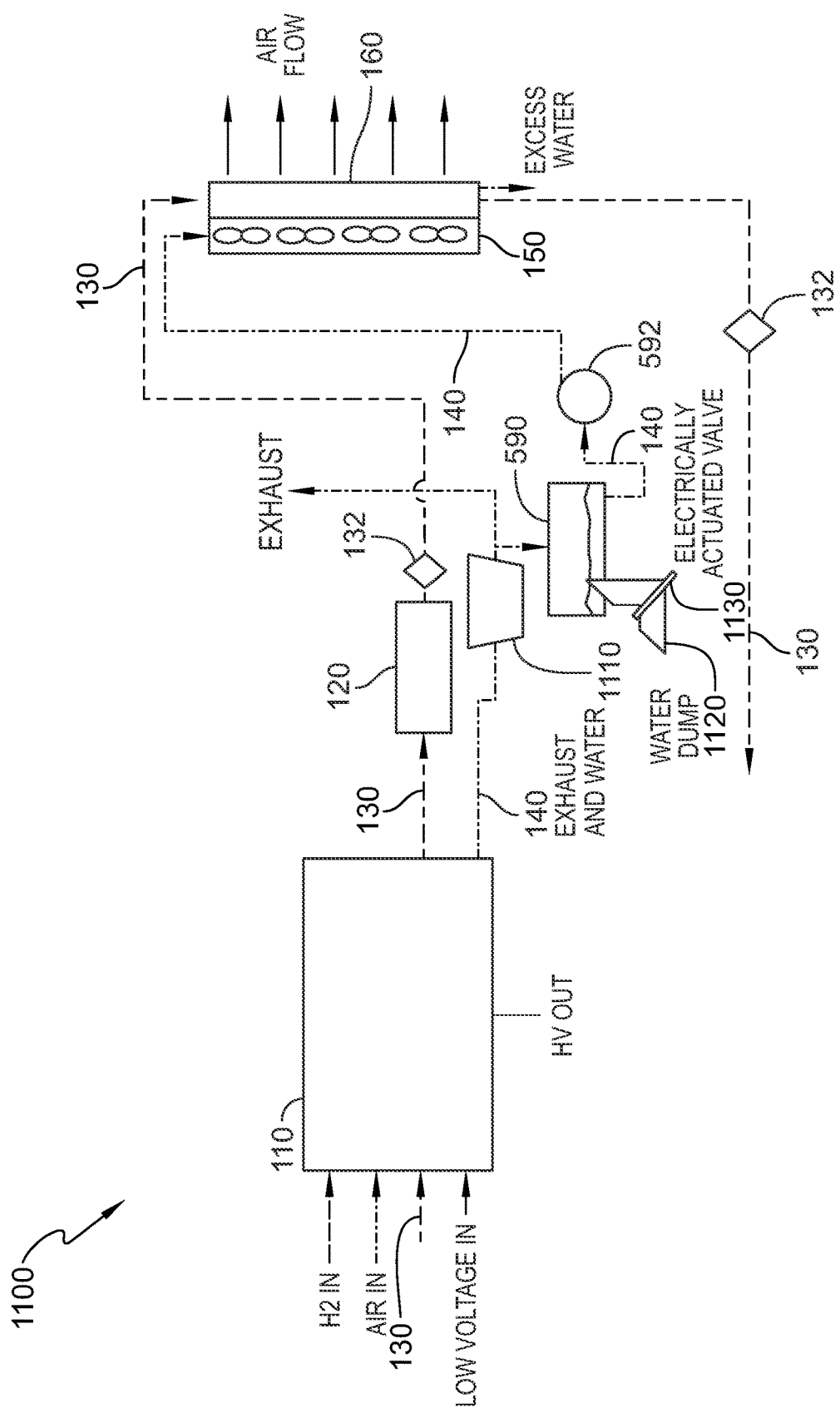
FIG. 11 is a block diagram of a heat dissipating system showing the use of a mechanical cyclone separator to separate exhaust gases from water output in a fuel cell system before using the water output to aid in the heat dissipation of the radiator by evaporative cooling.

In some embodiments of the heat dissipating system 1100, as illustrated in FIG. 11, the exhaust from the fuel cell system 110 may also contain gases, such as oxygen, nitrogen, and/or hydrogen, in addition to water. The exhaust and water 140 may be passed through a separator 1110, such as a mechanical cyclonic separator, prior to the water 140 being collected in the sump 590. The sump 590 may have a water dump 1120 that is controlled by a water control device 1130, such as an electrically actuated valve, a mechanically actuated valve, a sensor 132, or another mechanism.

Figure 12:
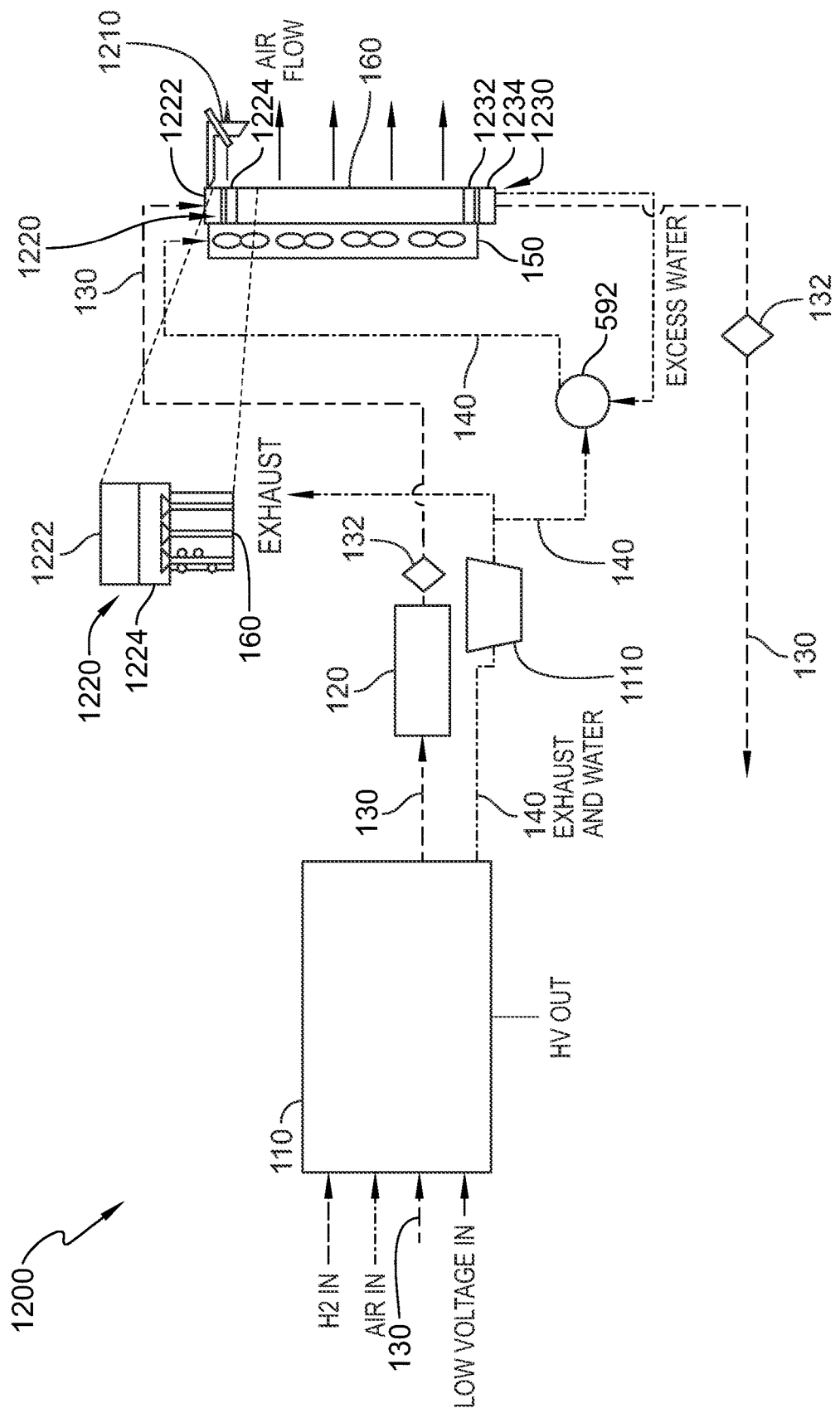
FIG. 12 is a block diagram of a heat dissipating system showing the use of a mechanical cyclone separator to separate exhaust gases from water output in a fuel cell system before collecting the water output in an integrated sump and coolant reservoir to aid in the heat dissipation of the radiator by evaporative cooling.

In some embodiments of the heat dissipating system 1200, as illustrated in FIG. 12, the exhaust and water 140 is passed through a water separator 1110 (e.g., a mechanical cyclonic separator) prior to the water 140 being pumped by the pump 592 to the radiator 160. The water 140 may be collected in an integrated sump and coolant reservoir 1220. The water 140 is collected in a water reservoir 1222 located on a first, top section of the integrated sump and coolant reservoir 1220. The coolant 130 that passes through the thermal management system 120 is collected in a coolant reservoir 1224 located at the bottom of the integrated sump and coolant reservoir 1220.

The water 140 collected in the water reservoir 1222 may be used to cool the radiator 160 by targeting the heated component of the radiator 160 as shown in the insert in FIG. 12. There may also be an electrically actuated valve or a mechanical actuated valve 1210 to dump water collected in the water reservoir 1222. The water 140 and coolant 130 are collected in a collection reservoir 1230. One embodiment of the collection reservoir allows water 140 to be collected in a first, bottom portion 1234 of the collection reservoir 1230, while the coolant 130 is collected at the second, top portion 1232 of the collection reservoir 1230. In another embodiment of the collection reservoir, coolant 130 (e.g., water) may be collected in the first, bottom portion 1234 of the collection reservoir 1230, while the water 140 may be collected in the second, top portion 1232 of the collection reservoir 1230.

Figure 13:
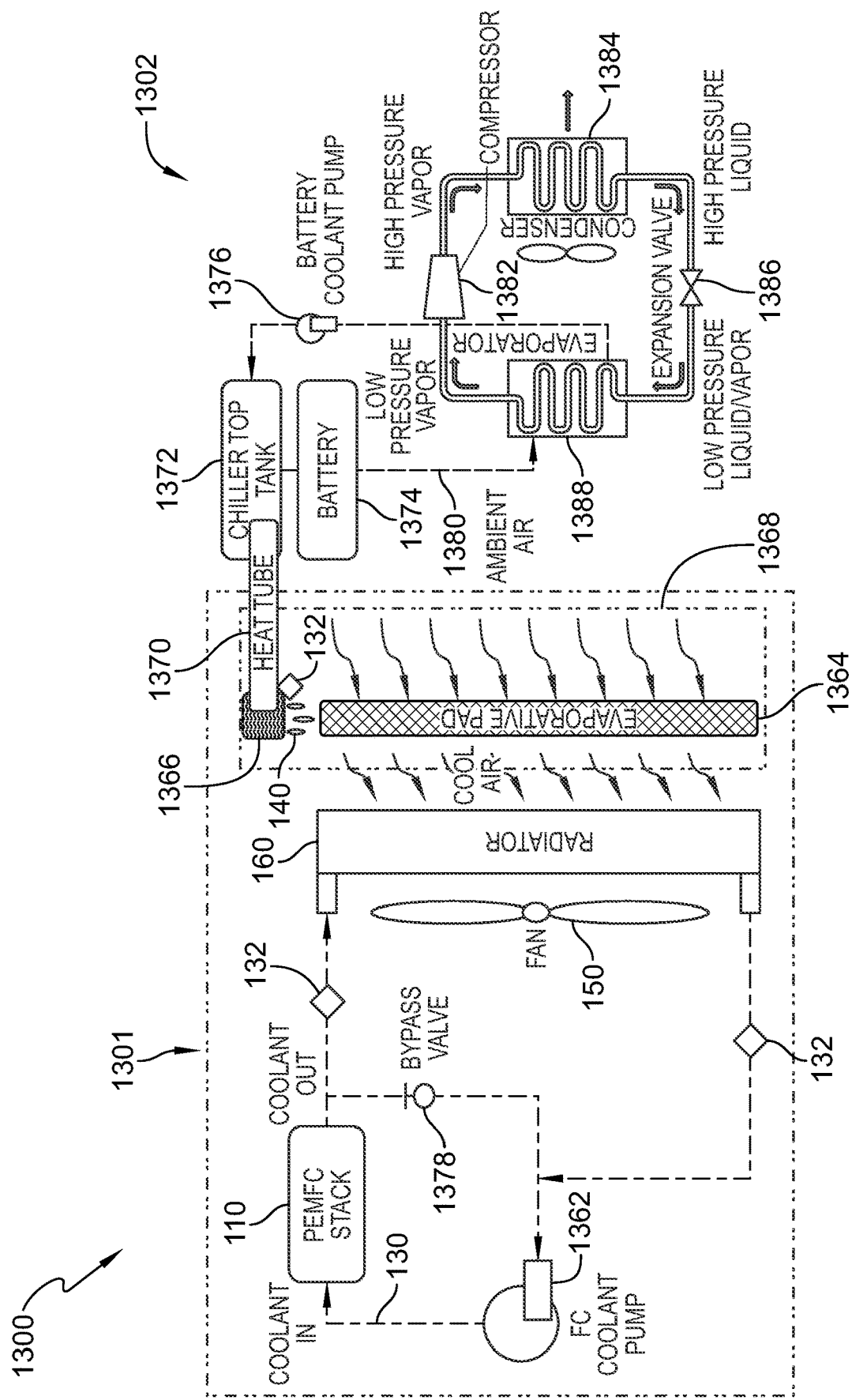
FIG. 13 is a diagram of a heat dissipating system showing the use of a stored water insulated tank and a heat exchanger to cool a coolant of a fuel cell system to aid in the heat dissipation of the radiator by evaporative cooling.

In some embodiments of the heat dissipating system 1300, as illustrated in FIG. 13, excess water 140 generated as a byproduct during operation of a fuel cell circuit 1301 is collected in a stored water tank 1366. Water 140 collected in the stored water tank 1366 may be made available to assist with heating or cooling the coolant 130 of the fuel cell circuit 1301. For example, water 140 collected and contained in the stored water tank 1366 of the heat dissipating system 1300 may be used to cool the coolant 130 when ambient air (e.g., environmental air) is warm, such as at or about 45° C. or higher (e.g., 46° C., 47° C., 48° C., 49° C. or higher). Alternatively, water 140 collected and contained in the stored water tank 1366 may be used to heat the fuel cell coolant 130 when ambient air is cool to cold, such as at or about 8° C. or lower. Normal ambient air falls in the range of at or about 8° C. to about 45° C., including any specific or range of temperatures comprised therein.

The stored water tank 1366 may be any container, tank, or vessel known to store a fluid or a coolant 130. The stored water tank 1366 may also be any type of water tank known in the art. In some embodiments, the stored water tank 1366 is not insulated. In other embodiments, the stored water tank 1366 is insulated. Insulation of the stored water tank 1366 helps to prevent and/or reduce the amount of fluctuation in the temperature of the water 140 held within the tank 1366. The insulated stored water tank 1366 may be insulated by any material known in the art to insulate the stored water tank 1366.

The heat dissipating system 1300 and/or the fuel cell circuit 1301 may include any components, including but not limited to one or more of a fuel cell stack or fuel cell system 110, a valve 1378, a sensor 132, a pump 1362, and a radiator 160. The valve 1378 may be any valve or mechanism able to start, stop, or change the direction of the flow path of a fluid, such as a coolant 130. For example, the valve 1378 may start, stop, or change the flow of a coolant 130, such that the coolant 130 flow splits into at least two flow paths when entering or exiting a system 1300 component (e.g., the fuel cell system 110, the thermal management system 120, or the radiator 160). An exemplary embodiment of a valve 1378 of the present system 1300 is a bypass valve.

More than one valve 1378, such as multiple or a plurality of valves 1378, may be used in the heat dissipating system 1300 and/or the fuel cell circuit 1301. In some embodiments, at least one valve 1378 may be positioned before and/or after coolant 130 enters and/or exits the fuel cell system 110. Valves can also be located at or near any other component in the system 1300.

Similarly, one or more sensors 132, such as multiple or a plurality of sensors 132, may be used in the heat dissipating system 100 and/or the fuel cell circuit 1301. In some embodiments, at least one sensor 132 may be configured to be associated to the fuel cell system 110, such as positioned before and/or after the inlet or outlet where the coolant 130 enters and/or exits the fuel cell system 110, respectively. Sensors 132 can also be located at or near any other component in the system 1300. For example, the one or more sensors 132 may be positioned before and/or after the inlet or outlet of the radiator 160 to measure, monitor, assess, ascertain, estimate, and/or predict the temperature of the coolant 130 at that component.

A pump 1362 of the present fuel cell circuit 1301 helps drive the coolant 130 into the fuel cell system 110 after it exits the radiator 160. One or more pumps 1362 may be used to drive coolant 130 throughout a fuel cell circuit 1301. The pump 1362 may be any pump known in the art for providing the momentum to drive the flow of coolant 130 or any other fluid in a system, such as a fuel cell circuit 1301.

As indicated, the fuel cell system 110 includes a coolant 130. The coolant 130 may be any coolant known to be used to operate any component of a vehicle, such as an engine, powertrain, battery, or a fuel cell, a fuel cell stack and/or a fuel cell system 110. In the present embodiment, the coolant 130 is a fuel cell coolant. The preferred operational temperature of the fuel cell coolant 130 ranges from about 60° C. to about 70° C., including any specific temperature or range of temperatures comprised therein. An exemplary fuel cell coolant 130 temperature is at or about 60° C. to about 65° C., such as at or about 65° C.

The heat dissipating system 1300 may include one or more heat exchangers 1370. A heat exchanger 1370 is utilized in the present system 1300 to heat or cool the coolant 130 of the fuel cell circuit 1301 and the fuel cell stack or system 110. A sensor 132 may be coupled to or near the heat exchanger 1370 to help detect or determine when the heat dissipating system 1300 should be used.

More specifically, one or more sensors 132 may detect the temperature of the water 140 in the stored water tank 1366 and the temperature of the ambient air, and communicate those values to the controller 1800 to determine the temperature difference, if any, between the temperature of the ambient air and temperature of water 140 in the stored water tank 1366. If the temperature of the water 140 in the stored water tank 1366 is determined by the sensors 132 and/or controller 1800 to be less than (i.e., cooler than) the temperature of the ambient air, then the controller 1800 will instruct the heat dissipating system 1300 to heat the coolant 130 of the fuel cell circuit 1301 to operational temperatures as described herein.

For example, in some embodiments where the ambient temperature is low (e.g., below 8° C.), the heat exchanger 1370 may be positioned between a battery 1374 and the fuel cell system 110 in order to directly warm the coolant 130 of the fuel cell circuit 1301 (e.g., coolant exiting the fuel cell system 110; see FIG. 17) or to warm the water 140 in the stored water tank 1366.

Conversely, if the temperature of the water 140 in the storage tank 1366 is determined by the controller 1800 to be more than (i.e., hotter than) the temperature of the ambient air, then the controller 1800 will instruct the heat dissipating system 1300 to cool the coolant 130 of the fuel cell circuit 1301 as further described herein. For example, a heat exchanger 1370 of the present system 1300 may be used to heat and/or cool the coolant 130 of the fuel cell circuit 1301. In one embodiment shown in FIG. 13, a heat exchanger 1370 is positioned between, adjacent to, and/or connects a chiller top tank 1372 of a battery circuit 1302 and the stored water tank 1366 of the fuel cell circuit 1301. This heat exchanger 1370 is referred to as a heat tube 1370.

Particularly when the ambient temperature is low, the heat tube 1370 and/or the chiller top tank 1372 are configured to remain at our about 25° C. (cool). The chiller top tank 1372 may be any container, tank, or vessel known to store a fluid or a coolant 130. In exemplary embodiments, the chiller top tank 1372 stores a battery circuit coolant 1380 (e.g., water) that generally has a cooler temperature than the water 140 in the stored water tank 1366. Importantly, the chiller top tank 1372 may be incorporated into the present system 1300 prefilled with the battery circuit coolant 1380, also having a cool temperature of about 25° C. Therefore, the heat tube 1370 enables the flow of the battery circuit coolant 1380 having a temperature at or around 25° C. from the chiller top tank 1372 to the stored water tank 1366, particularly when stored water tank 1366 is holding or storing warmer water (e.g., above 25° C., such as about 45° C. to 49° C. or higher).

In the present embodiment, the battery circuit coolant 1380 comprised by the chiller top tank 1372 is a battery coolant. The battery coolant 1380 may be any coolant known to be used to operate a battery 1374 and/or the battery circuit 1302. In other embodiments, the battery circuit coolant 1380 may be any coolant, such as the coolant 130, that is known to be used to operate any component of a vehicle, such as an engine, powertrain, fuel cell, or fuel cell system 110. In other embodiments, the battery coolant 1380 may be water 140.

The battery circuit 1302 of the present system 1300 may also comprise one or more of any components that include, but are not limited to the battery 1374, a pump 1376, an evaporator 1388, a compressor 1382, a condenser 1384, and a valve 1386. The battery 1374 may be any battery used to operate a vehicle, powertrain, or engine, or any battery known in the art for use with a fuel cell or fuel cell system 110. The pump 1376 may drive the battery coolant 1380 into the chiller top tank 1372 after it exits the evaporator 1388.

One or more pumps 1376 may be included in the battery circuit 1302 of the present disclosure. Pumps 1376 may be used to drive coolant 1380 throughout a battery circuit 1302. Any pump 1376 known for driving coolant 1380 or any other fluid in a battery circuit 1302 may suffice in the present heat dissipating system 1300.

A valve 1386 of the battery circuit 1302 may expand high pressure liquid into low pressure liquid and/or vapor. An exemplary embodiment of a battery circuit valve 1386 may be an expansion valve, or any other valve that expands and/or lowers the pressure of a liquid. In some embodiments, more than one valve 1386 may be used in the battery circuit 1302.

In operation of the present heat dissipating system 1300, as illustrated in FIG. 13, a battery circuit coolant (e.g., cool water) 1380 received by the stored water tank 1366 via the heat tube 1370 and the chiller top tank 1372 is applied to an evaporative cooler 1368 within or comprised by the fuel cell circuit 1301. An exemplary evaporative cooler 1368 is a sealed, closed, and/or airtight tank or vessel that comprises an evaporative pad 1364. In another embodiment, the evaporative cooler 1368 may be an unsealed, open and/or vented tank or vessel.

Water 140 from the stored water tank 1366 may be applied to the evaporative pad 1364 by any mechanism, including but not limited to dripping, flowing, drenching, spraying, dipping, etc. Water may be any type or water, including but not limited to rainwater, freshwater, stormwater, purified water, deionized water, filtered water, excess water, exhaust water, and/or sterile water.

In addition to water 140 being applied to the evaporative pad 1364, ambient air also passes through the evaporative pad 1364. Therefore, the evaporative pad 1364 is configured to receive cooled water 140 from the stored water tank 1366 in order to cool the ambient air by evaporative cooling before the ambient air dissipates, relocates, and/or is received by the radiator 160.

The evaporative pad 1364 may comprise one or more evaporative materials known to assist with cooling and/or warming ambient air by evaporation or other means. The evaporative pad 1364 may comprise more than one pad 1364, such as two, three, four, and five or more pads 1364. Multiple evaporative pads 1364 may or may not be configured to be coupled, connected, and/or attached together in order to produce and/or present as a single pad 1364 in the fuel cell circuit 1301. In addition, the evaporative pad 1364 may be made of any permeable and/or water absorbing material. In an exemplary embodiment, the evaporative material used in the one or more evaporative pads 1364 is or comprises cellulose or some other material.

Once the ambient air is cooled by evaporative cooling from the water 140 of the stored water tank 1366, the radiator 160 receives the cooled air. The radiator 160 uses the cooled air to lower the temperature and/or cool the fuel cell coolant 130. This temperature reduction of the fuel cell coolant 130 to the temperature of the cooled water or other coolant enables the fuel cell circuit 1301 to start and/or remain operable when the original ambient air is warm or hot, such as at or about 49° C. or more.

A fan 150 may also be incorporated into the present system 1300. For example, a fan 150 may be utilized independently and/or in conjunction with the radiator 160 to cool the ambient air and the fuel cell coolant 130. Alternatively, in other embodiments, the evaporative pad 1364 may be used to warm the ambient air by receiving warmed water 140 from the stored water tank 1366 or warmed coolant 1380 from other components, such as those within the battery circuit 1302 (e.g., the battery 1374).

Figure 14:
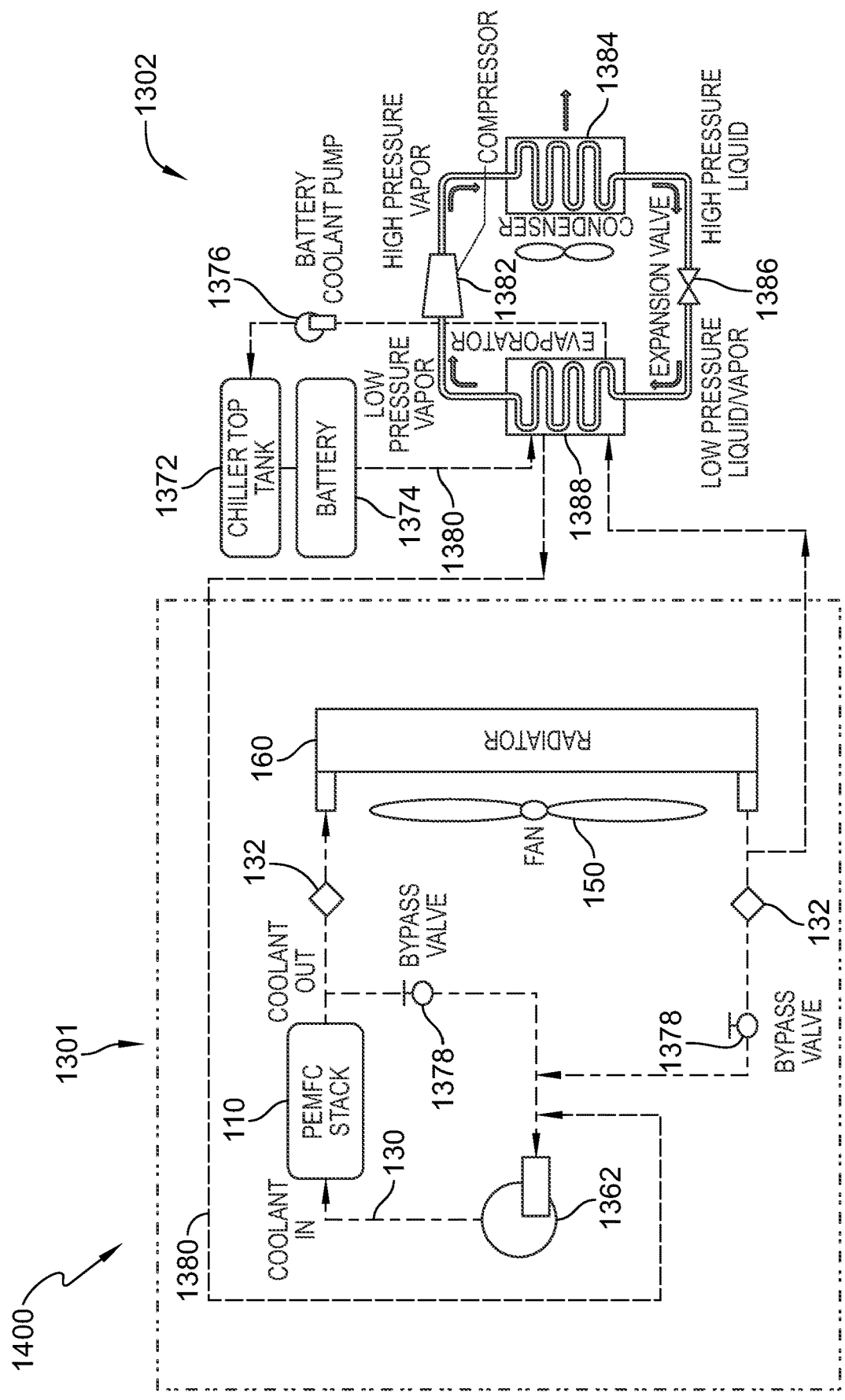
FIG. 14 is a diagram of a heat dissipating system showing the use of a battery thermal management system to cool a coolant of a fuel cell system to aid in the heat dissipation of the radiator by evaporative cooling.

FIG. 14 shows an embodiment of the present heat dissipating system 1400 when the ambient temperature ranges from about 45° C. to about 47° C., including any specific temperature or range of temperatures comprised therein. This heat dissipating system 1400 utilizes both the fuel cell circuit 1301 and the battery circuit 1302 to generate the power necessary to cool the fuel cell coolant 130 to operational temperatures (e.g., about 60° C. to about 65° C.). The coolant of the system 1400 comprises the coolant 130 from the fuel cell circuit 1301 and the coolant 1380 from the battery circuit 1302. Evaporated coolant 1380 flowing from the evaporator 1388 of the battery circuit 1302 directly to the fuel cell circuit 1301 generates a power load that relies on the battery 1374 and affects the chiller top tank 1372.

Figure 15:
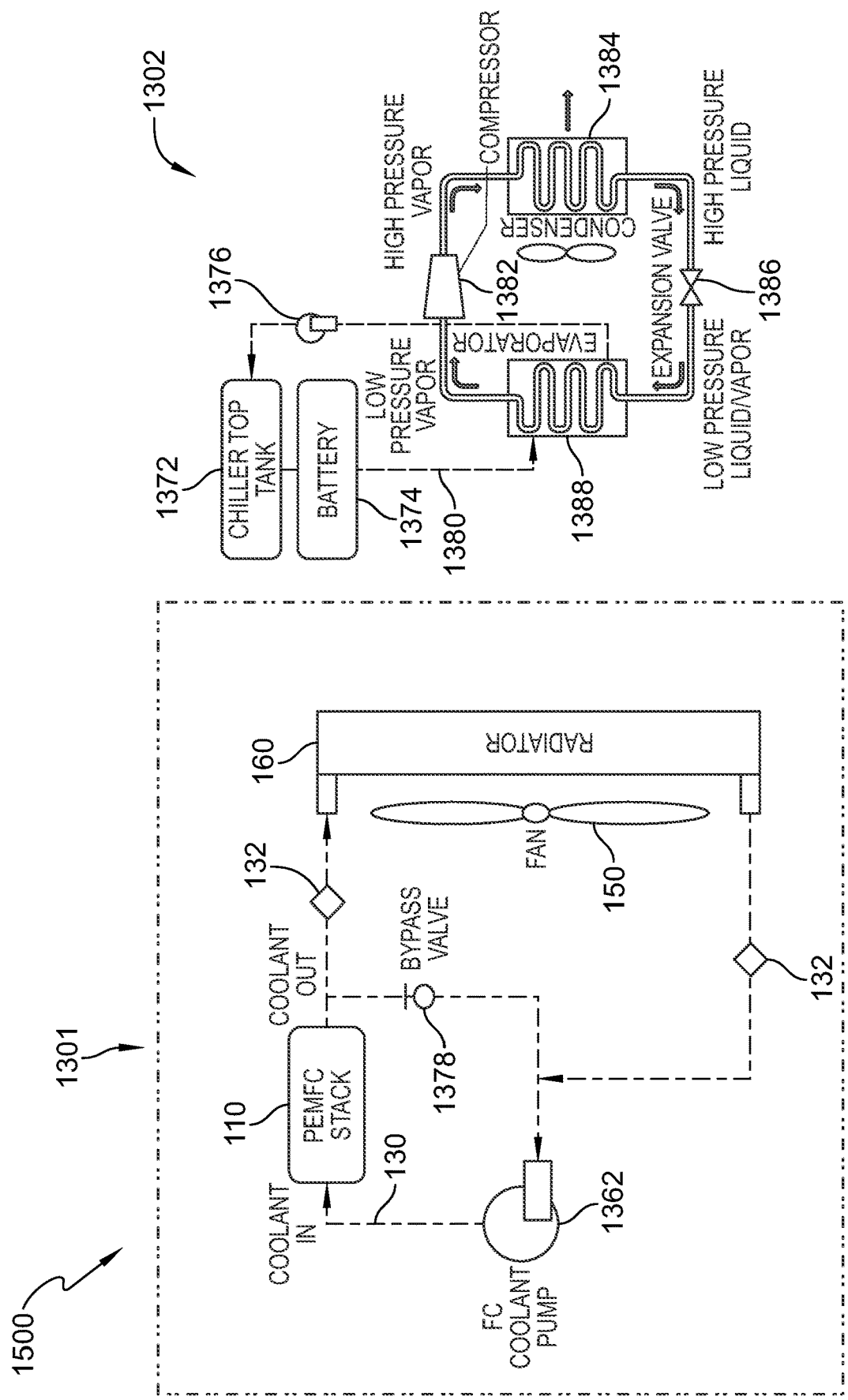
FIG. 15 is a diagram of a heat dissipating system showing the use of a radiator to cool a coolant of a fuel cell system.

FIG. 15 depicts an embodiment of the present heat dissipating system 1500 when the ambient temperature ranges from about 8° C. to about 45° C., including any specific temperature or range of temperatures comprised therein. This heat dissipating system 1500 utilizes the fuel cell circuit 1301 to generate the power necessary to cool the fuel cell coolant 130 to operational temperatures (e.g., about 60° C. to about 65° C.). The battery circuit 1302 of this heat dissipating system embodiment 1500 is separate from the fuel cell system 1301, and is not relied on to warm or cool the fuel cell coolant 130.

Figure 16:
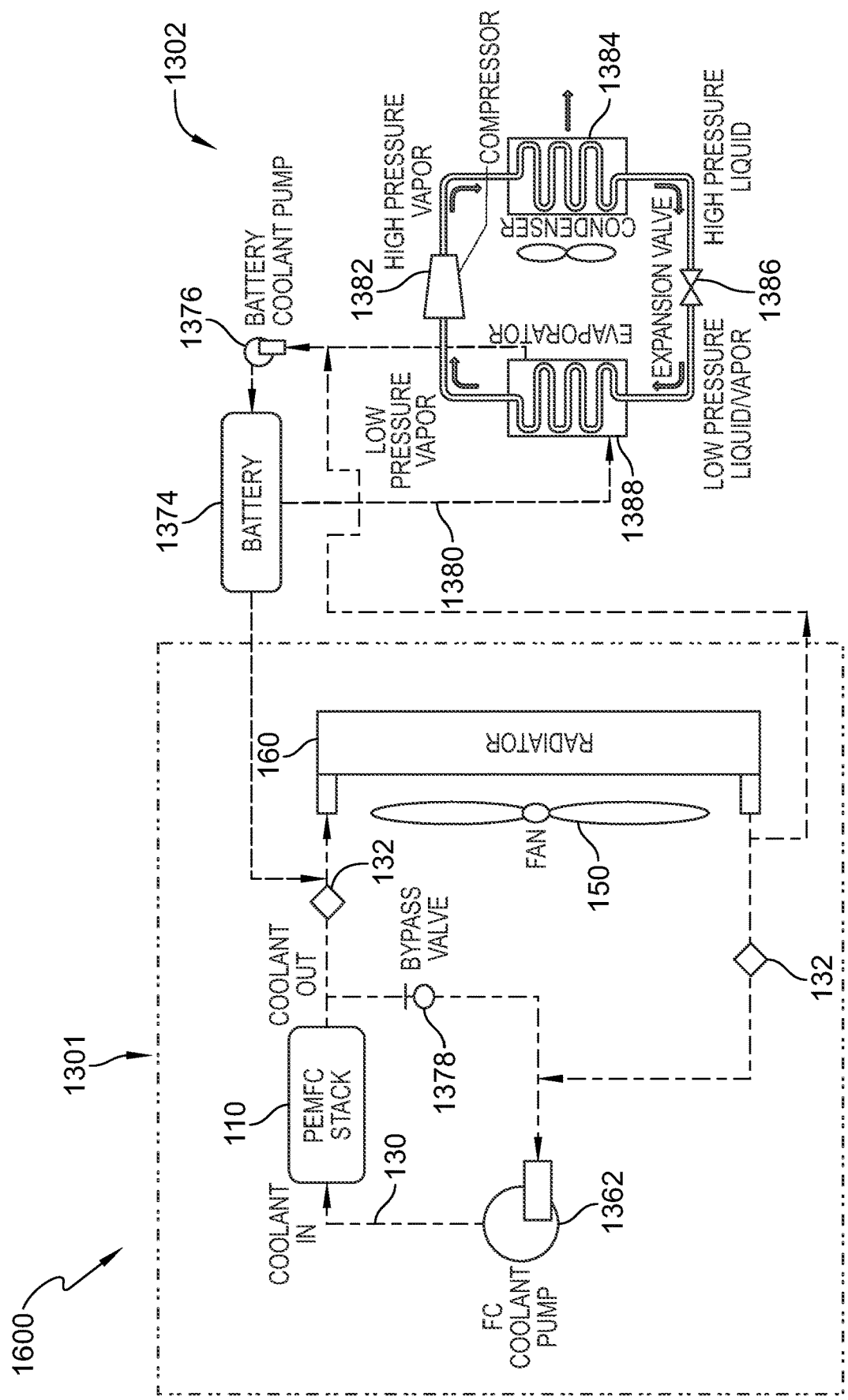
FIG. 16 is a diagram of a heat dissipating system showing the use of a radiator to warm a coolant of a battery thermal management system.

FIG. 16 depicts an embodiment of the present heat dissipating system 1600 when the ambient air temperature is at or below 8° C., including any specific temperature or range of temperatures comprised therein. This heat dissipating system 1600 utilizes both the fuel cell circuit 1301 and the battery circuit 1302 to generate the power necessary to warm the battery coolant 1380 to operational temperatures (e.g., about 60° C. to about 65° C.). No evaporative cooling is used in this embodiment in order to reduce the power consumption and/or power load required by the fuel cell circuit 1301 (e.g., fuel cell stack or system 110) and/or the battery circuit 1302 (e.g., the battery 1374). Instead, the radiator 160 and fuel cell system 110 waste heat is recovered from those components of the fuel cell circuit 1301 in order to heat the battery 1374 and the fuel cell system 110 when ambient air temperature is less than 8° C.

Figure 17:
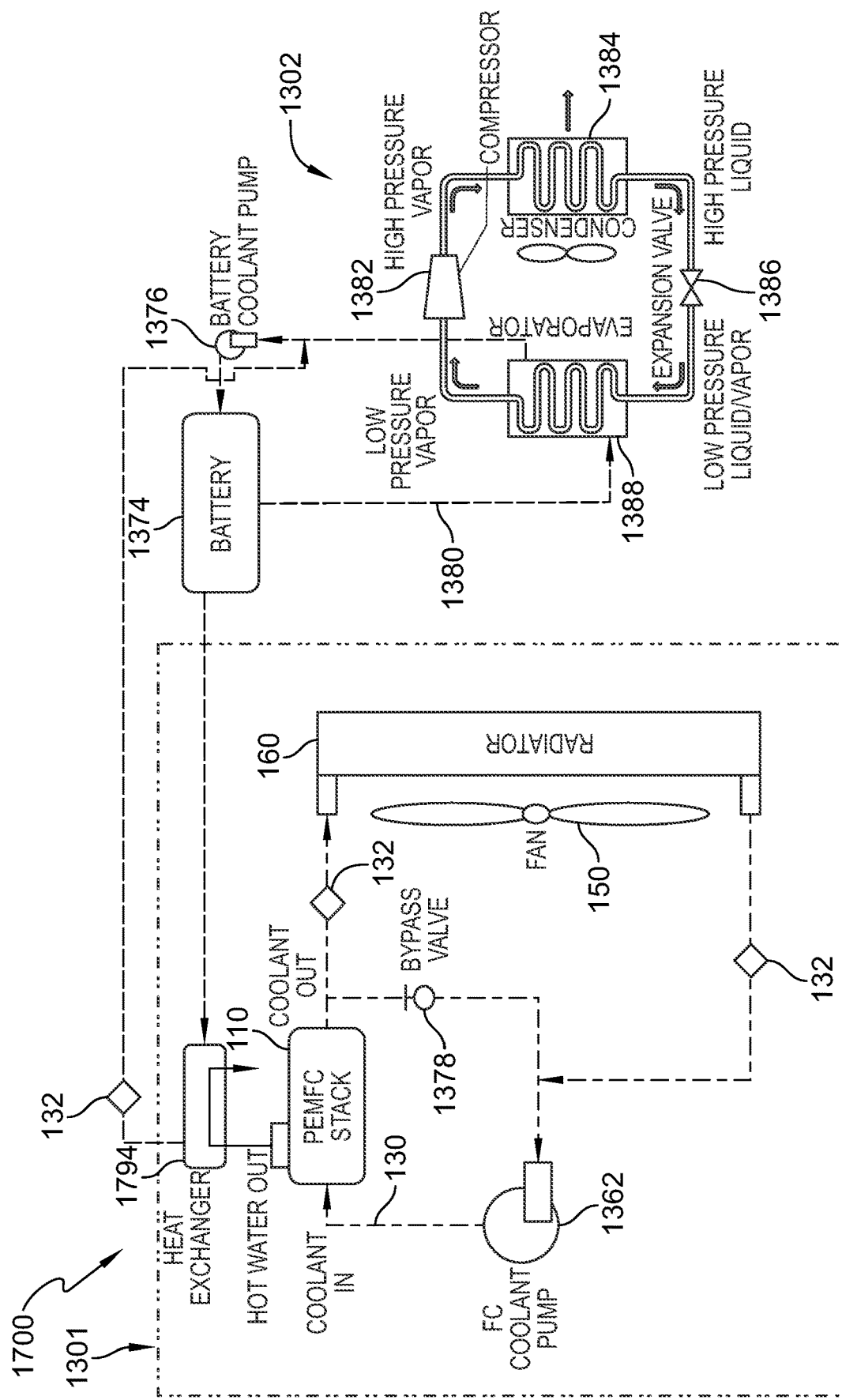
FIG. 17 is a diagram of a heat dissipating system showing the use of a heat exchanger and excess hot water from a fuel cell system to warm a coolant of a battery thermal management system.

Finally, the heat dissipating system 1700 embodiment shown in FIG. 17 was previously described. This embodiment of the heat dissipating system 1700 is utilized at ambient temperatures at or below 8° C. This system 1700 embodiment also comprises a heat exchanger 1794 that utilizes the heat from the fuel cell coolant 130 exiting the fuel cell system 110 to heat the battery 1374. In turn, the battery coolant 1380 is configured to directly pump back into the heat exchanger 1794 and/or the fuel cell stack, system 110, or circuit 1301 in order to directly heat the fuel cell coolant 130.

In one embodiment of the heat dissipating system 100, 200, 300 . . . 1700, a detailed control strategy may be adopted by a controller 1800 to determine when to implement evaporative cooling. In some embodiments, the controller 1800 may have input from various sensors 132 to detect features, characteristics, and values related to operations of the systems 100, 1301, and 1302, including but not limited to coolant temperature, radiator fan speed, fuel cell power, fuel cell coolant 130 temperature target, sump water level, sump pump speed, and vehicle speed.

In some embodiments, the controller 1800 may determine the magnitude of the cooling effect that will be available to the fuel cell system 110 or fuel cell circuit 1301 based on parasitic loads, such as pumps 1376 and fans 150. In some embodiments, if the coolant 130 bypasses the radiator 160, the controller 1800 may determine that it is better to drain the water 140 since the pump 1376 and fans 150 are additional parasitic loads that do not create any additional value to the overall operation. In some embodiments, the controller 1800 is able to optimize usage of the parasitic loads such as the pumps 1376 and fans 150 as compared to the coolant 130 heat dissipation to appropriately determine the amount of water 140 to be made available for evaporative cooling. In some embodiments, the controller 1800 is able to determine water 140 storage in the sump 590, and usage of the pump 592, 1362, 1376 based on such determination.

Figure 18:
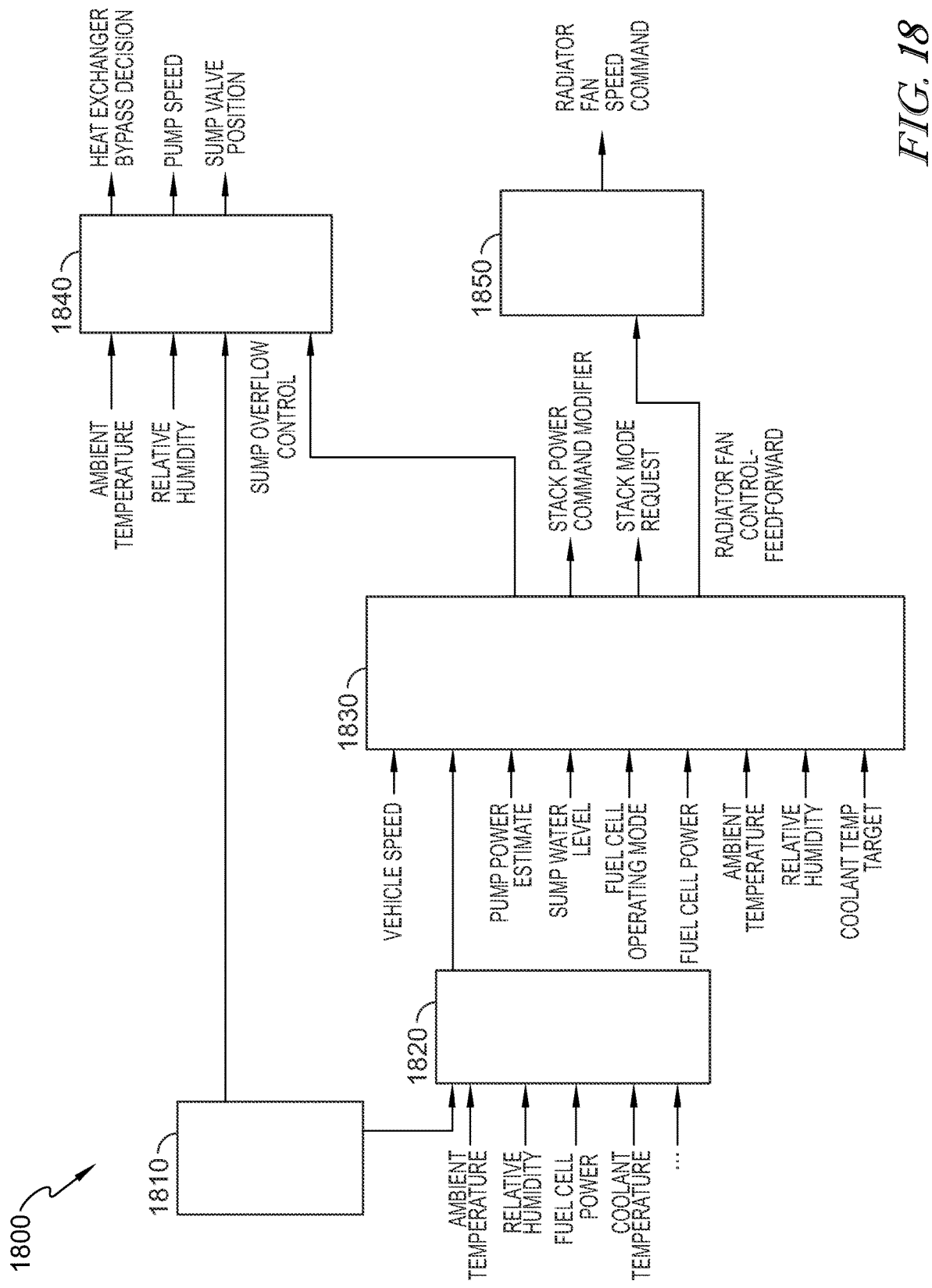
FIG. 18 is a block diagram illustrating a control mechanism implemented in the present methods or heat dissipating systems for determining the use of heat dissipation and evaporative cooling of radiators.

In one embodiment of the controller 1800 of the heat dissipating system 100, 200, 300 . . . 1700, as illustrated in FIG. 18, the controller 1800 can determine in real time, automatically, and/or immediately when it is useful to implement evaporative cooling and how to control various actuators in the system 100, 200, 300 . . . 1700. A heat dissipating system 100, 200, 300 . . . 1700 may be equipped with an look ahead data system. The look ahead data system may provide limited look ahead data and/or information, including road grade, speed limit, road sign, etc. that is incorporated by the controller 1800 to determine when and how to effectuate evaporative cooling.

The controller 1800 may include a look ahead power estimator 1810. A look ahead power estimator 1810 may include algorithms, data, and/or information received from sensors 132 or external sources that translate the look ahead road input or data to a buffer of look ahead power that the controller 1800 uses as input. Look ahead road input may be obtained from any online or publicly available source that is configured to provide data to the controller 1800.

Look ahead data systems may use a global positioning system (GPS) and other onboard stored pre-loaded map data to provide the system controller 1800 a "look ahead window" of information, including but not limited to, upcoming road grade, upcoming speed limit, etc. The look ahead window can be as long as about 2 km and is stored as a rolling buffer of road grade corresponding to the look ahead window. In some embodiments, the look ahead window may be different from about 2 km.

Based on the look ahead power, the controller 1800 may be able to estimate the power required from the fuel cell stack or system 110 or the fuel cell circuit 1301 over any given time frame. If a high power event, which will involve high load to the radiator, is expected in the given time frame, the controller 1800 may store adequate quantity of water 140 ahead of time in a sump 590 to help with heat rejection when the high power event occurs.

As illustrated in FIG. 18, the controller 1800 may also include a fuel cell liquid water estimator 1820. The controller 1800 may have one or more inputs from sensors 132 or other external sources to estimate the fuel cell liquid water 140. The inputs may include, but are not limited to, the ambient temperature, coolant temperature, relative humidity, fuel cell operating mode, fuel cell power, and air flow.

The fuel cell liquid water estimator 1820 may be able to approximate the quantity of liquid water available at the outlet of the stack/fuel cell module. Since ambient conditions and stack operating conditions have an impact on how much liquid water is generated in comparison to the amount of water vapor, the fuel cell liquid water estimator 1820 is an important aspect of the controller 1800 and can help the controller 1800 determine the available water 140 that can be used for evaporative cooling.

As further illustrated in FIG. 18, the output from the fuel cell liquid water estimator 1820 may be used along with other inputs by the controller 1800 to perform an evaporative cooling benefit calculation 1830. The other inputs may be acquired from sensors 132 or other external sources, and may include but are not limited to vehicle speed, pump power, sump water level, fuel cell operating mode, fuel cell power, ambient temperature, relative humidity, and coolant target temperature.

The output from the evaporative cooling benefit calculation may determine the radiator fan speed. The output from the evaporative cooling benefit calculation 1830 may provide input to and/or modify the fuel cell stack power command. The output from the evaporative cooling benefit calculation 1810 may control a sump overflow where the water output from the fuel cell system is collected. The output from the evaporative cooling benefit calculation may provide input to the valves that control the pump connected to the sump or to the exhaust water pump 1840. The valves may have other inputs such as the ambient temperature or relative humidity. The output from the evaporative cooling benefit calculation may provide input to the radiator fan controls 1850.

In some embodiments of the heat dissipating system 100, 200, 300 . . . 1700, if the ambient temperature is below freezing, the controller 1800 may determine that evaporative cooling may not be used. In some embodiments, if the ambient conditions are conducive to the formation of ice, controller 1800 may determine that evaporative cooling may not be used. In some embodiments, based on the ambient temperature, humidity, temperature of the water output, coolant temperature, and/or other metrics, the system controller 1800 and/or the a controller 1800 for the thermal management system 120 may determine the magnitude of cooling effect that is available to the fuel cell system.

In some embodiments, using a psychometric chart that illustrates the physical and thermal properties of moist air, the controller 1800 may be able to estimate the cooling effect provided at specific conditions, such as a specific ambient temperature and/or a specific relative humidity. This estimation of the predicted cooling effect is important for two reasons. First, it is important to ensure that the fuel cell coolant temperature is maintained in congruence with the limitations of the fuel cell system being used. Overcooling and/or overheating the fuel cell system should be avoided to prevent fuel cell stack issues in water management and controls. Thus, operating evaporative cooling as a passive method without implementing a control strategy is not preferred because the lack of a control strategy may result in the overheating or overcooling of the fuel cell system.

Secondly, determining as estimation of the cooling effect that can be achieved by the present heat dissipating system at specific conditions can determine the instances or circumstances when the benefit of decreasing a radiator fan usage outweighs the parasitic load on the system to achieve the said cooling effect.

In one embodiment, obtaining sufficient quantity of liquid water in the exhaust is highly dependent on operation of the fuel cell. Obtaining sufficient amount liquid water may be especially relevant in low humidity conditions (e.g., less than 20%). Operating the fuel cell system at a higher power may lead to more water generation. For example, water output at 90 kW is higher than water output at 45 kW is higher than water output at 25 kW.

In one embodiment, the controller 1800 may constantly estimate the benefit of evaporative cooling. Evaporative cooling may be beneficial if the reduction in fan power needed to maintain coolant temperature is larger than the power needed to operate the pump to push water to the misting apparatus/radiator to enable evaporative cooling. For example, for a 100 kW fuel cell system 110, the output water 140 may be able to absorb about 40 kW power by evaporative cooling. In some embodiments, the amount of heat absorbed by the output water 140 may be different.

The controller 1800 may make a determination as to when it is more beneficial to operate the fuel cell system 110 at a slightly higher power in order to keep an adequate water level in the sump 590 to support evaporative cooling during potential high power events. This may be especially useful in regions of low humidity, such as Southern California and regions in Australia, where low humidity conditions are often associated with high ambient temperatures.

FIGS. 19-22 demonstrate various control strategies, methods, and/or processes that may be utilized with the present heat dissipating system 100 . . . 1700 and/or the controller 1800 to thermally manage, control, and/or maintain a fuel cell system 110 and/or battery 1374. In some embodiments, the controller 1800 and/or a processor, is responsible for generating and/or implementing the present control strategies and/or methods 1900-2200 to thermally manage, control, and/or maintain a fuel cell system 110 and/or battery 1374. The controller 1800 may be utilized to activate and/or deactivate respective cooling or heating modes based on ambient temperature requirements.

Control logic and/or algorithms are typically used by the controller 1800 to optimize and regulate the temperature for both the coolant 130 and ambient air with the help of: 1) evaporative cooling, 2) refrigerant cooling, 3) cold water storage, 4) heated pipes and/or valves, or 5) radiator fan cooling. For example, a control algorithm to optimize the cooling and heating modes of the fuel cell 110 and/or battery 1374 may be utilized and/or implemented by the present system 100 . . . 1700 and/or controller 1800 in order to improve overall efficiency of the fuel cell 110 and/or battery 1374 operation, particularly during low pressure and low temperature fuel cell application, as well as during high temperatures. Multiple cooling systems 100 . . . 1700, strategies, and/or control methods 1900-2200, as controlled by the controller 1800, enable low pressure low temperature fuel cell system 110 usage for and/or during high ambient temperature or high humidity conditions. Therefore, the present systems and methods reduce cost, weight and size of thermal management system compare to conventional thermal management/cooling system.

Figure 19:
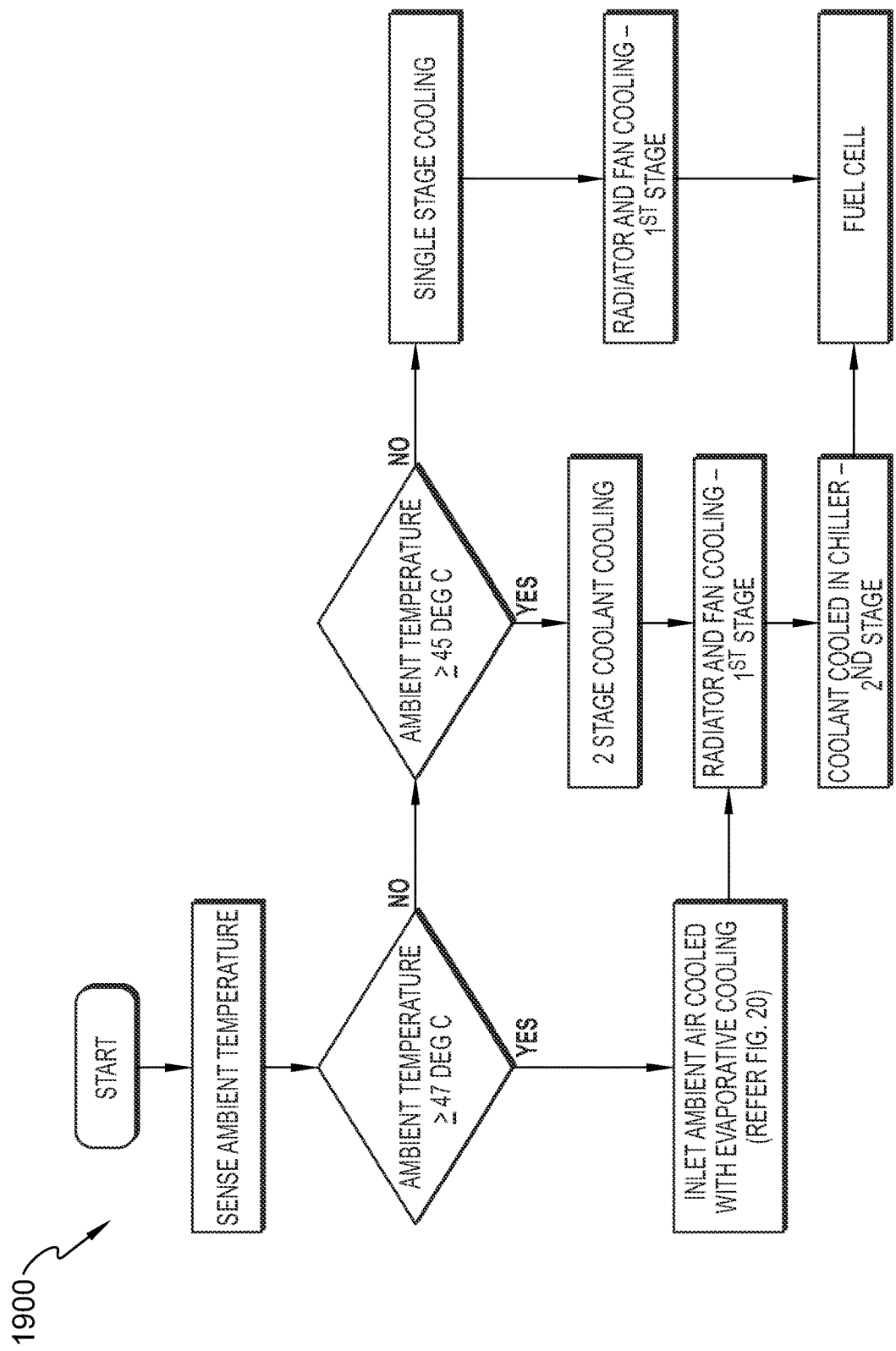
FIG. 19 is a flow chart showing one embodiment of a control strategy for cooling a fuel cell system, stack, or a fuel cell.
Figure 20:
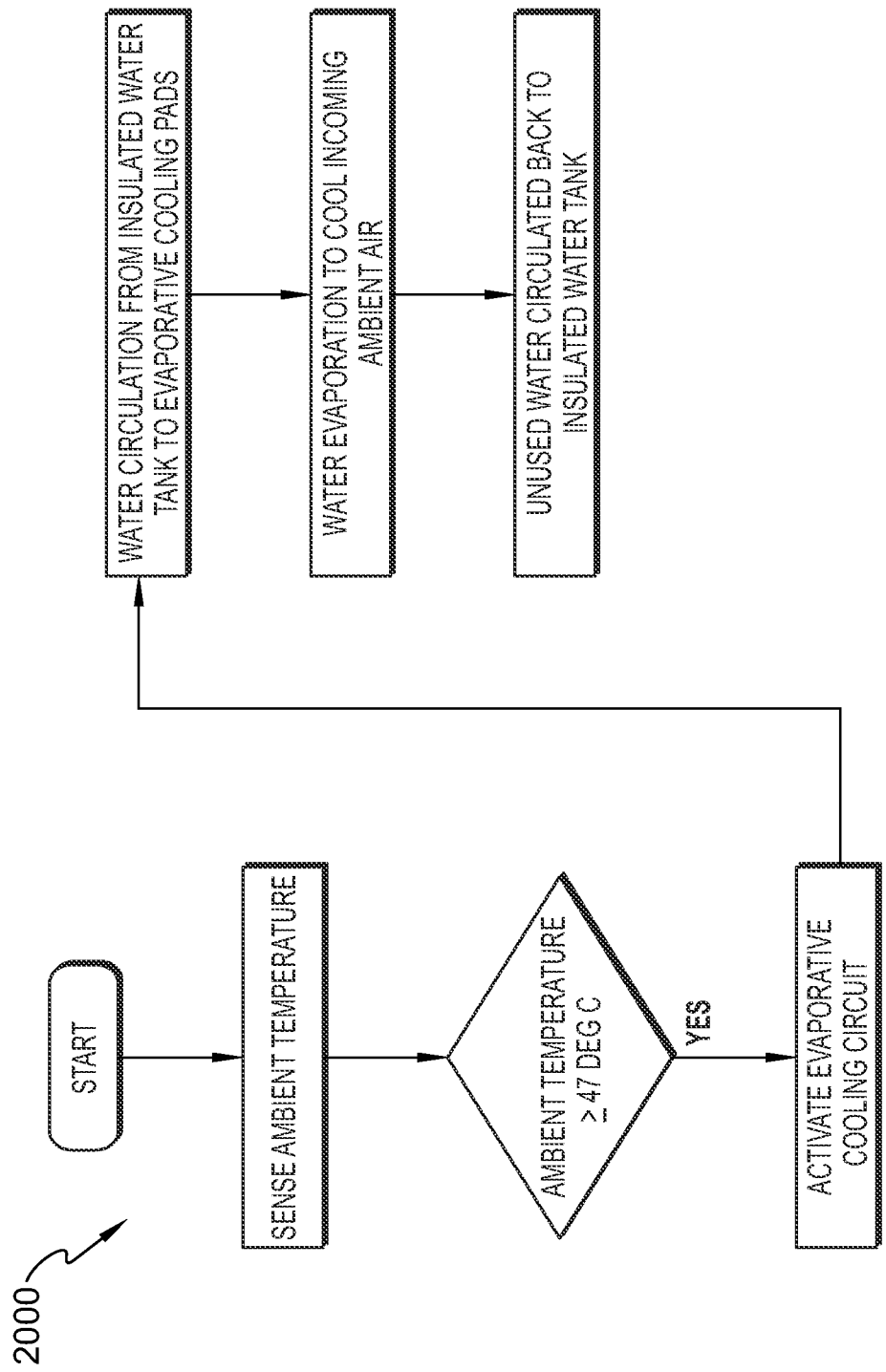
FIG. 20 is a flow chart showing one embodiment of a control strategy for evaporative cooling of a fuel cell system, stack, or a fuel cell.
Figure 21:
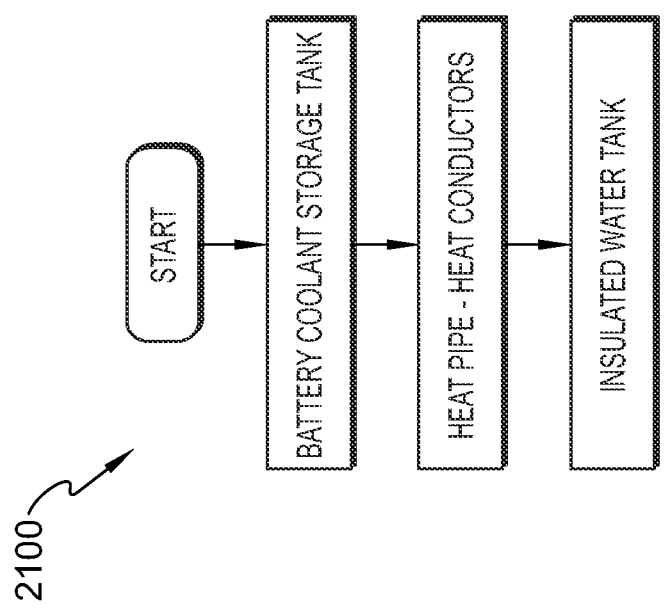
FIG. 21 is a flow chart showing one embodiment of a control strategy for utilizing waste heat recovery and an insulated stored water tank to cool a fuel cell system, stack, or a fuel cell.
Figure 22:
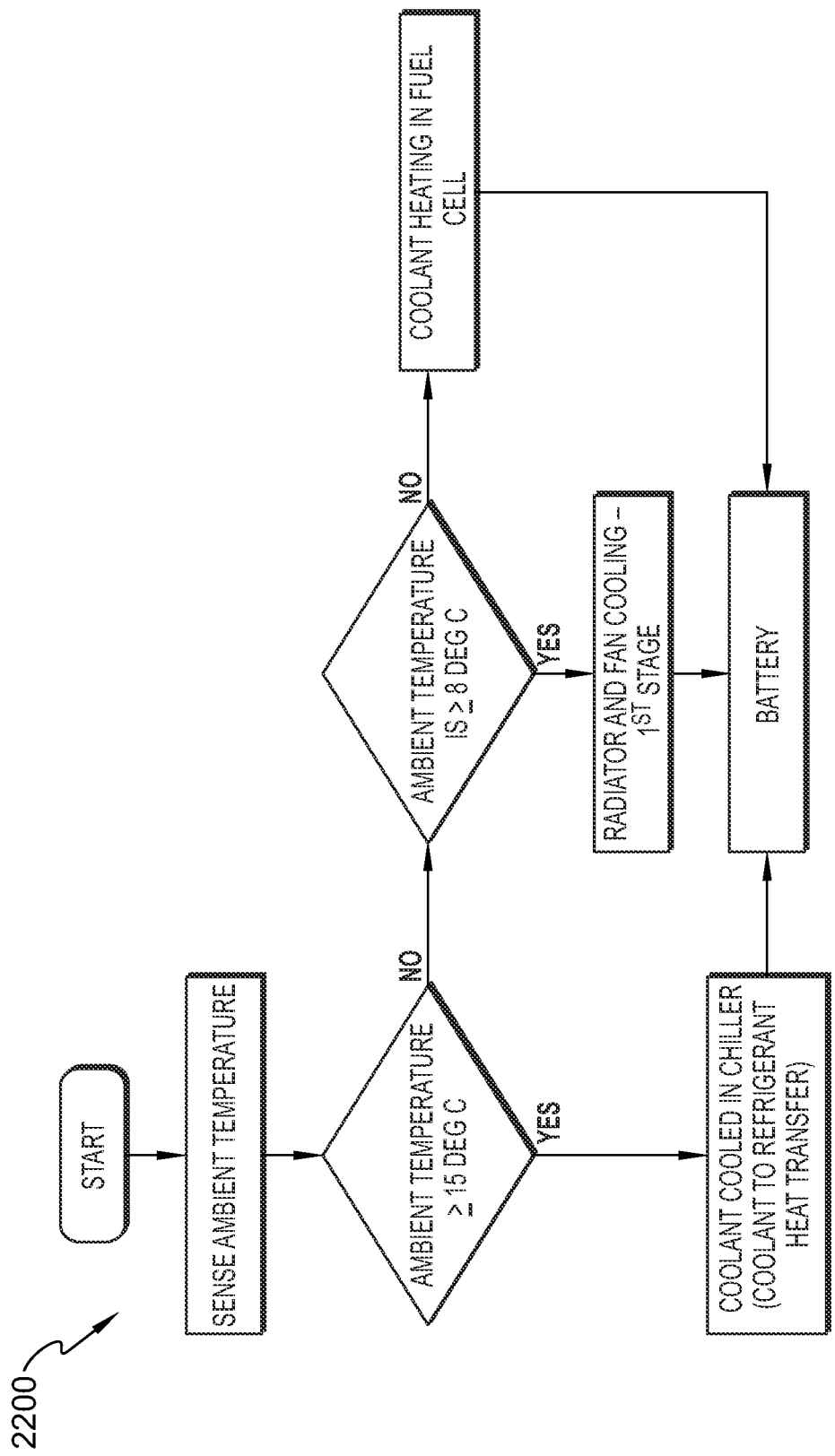
FIG. 22 is a flow chart showing one embodiment of a control strategy for utilizing waste heat recovery to cool a battery.

More specifically, FIG. 19 details one embodiment of a control strategy or method 1900 for cooling a fuel cell system, stack, or a fuel cell 110. FIG. 20 shows one embodiment of a control strategy or method 2000 for evaporative cooling of a fuel cell system, stack, or a fuel cell 110. FIG. 21 demonstrates one embodiment of a control strategy for method 2100 for utilizing waste heat recovery and an insulated stored water tank 1366 to cool a fuel cell system, stack, or a fuel cell 110, as described in detail herein. FIG. 22 shows one embodiment of a control strategy or method 2200 for utilizing waste heat recovery to cool a battery 1374.

Figure 23:
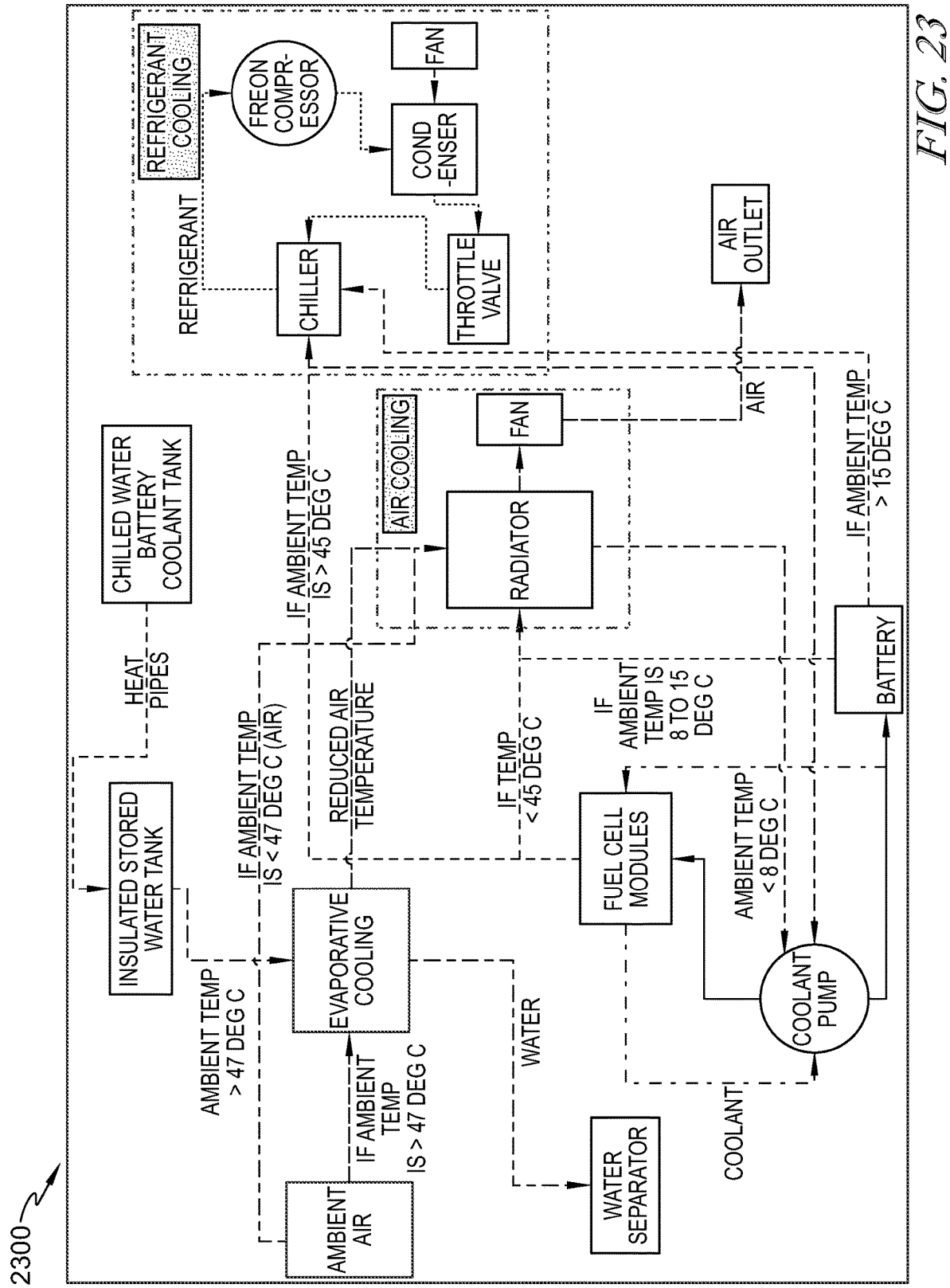
FIG. 23 is a schematic demonstrating one embodiment of thermal management system or method to control a fuel cell and/or a battery in a hybrid vehicle powertrain system.

Multiple thermal management options are used to maintain the coolant temperature within a desired range. One or more of these various control strategies or methods 1900-2200 may be utilized by the controller 1800 and the present heat dissipating system 100 . . . 1700 to thermally manage the heat in a fuel cell system 110 or battery 1374 in a vehicle powertrain embodiment 2300, as shown in FIG. 23. Specific thermal management options and/or control strategies or methods 1900-2200 may be utilized by the controller 1800 and/or the present heat dissipating system 100 . . . 1700 based on their effectiveness at particular ambient temperatures.

For example, in a system 100 . . . 1700 embodiment where the ambient temperature ranges from about 10° C. to about 45° C., including any specific or range of temperatures comprised therein, the fuel cell 110 coolant temperatures may be cooled with the help of radiator 160 and/or fan 150 cooling. If the ambient temperature of the system 100 . . . 1700 ranges from about 45° C. to about 47° C., including any specific or range of temperatures comprised therein, fuel cell 110 and battery 1374 coolant may be cooled with the help of radiator 160—fan 150 and/or refrigerant chiller-based cooling. If the ambient temperature of the system 100 . . . 1700 is greater than about 47° C., ambient air may be cooled with the help of evaporative cooling. Then, the cooled air is used in the radiator 160 to cool the coolant 130. Evaporative cooling may be achieved with the help of chilled water 140 stored in an insulated water storage tank 1366.

Further, in a system 100 . . . 1700 embodiment where the ambient temperature ranges from about 8° C. to about 15° C., including any specific or range of temperatures comprised therein, the battery 1374 coolant 1380 may be cooled with the help of the radiator 160 and fan 150. If the system 100 . . . 1700 embodiment has an ambient temperature that is more than about 15° C., battery 1374 coolant 1380 will be cooled with the help of a chiller top tank 1372. Moreover, if the system 100 . . . 1700 embodiment experiences ambient temperature that is less about 8° C., battery 1374 coolant 1380 will be heated with the help of fuel cell 110 waste heat and recirculated back to battery pack 1374.

Unused chilled coolant 130, 1380 may be stored in a coolant expansion tank or a chiller top tank 1372. The chilled coolant expansion tank or chiller top tank 1372 may comprise one or more heated pipes, such a heat tube 1370. The heated pipes or tube 1370 may function as a heat exchanger and transfer heat from the stored water tank 1366 to keep the water 140 in storage tank 1366 cool.

Figure 24A:
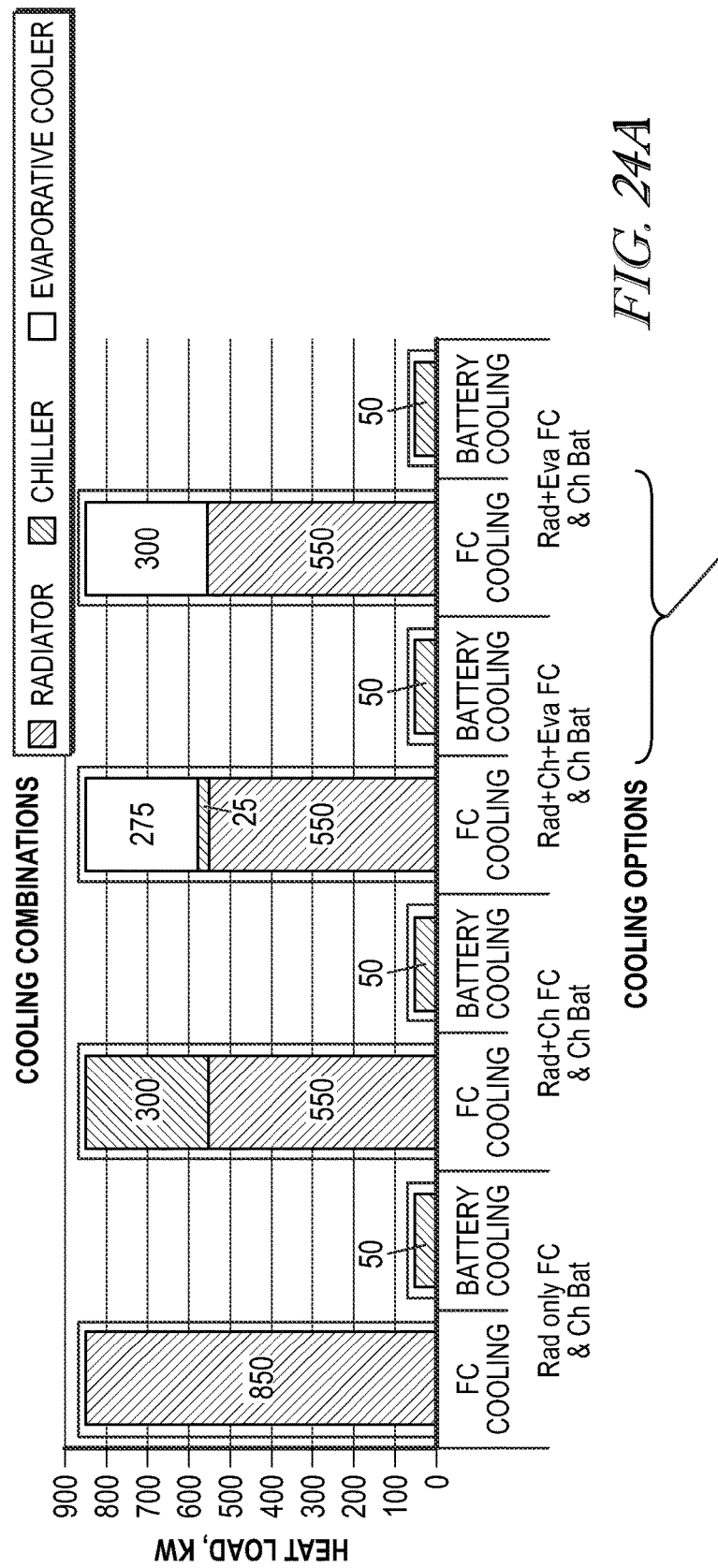
FIG. 24A is a graph demonstrating a comparative study between different component combinations to cool a fuel cell (FC) or battery.
Figure 24B:
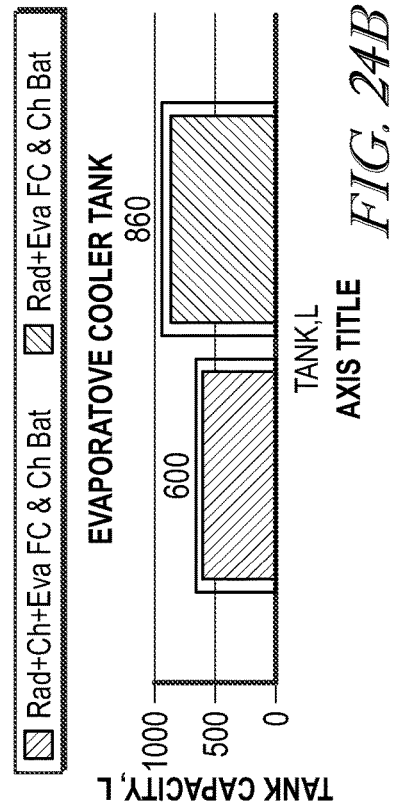
FIG. 24B is a graph demonstrating a comparison of evaporative cooler tank capacity when used in different cooling combinations described in FIG. 24A.

FIGS. 24A and 24B demonstrate a various number of combinations of components that may be utilized to heat or cool a fuel cell 110 and/or a battery 1374 of the present heat dissipating system 100 . . . 1700, preferably in combination with the controller 1800 and/or the control strategies and methods 1900-2200, during start up or operation. FIG. 24A is a graph demonstrating a comparative study between different heat dissipating system 100 . . . 1700 components, including a radiator 160, a chiller 1010 or chiller top tank 1372, and/or an evaporative cooler 1368 (e.g., such as one comprising an evaporative pad 1364). In some embodiments, the chiller 1010 or chiller top tank 1372 may only comprise a battery chiller used only to cool the battery 1374. In other embodiments, the chiller 1010 or chiller top tank 1372 may comprise a battery chiller to cool the battery 1374 and/or a fuel cell chiller to cool the fuel cell 110.

FIG. 24A shows that the various cooling combinations of these components were utilized and tested to cool a fuel cell (FC) 110 or battery 1374. A first cooling combination included a 850 kW of heat and/or power load ("load") from the radiator 160 only to cool the fuel cell (FC) 110 and a 50 kW battery chiller to cool the battery 1374. A second cooling combination included a 550 kW of load from the radiator and 300 kW of load from a fuel cell chiller to cool the fuel cell, along with the 50 kW battery chiller. A third cooling combination included 550 kW of load from the radiator 160, 25 kW of load from a fuel cell chiller, and 275 kW of load from an evaporative cooler 1368 to cool the fuel cell 110, along with the 50 kW battery chiller. A fourth and final cooling combination included 550 kW of load from a radiator 160 and the remaining 300 kW of load from an evaporative cooler 1368 only to cool the fuel cell 110 (i.e., no fuel cell chiller), along with a 50 kW battery chiller.

FIG. 24B is a graph demonstrating a comparison of evaporative cooler 1368 tank capacity when used in the different cooling combinations described in FIG. 24A. Specifically, the third cooling combination required about 275 kW of load from an evaporative cooler 1368 to cool the fuel cell 110, and the evaporative cooler 1368 tank had about 600 L of water cooling capacity to cool the fuel cell. In the fourth cooling combination, the evaporative cooler 1368 supported about 300 kW of cooling load for the fuel cell, and the evaporative cooler 1368 tank had about 860 L of water cooling capacity to cool the fuel cell.

FIGS. 25A, 25C, and 25D demonstrate comparisons of package size, package weight, or price required by the different cooling combinations described in FIG. 24A, respectively. These figures demonstrate that while the third and fourth cooling combinations having the evaporative cooling mechanism (e.g., including the evaporative cooler 1368 and/or evaporative pad 1364) would require the smallest packaging size (i.e., about 16 m$^3$) and have the lightest packaging size (i.e., about 9080-9142 kg). In addition, the third and fourth cooling combinations having the evaporative cooler 1368 were the least expensive (i.e., averaging about 21 million Indian Rupee (INR) or about $30,000 United Stated Dollars (USD) fuel cell cooling options.

Importantly, FIG. 25B also demonstrates that the third and fourth cooling combinations comprising the evaporative cooling mechanisms generate the least amounts of parasitic load (i.e., 95 kW and 102 kW, respectively), as compared to the first and second cooling combinations that did not incorporate evaporative cooling and generated the most parasitic load (i.e., 120 kW and 187 kW, respectively). These data demonstrate that the present heat dissipating systems 100 . . . 1700, controller 1800, and/or control strategies or methods 1900-2200 comprising evaporative cooling are more cost efficient, environmentally friendly, and effective to preserve fuel cell 110 life and/or health for optimal and long-term performance.

Radiator systems 160 are challenged to reject heat to high ambient temperatures when the difference between the ambient temperature and the coolant temperature is not very high. However, such high temperatures, low temperatures, and/or low humidity conditions are favorable for evaporative cooling because evaporative cooling will allow the usage of a radiator 160 size that is typical for lower ambient temperature conditions. Therefore, the size of the radiator 160 will be significantly reduced based on incorporation of the evaporative cooling mechanism of the present in the present heat dissipating system 100 . . . 1700 controller 1800, and/or control methods 1900-2200 described herein, which is advantageous.

Depending on operating conditions such as temperature and humidity, the size of the radiator 160 may be reduced by up to about 40%. In some embodiments, the size of the radiator 160 may be reduced between about 10% and about 40%, including any specific size reduction or range of size reductions comprised therein. In other embodiments, the size of the radiator 160 may be reduced between about 10% and about 20%. In further embodiments, the size of the radiator 160 may be reduced between about 20% and about 30%.

In one embodiment, the evaporative cooling effect can be extended to one or more other radiators 160 and systems on the heat dissipating system 100 . . . 1700. In some embodiments, an evaporative cooling system and method of the present heat dissipating system 100 . . . 1700 may include power electronics cooling, battery cooling, traction system cooling, fuel cell ambient air cooling, or cabin cooling.

In some embodiments, use of water output 140 for evaporative cooling may cause the heat dissipating system 100 . . . 1700 to avoid carrying water weight. In some embodiments, the water output 140 is sprayed on the hottest parts of the radiator 160 to cool. In some embodiments, the systems and apparatus used for evaporative cooling such as pumps 592, 1362, 1376, fans 150, or valves 1386 are not placed in the path of air flow. In some embodiments, the systems and apparatus used for evaporative cooling such as pumps 592, 1362, 1376, fans 150, or valves 1386 are mounted on the top or bottom of the radiator 160.

In one embodiment, as illustrated in FIG. 1, a method of cooling the fuel cell system 110 in a heat dissipating system (100 . . . 1700) may comprise passing a coolant used in a fuel cell system through the radiator 160 and using the water output 140 to dissipate the heat produced by the fuel cell system 110 by producing an evaporative cooling effect on the radiator 160. In some embodiments, if the coolant is bypassing the radiator, the water output 140 from the fuel cell system 110 is drained and not used to create the evaporative cooling effect on the radiator 160.

In one embodiment, as illustrated in FIG. 2, the evaporative cooling effect is created through a wetted medium or membrane intermediary 270. In some embodiments, as illustrated in FIG. 3, the evaporative cooling effect is created through a mister 380. In some embodiments, as illustrated in FIG. 4, the evaporative cooling effect is created through both a wetted medium, membrane, or membrane intermediary 270 and a mister 380.

In one embodiment, as illustrated in FIG. 5, the method of cooling the fuel cell system 110 in a heat dissipating system (100 . . . 1700) may comprise collecting the water 140 produced by the fuel cell system 110 in a sump 590 before using the water 140 to create the evaporative cooling effect on the radiator 160.

In one embodiment, as illustrated in FIG. 5, the method of cooling the fuel cell system 110 in a heat dissipating system (100 . . . 1700) may comprise passing the water 140 collected in the sump 590 through a pump 592 before using the water 140 to create the evaporative cooling effect on the radiator 160.

In one embodiment, as illustrated in FIG. 6, the method of cooling the fuel cell system 110 in a heat dissipating system (100 . . . 1700) may comprise passing the water 140 collected in the sump 590 through a heat exchanger 694. The coolant 130 is passed through the heat exchanger 694 before being passed through the radiator 160.

In one embodiment, as illustrated in FIG. 7, the method of cooling the fuel cell system 110 in a heat dissipating system (100 . . . 1700) may comprise passing the water 140 collected in the sump 590 through a heat exchanger 694 before the water 140 is passed through the radiator 160. The coolant 130 is passed through the heat exchanger 694 before the coolant 130 is passed through the radiator 160.

In one embodiment, as illustrated in FIG. 8, the method of cooling the fuel cell system 110 in a heat dissipating system (100 . . . 1700) may comprise passing the water 140 collected in the sump 590 directly through to the radiator 160 or passing the water 140 to the radiator 160 after passing it through a heat exchanger 694. The coolant 130 is passed through the heat exchanger 694 before the coolant is passed through the radiator 160.

In one embodiment, as illustrated in FIG. 9, the method of cooling the fuel cell system 110 in a heat dissipating system (100 . . . 1700) may comprise passing the water 140 to a heat exchanger 990 with a battery thermal management system before using the water 140 to create an evaporative cooling effect on the radiator 160 through a wetted medium or membrane intermediary 270 and a mister 380.

In one embodiment, as illustrated in FIG. 10, the method of cooling the fuel cell system 110 in a heat dissipating system (100 . . . 1700) may comprise passing the water 140 to a chiller 1010 with a refrigerant loop before using the water 140 to create an evaporative cooling effect on the radiator 160 through a wetted medium or membrane intermediary 270 and a mister 380.

In one embodiment, as illustrated in FIG. 11, the method of cooling the fuel cell system 110 in a heat dissipating system (100 . . . 1700) may comprise passing the exhaust and water 140 through a mechanical cyclonic separator 1110 prior to the water 140 being collected in the sump 590 and used to create an evaporative cooling effect on the radiator 160.

In one embodiment, as illustrated in FIG. 12, the method of cooling the fuel cell system 110 in a heat dissipating system (100 . . . 1700) may comprise passing the exhaust and water 140 through a mechanical cyclonic separator 1110 prior to the water 140 being pumped by the pump 592 to an integrated sump and coolant reservoir 1220. The water 140 collected on the top section 1222 of the integrated sump and coolant reservoir 1220 used to create an evaporative cooling effect on the radiator 160.

In one embodiment, as illustrated in FIG. 13, the method of cooling the fuel cell system 110 in a heat dissipating system (100 . . . 1700) may comprise cooling excess water 140 with a heat exchanger 1370 and battery circuit coolant 1380 (e.g., water) and distributing the cooled water 140 over a radiator 160.

In one embodiment, as illustrated in FIG. 14, the method of cooling the fuel cell system 110 in a heat dissipating system (100 . . . 1700) may comprise utilizing both a fuel cell circuit 1301 and a battery circuit 1302 to generate the power necessary to cool the coolant 130 to operational temperatures.

In one embodiment, as illustrated in FIG. 15, the method of cooling the fuel cell system 110 in a heat dissipating system (100 . . . 1700) may comprise utilizing a fuel cell circuit 1301 to generate the power necessary to cool the coolant 130 to operational temperatures.

In one embodiment, as illustrated in FIG. 16, the method of heating the fuel cell system 110 in a heat dissipating system (100 . . . 1700) may comprise utilizing a fuel cell circuit 1301 and a battery circuit 1302 to generate the power necessary to warm the battery circuit coolant 1380 to operational temperatures.

In another embodiment, as illustrated in FIG. 17, the method of cooling the fuel cell system 110 in a heat dissipating system (100 . . . 1700) may comprise utilizing a fuel cell circuit 1301, a battery circuit 1302, and a heat exchanger 1794 to warm the battery circuit coolant 1380 and the battery 1374 to operational temperatures.

In one embodiment, the method of cooling the fuel cell system 110 in a heat dissipating system (100 . . . 1700) may comprise using a controller 1800 as illustrated in FIG. 18 to determine in real time when to create an evaporative cooling effect on the radiator 160.

As illustrated in FIGS. 19-22, various control strategies, methods, and/or processes 1900-2200 that may be utilized with the present heat dissipating system 100 . . . 1700 and/or the controller 1800 to thermally manage, control, and/or maintain a fuel cell system 110 and/or battery 1374. One or more of these various control strategies or methods 1900-2200 may be utilized by the controller 1800 and the present heat dissipating system 100 . . . 1700 to thermally manage the heat in a fuel cell system 110 or battery 1374 in a vehicle powertrain embodiment 2300, as illustrated in FIG. 23.

FIGS. 24A and 24B illustrate a various number of combinations of components that may be utilized to heat or cool a fuel cell 110 and/or a battery 1374 of the present heat dissipating system 100 . . . 1700, preferably in combination with the controller 1800 and/or the control strategies and methods 1900-2200, during start up or operation. Illustrated in FIGS. 25A, 25B, 25C, and 25D are comparisons of package size, parasitic load, package weight, or price required by the different cooling combinations described in FIG. 24A, respectively.

The following numbered embodiments are contemplated and non-limiting:

1. A method of dissipating heat in a system comprising (i) passing a coolant used in a fuel cell system through a radiator, (ii) dissipating heat produced by the fuel cell system by using water output from the fuel cell system, (iii) evaporating the water output from the fuel cell system, and (iv) cooling the radiator by the evaporated water output from the fuel cell system to produce an evaporative cooling effect.

2. A heat dissipating system comprising: (i) a fuel cell system; (ii) a coolant; (iii) water output from the fuel cell system; and (iv) a radiator; wherein the water output from the fuel cell system is used to dissipate heat by evaporative cooling of the raditor through which the coolant passed.

3. The method and/or heat dissipating system of clause 1 and/or 2, any other suitable clauses, or any combination of suitable clauses, wherein the method further comprises collecting the water produced by the fuel cell system in a sump before using the water to create the evaporative cooling effect on the radiator.

4. The method and/or heat dissipating system of clause 3, any other suitable clauses, or any combination of suitable clauses, further comprising passing the water collected in the sump through a pump before using the water to create the evaporative cooling effect on the radiator.

5. The method and/or heat dissipating system of clause 4, any other suitable clauses, or any combination of suitable clauses, wherein the pump is not placed in the path of airflow.

6. The method and/or heat dissipating system of clause 4, any other suitable clauses, or any combination of suitable clauses, wherein the pump is mounted on the top and/or on the bottom of the radiator.

7. The method and/or heat dissipating system of clause 3, any other suitable clauses, or any combination of suitable clauses, further comprising passing the water collected in the sump through a heat exchanger and passing the coolant through the heat exchanger before the coolant is passed through the radiator.

8. The method and/or heat dissipating system of clause 7, any other suitable clauses, or any combination of suitable clauses, wherein the heat exchanger transfers heat to the water from the coolant.

9. The method and/or heat dissipating system of clause 3, any other suitable clauses, or any combination of suitable clauses, further comprising passing the water collected in the sump through the heat exchanger before the water is passed through the radiator, and passing the coolant through the heat exchanger before the coolant is passed through the radiator.

10. The method and/or heat dissipating system of clause 3, any other suitable clauses, or any combination of suitable clauses, further comprising passing the water collected in the sump directly through to the radiator or after passing the water through the heat exchanger, and passing the coolant through the heat exchanger before the coolant is passed through the radiator.

11. The method and/or heat dissipating system of clause 3, any other suitable clauses, or any combination of suitable clauses, wherein collecting the water produced by the fuel cell system in the sump comprises using a look ahead estimator.

12. The method and/or heat dissipating system of clause 3, any other suitable clauses, or any combination of suitable clauses, wherein the sump is attached to the pump to drive the water against gravity to the radiator.

13. The method and/or heat dissipating system of clause 3, any other suitable clauses, or any combination of suitable clauses, wherein the sump stores water.

14. The method and/or heat dissipating system of clause 3, any other suitable clauses, or any combination of suitable clauses, wherein the sump has a water dump.

15. The method and/or heat dissipating system of clause 14, any other suitable clauses, or any combination of suitable clauses, wherein the water dump is controlled by a water control device, an electrically actuated valve, a mechanically actuated valve, or another mechanism.

16. The method and/or heat dissipating system of clause 3, any other suitable clauses, or any combination of suitable clauses, wherein the sump is an integrated sump and coolant reservoir.

17. The method and/or heat dissipating system of clause 16, any other suitable clauses, or any combination of suitable clauses, wherein the integrated sump and coolant reservoir comprises a water reservoir and/or a coolant reservoir.

18. The method and/or heat dissipating system of clause 17, any other suitable clauses, or any combination of suitable clauses, wherein the water reservoir is located on a first, top section of the integrated sump and coolant reservoir.

19. The method and/or heat dissipating system of clause 17, any other suitable clauses, or any combination of suitable clauses, wherein the coolant reservoir is located at the bottom of the integrated sump and coolant reservoir.

20. The method and/or heat dissipating system of clause 1 and/or 2, any other suitable clauses, or any combination of suitable clauses, wherein the method and/or heat dissipating system further comprises a controller.

21. The method and/or heat dissipating system of clause 20, any other suitable clauses, or any combination of suitable clauses, wherein the controller communicates with one or more actuators in the fuel cell system.

22. The method and/or heat dissipating system of clause 20, any other suitable clauses, or any combination of suitable clauses, wherein the controller communicates with sensors providing information selected from the group consisting of coolant temperature, radiator fan speed, fuel cell power, fuel cell coolant temperature target, sump water level, sump pump speed, and vehicle speed.

23. The method and/or heat dissipating system of clause 22, any other suitable clauses, or any combination of suitable clauses, wherein the sensors includes one or more sensors.

24. The method and/or heat dissipating system of clause 22, any other suitable clauses, or any combination of suitable clauses, wherein the sensors are comprised by the heat dissipating system and/or a thermal management system.

25. The method and/or heat dissipating system of clause 22, any other suitable clauses, or any combination of suitable clauses, wherein the sensors are configured to be couled, connected, and/or attached to one or more components of the heat dissipating system and/or the thermal management system.

26. The method and/or heat dissipating system of clause 22, any other suitable clauses, or any combination of suitable clauses, wherein the sensors are coupled to a fuel cell system, a radiator, and/or a thermal management system.

27. The method and/or heat dissipating system of clause 22, any other suitable clauses, or any combination of suitable clauses, wherein the sensors detect, ascertain, and/or measure features, characteristics, parameters, metrics, and/or values related to operations of the heat dissipating system, the thermal management system, the fuel cell system, the radiator and/or any other related components and/or systems.

28. The method and/or heat dissipating system of clause 27, any other suitable clauses, or any combination of suitable clauses, wherein the features, characteristics, parameters, metrics, and/or values are ambient temperature, coolant temperature, relative humidity, radiator fan speed, fuel cell coolant temperature target, fuel cell operating mode, fuel cell power, pump power, sump water level, sump pump speed, air flow, vehicle seed, and an other feature, characteristic, parameter, metric, and/or value that is detectable, ascertainable, and/or measurable by and/or from the heat dissipating system, the thermal management system, the fuel cell system, the radiator and/or any other related components and/or systems.

29. The method and/or heat dissipating system of clause 27, any other suitable clauses, or any combination of suitable clauses, wherein the features, characteristics, parameters, metrics, and/or values are inputs to the controller.

30. The method and/or heat dissipating system of clause 22, any other suitable clauses, or any combination of suitable clauses, wherein the sensors are temperature sensors, flow sensors, or any other sensor known in the art.

31. The method and/or heat dissipating system of clause 30, any other suitable clauses, or any combination of suitable clauses, wherein the temperature sensors capture heat and/or temperature data.

32. The method and/or heat dissipating system of clause 30, any other suitable clauses, or any combination of suitable clauses, wherein the temperature sensors communicate the heat and/or temperature data to the controller in the heat dissipating system and/or the thermal management system.

33. The method and/or heat dissipating system of clause 20, any other suitable clauses, or any combination of suitable clauses, wherein the controller comprises a look ahead power estimator, a fuel cell water estimator, or an evaporative cooling benefit calculator.

34. The method and/or heat dissipating system of clause 33, any other suitable clauses, or any combination of suitable clauses, wherein the fuel cell liquid water estimator receives input or communication from the look ahead power estimator.

35. The method and/or heat dissipating system of clause 33, any other suitable clauses, or any combination of suitable clauses, wherein the fuel cell liquid water estimator approximates the quantity of liquid water available at an outlet of the fuel cell stack.

36. The method and/or heat dissipating system of clause 33, any other suitable clauses, or any combination of suitable clauses, wherein the fuel cell liquid water estimator helps the controller determine available water that can be used for evaporative cooling.

37. The method and/or heat dissipating system of clause 33, any other suitable clauses, or any combination of suitable clauses, wherein the evaporative cooling benefit calculator receives input or communication from the fuel cell liquid water estimator, provides input or communicates with a valve or a pump controller, and/or provides input to a radiator fan controller.

38. The method and/or heat dissipating system of clause 33, any other suitable clauses, or any combination of suitable clauses, wherein the evaporative cooling benefit calculator utilizes the quantity of liquid water available at the outlet of the fuel cell stack and other inputs received by the controller.

39. The method and/or heat dissipating system of clause 38, any other suitable clauses, or any combination of suitable clauses, wherein the other inputs are acquired from the sensors and/or other external sources.

40. The method and/or heat dissipating system of clause 38, any other suitable clauses, or any combination of suitable clauses, wherein the inputs include vehicle speed, pump power, sump water level, fuel cell operating mode, fuel cell power, ambient temperature, relative humidity, and coolant target temperature.

41. The method and/or heat dissipating system of clause 33, any other suitable clauses, or any combination of suitable clauses, wherein the evaporative cooling benefit calculator provides an output.

42. The method and/or heat dissipating system of clause 41, any other suitable clauses, or any combination of suitable clauses, wherein the output of the evaporative cooling benefit calculator determines the radiator fan speed, provides input to and/or modifies the fuel cell stack power command, controls a sump overflow, provides input to valves that control the pump connected to the sump or the exhaust water pump, and/or provides input to the radiator fan controls.

43. The method and/or heat dissipating system of clause 42, any other suitable clauses, or any combination of suitable clauses, wherein the sump overflow collects water output from the fuel cell system.

44. The method and/or heat dissipating system of clause 42, any other suitable clauses, or any combination of suitable clauses, wherein the valves provide inputs of ambient temperature, relative humidity, and/or other inputs.

45. The method and/or heat dissipating system of clause 42, any other suitable clauses, or any combination of suitable clauses, wherein the valves are not placed in the path of air flow.

46. The method and/or heat dissipating system of clause 42, any other suitable clauses, or any combination of suitable clauses, wherein the valves are mounted on the top and/or on the bottom of the radiator.

47. The method and/or heat dissipating system of clause 33, any other suitable clauses, or any combination of suitable clauses, wherein the evaporative cooling benefit calculator includes a calculation.

48. The method and/or heat dissipating system of clause 33, any other suitable clauses, or any combination of suitable clauses, wherein the look ahead power estimator includes algorithms, data, and/or information received from the sensors and/or external sources.

49. The method and/or heat dissipating system of clause 48, any other suitable clauses, or any combination of suitable clauses, wherein the sensors and/or external sources translate look ahead road input or data to a buffer of look ahead power that the controller uses as input.

50. The method and/or heat dissipating system of clause 49, any other suitable clauses, or any combination of suitable clauses, wherein look ahead road input is obtained from any online or publicly available source that is configured to provide data to the controller.

51. The method and/or heat dissipating system of clause 20, any other suitable clauses, or any combination of suitable clauses, wherein the controller estimates the power required from the fuel cell system over any given time frame based on the look ahead power.

52. The method and/or heat dissipating system of clause 51, any other suitable clauses, or any combination of suitable clauses, wherein the power estimated is a high power event.

53. The method and/or heat dissipating system of clause 52, any other suitable clauses, or any combination of suitable clauses, wherein the high power event involves high load to the radiator.

54. The method and/or heat dissipating system of clause 52, any other suitable clauses, or any combination of suitable clauses, wherein the high power event causes the controller to store an adequate quantity of water ahead of time in the sump.

55. The method and/or heat dissipating system of clause 20, any other suitable clauses, or any combination of suitable clauses, wherein the controller includes a heat dissipating system controller, a system controller, and/or a thermal management system controller.

56. The method and/or heat dissipating system of clause 20, any other suitable clauses, or any combination of suitable clauses, wherein the controller has access to heat and/or temperature data to control internal coolants.

57. The method and/or heat dissipating system of clause 20, any other suitable clauses, or any combination of suitable clauses, wherein the controller controls any external water, air, and/or heat management.

58. The method and/or heat dissipating system of clause 20, any other suitable clauses, or any combination of suitable clauses, wherein the controller adopts a detailed control strategy.

59. The method and/or heat dissipating system of clause 58, any other suitable clauses, or any combination of suitable clauses, wherein the detailed control strategy determines when to implement evaporative cooling.

60. The method and/or heat dissipating system of clause 20, any other suitable clauses, or any combination of suitable clauses, wherein the controller has input from the sensors.

61. The method and/or heat dissipating system of clause 20, any other suitable clauses, or any combination of suitable clauses, wherein the controller determines the magnitude of the cooling effect that will be available to the fuel cell system based on parasitic loads, pumps and/or fans.

62. The method and/or heat dissipating system of clause 20, any other suitable clauses, or any combination of suitable clauses, wherein the controller determines to drain the water output if the coolant bypasses the radiator.

63. The method and/or heat dissipating system of clause 20, any other suitable clauses, or any combination of suitable clauses, wherein the controller optimizes usage of the parasitic loads, pumps, and/or fans to determine the amount of water to be made available for evaporative cooling.

64. The method and/or heat dissipating system of clause 20, any other suitable clauses, or any combination of suitable clauses, wherein the controller determines water storage in the sump and the usage of the pump.

65. The method and/or heat dissipating system of clause 20, any other suitable clauses, or any combination of suitable clauses, wherein the controller determines in real time when it is useful to implement the evaporative cooling system and how to control various actuators in the system.

66. The method and/or heat dissipating system of clause 20, any other suitable clauses, or any combination of suitable clauses, wherein the controller estimates the fuel cell liquid water with inputs from the sensors and/or external sources.

67. The method and/or heat dissipating system of clause 66, any other suitable clauses, or any combination of suitable clauses, wherein the inputs include ambient temperature, coolant temperature, relative humidity, fuel cell operating mode, fuel cell power, and air flow.

68. The method and/or heat dissipating system of clause 20, any other suitable clauses, or any combination of suitable clauses, wherein the controller determines that no evaporative cooling is used when the ambient temperature is below freezing, and/or when the ambient temperature causes the formation of ice.

69. The method and/or heat dissipating system of clause 20, any other suitable clauses, or any combination of suitable clauses, wherein the controller determines a magnitude of cooling effect that is available to the fuel cell system.

70. The method and/or heat dissipating system of clause 69, any other suitable clauses, or any combination of suitable clauses, wherein the magnitude of cooling effect is based on ambient temperature, humidity, temperature of the water output, coolant temperature, and/or other metrics.

71. The method and/or heat dissipating system of clause 20, any other suitable clauses, or any combination of suitable clauses, wherein the controller estimates the cooling effect provided at specific conditions, specific ambient temperature, and/or specific relative humidity.

72. The method and/or heat dissipating system of clause 71, any other suitable clauses, or any combination of suitable clauses, wherein the estimation of the cooling effect provided at specific conditions is achieved with a psychometric chart.

73. The method and/or heat dissipating system of clause 72, any other suitable clauses, or any combination of suitable clauses, wherein the psychometric chart illustrates the physical and thermal properties of moist air.

74. The method and/or heat dissipating system of clause 71, any other suitable clauses, or any combination of suitable clauses, wherein the estimation of the cooling effect provided at specific conditions ensures that the fuel cell coolant temperature is maintained in congruence with the limitations of the fuel cell system.

75. The method and/or heat dissipating system of clause 71, any other suitable clauses, or any combination of suitable clauses, wherein the estimation of the cooling effect provided at specific conditions determines instances or circumstances when the benefit of decreasing a radiator fan usage outweighs the parasitic load on the system to achieve the cooling effect.

76. The method and/or heat dissipating system of clause 20, any other suitable clauses, or any combination of suitable clauses, wherein the controller constantly estimates the benefit of evaporative cooling.

77. The method and/or heat dissipating system of clause 20, any other suitable clauses, or any combination of suitable clauses, wherein the controller determines when it is more beneficial to operate the fuel cell system at a slightly higher power in order to keep an adequate water level in the sump during potential high power events.

78. The method and/or heat dissipating system of clause 1 and/or 2, any other suitable clauses, or any combination of suitable clauses, wherein the method and/or heat dissipating system further comprises determining an ambient temperature, wherein water produced by the fuel cell system is not used for evaporative cooling of the radiator when the ambient temperature is below freezing.

79. The method and/or heat dissipating system of clause 1 and/or 2, any other suitable clauses, or any combination of suitable clauses, wherein the method and/or heat dissipating system further comprises determining a magnitude of the evaporative cooling effect on the radiator by the system controller or the thermal management controller.

80. The method and/or heat dissipating system of clause 79, any other suitable clauses, or any combination of suitable clauses, The method and/or heat dissipating system of clause 1 and/or 2, any other suitable clauses, or any combination of suitable clauses, wherein the method and/or heat dissipating system further comprises operating at least one pump and/or one radiator fan.

81. The method and/or heat dissipating system of clause 80, any other suitable clauses, or any combination of suitable clauses, further comprising determining a parasitic load of the at least one pump or one radiator fan on the evaporative cooling effect of the radiator by the system controller or the thermal management controller.

82. The method and/or heat dissipating system of clause 81, any other suitable clauses, or any combination of suitable clauses, further comprising optimizing usage of the at least one pump or one radiator fan and determining an amount of water produced by the fuel cell system needed for evaporative cooling effect on the radiator by the system controller or the thermal management controller.

83. The method and/or heat dissipating system of clause 1 and/or 2, any other suitable clauses, or any combination of suitable clauses, wherein the method and/or heat dissipating system further comprises the heat exchanger, wherein the water output from the fuel cell system is passed through the heat exchanger and the coolant is passed through the heat exchanger before being passed through the radiator.

84. The method and/or heat dissipating system of clause 1 and/or 2, any other suitable clauses, or any combination of suitable clauses, wherein the method and/or heat dissipating system further comprises the heat exchanger, wherein the water ouput from the fuel cell system is passed through the heat exchanger before being passed through the radiator and the coolant is passed through the heat exchanger before being passed through the radiator.

85. The method and/or heat dissipating system of clause 1 and/or 2, any other suitable clauses, or any combination of suitable clauses, wherein the method and/or heat dissipating system further comprises the heat exchanger, wherein the water ouput from the fuel cell system directly passes through the radiator or after passing through the heat exchanger, and the coolant is passed through the heat exchanger before being passed through the radiator.

86. The method and/or heat dissipating system of clause 1 and/or 2, any other suitable clauses, or any combination of suitable clauses, wherein the method and/or heat dissipating system further comprises at least the pump and/or a fan.

87. The method and/or heat dissipating system of clause 86, any other suitable clauses, or any combination of suitable clauses, wherein the fan is a radiator fan.

88. The method and/or heat dissipating system of clause 86, any other suitable clauses, or any combination of suitable clauses, wherein the fan is an airflow fan.

89. The method and/or heat dissipating system of clause 86, any other suitable clauses, or any combination of suitable clauses, wherein the fan includes one or more fans.

90. The method and/or heat dissipating system of clause 89, any other suitable clauses, or any combination of suitable clauses, wherein the one or more fans direct air flow to the radiator from multiple directions, from right to left, and/or in the West-to-East direction.

91. The method and/or heat dissipating system of clause 86, any other suitable clauses, or any combination of suitable clauses, wherein the fan provides airflow and/or speeds the dissipation of heat from the heat dissipating system.

92. The method and/or heat dissipating system of clause 86, any other suitable clauses, or any combination of suitable clauses, The method and/or heat dissipating system of clause 86, any other suitable clauses, or any combination of suitable clauses, wherein the fan helps dissipate heat away from the radiator.

93. The method and/or heat dissipating system of clause 86, any other suitable clauses, or any combination of suitable clauses, wherein the fan is rated to supply a desired air speed, and/or an air speed at or about 50 mph.

94. The method and/or heat dissipating system of clause 86, any other suitable clauses, or any combination of suitable clauses, wherein the fan ensures that water and/or water droplets contact the radiator and/or radiator tubes.

95. The method and/or heat dissipating system of clause 86, any other suitable clauses, or any combination of suitable clauses, wherein the fan is located near, next to, or comprised by the radiator.

96. The method and/or heat dissipating system of clause 86, any other suitable clauses, or any combination of suitable clauses, wherein the fan directs air flow to the radiator from right to left, and/or in the West-to-East direction.

97. The method and/or heat dissipating system of clause 86, any other suitable clauses, or any combination of suitable clauses, wherein the fan develops a draft of air to initiate the evaporative cooling effect.

98. The method and/or heat dissipating system of clause 86, any other suitable clauses, or any combination of suitable clauses, wherein the fan is not placed in the path of air flow.

99. The method and/or heat dissipating system of clause 86, any other suitable clauses, or any combination of suitable clauses, wherein the fan is mount on the top and/or on the bottom of the radiator.

100. The method and/or heat dissipating system of clause 86, any other suitable clauses, or any combination of suitable clauses, wherein the fan is utilized independently and/or in conjunction with the radiator to cool the ambient air and the coolant.

101. The method and/or heat dissipating system of clause 1 and/or 2, any other suitable clauses, or any combination of suitable clauses, wherein the method and/or heat dissipating system further comprises the system controller or the thermal management controller for determining in real time when it is useful to create the evaporative cooling effect.

102. The method and/or heat dissipating system of clause 1 and/or 2, any other suitable clauses, or any combination of suitable clauses, wherein the method and/or heat dissipating system comprises any system using a fuel cell, fuel cell stack, and/or fuel cell system.

103. The method and/or heat dissipating system of clause 102, any other suitable clauses, or any combination of suitable clauses, wherein the fuel cell is a solid oxide fuel cell, a phosphoric acid fuel cell, a molten carbonate fuel cell, and/or a proton exchange membrane fuel cell.

104. The method and/or heat dissipating system of clause 102, any other suitable clauses, or any combination of suitable clauses, wherein the fuel cell size is smaller than a battery used in a battery-electric vehicle.

105. The method and/or heat dissipating system of clause 1 and/or 2, any other suitable clauses, or any combination of suitable clauses, wherein the method and/or heat dissipating system includes a vehicle, a powertrain system, a stationary system, a mobile or portable system, and any system for use on highway, off highway, on rail, and/or in mining.

106. The method and/or heat dissipating system of clause 1 and/or 2, any other suitable clauses, or any combination of suitable clauses, wherein the method and/or heat dissipating system manages the heat produced by the radiator and/or an exhaust system either individually or in combination with each other.

107. The method and/or heat dissipating system of clause 1 and/or 2, any other suitable clauses, or any combination of suitable clauses, wherein the method and/or heat dissipating system further comprises a thermal management system.

108. The method and/or heat dissipating system of clause 107, any other suitable clauses, or any combination of suitable clauses, wherein the thermal management system automatically, electronically, or manually measures, samples, and/or otherwise calculates heat disspated by the radiator and/or exhaust.

109. The method and/or heat dissipating system of clause 108, any other suitable clauses, or any combination of suitable clauses, wherein the exhaust contains gases, oxygen, nitrogen, hydrogen, water and/or water vapor.

110. The method and/or heat dissipating system of clause 108, any other suitable clauses, or any combination of suitable clauses, wherein the exhaust and/or water exits the fuel cell system.

111. The method and/or heat dissipating system of clause 110, any other suitable clauses, or any combination of suitable clauses, wherein the water is directed to the radiator.

112. The method and/or heat dissipating system of clause 107, any other suitable clauses, or any combination of suitable clauses, wherein the thermal management system comprises one or more airflow fans, external coolant flow passages, ports, nozzles, misters, and/or other components to provide sufficient heat dissipation.

113. The method and/or heat dissipating system of clause 107, any other suitable clauses, or any combination of suitable clauses, wherein the thermal management system predicts or estimates the temperature of the heat dissipating system with a fixed amount of coolant or a flow of coolant in the radiator, or with airflow over the radiator.

114. The method and/or heat dissipating system of clause 113, any other suitable clauses, or any combination of suitable clauses, wherein the flow of coolant refers to the flow of coolant and/or the flow of air.

115. The method and/or heat dissipating system of clause 107, any other suitable clauses, or any combination of suitable clauses, wherein the thermal management system comprises a water system, an air system, and/or a heat management system.

116. The method and/or heat dissipating system of clause 1 and/or 2, any other suitable clauses, or any combination of suitable clauses, wherein the method and/or heat dissipating system further comprises a wetted medium, a wetted membrane intermediary.

117. The method and/or heat dissipating system of clause 116, any other suitable clauses, or any combination of suitable clauses, wherein the wetted membrane intermediary is a wetted membrane.

118. The method and/or heat dissipating system of clause 116, any other suitable clauses, or any combination of suitable clauses, wherein the wetted medium and/or membrane intermediary is used in conjunction with the radiator fan that is next to the radiator.

119. The method and/or heat dissipating system of clause 116, any other suitable clauses, or any combination of suitable clauses, wherein the wetted medium and/or membrane intermediary is a medium, membrane intermediary, and/or membrane which has water from exhaust directed to it.

120. The method and/or heat dissipating system of clause 119, any other suitable clauses, or any combination of suitable clauses, wherein the water is absorbed through the medium or membrane due to gravity.

121. The method and/or heat dissipating system of clause 119, any other suitable clauses, or any combination of suitable clauses, wherein the medium or membrane is made of cellulose, hay, any absorbing material, any material that allows passage of air and water through it, any material that is water absorbent, and/or any material that allows air flow at a rate of about or above 450 $m^3$/min.

122. The method and/or heat dissipating system of clause 119, any other suitable clauses, or any combination of suitable clauses, wherein the exhaust and/or water is passed through a separator or a mechanical cyclonic separator.

123. The method and/or heat dissipating system of clause 122, any other suitable clauses, or any combination of suitable clauses, wherein the separator or the mechanical cyclonic separator separates the exhaust and the water before the water is collected in the sump, before the water is pumped by the pump to the radiator, and/or before the water is puped by the pump to the integrated sump and coolant reservoir.

124. The method and/or heat dissipating system of clause 116, any other suitable clauses, or any combination of suitable clauses, wherein the wetted medium and/or membrane intermediary is located between the radiator and the radiator fan.

125. The method and/or heat dissipating system of clause 116, any other suitable clauses, or any combination of suitable clauses, wherein the wetted medium and/or membrane intermediary is in contact with the radiator and/or the radiator fan.

126. The method and/or heat dissipating system of clause 1 and/or 2, any other suitable clauses, or any combination of suitable clauses, wherein the method and/or heat dissipating system further comprises a battery thermal management system.

127. The method and/or heat dissipating system of clause 126, any other suitable clauses, or any combination of suitable clauses, wherein the battery thermal management system offsets at least some of cooling load and condenses more water from the fuel cell exhaust prior to being used in the radiator.

128. The method and/or heat dissipating system of clause 1 and/or 2, any other suitable clauses, or any combination of suitable clauses, wherein the method and/or heat dissipating system further comprises a refrigerant loop.

129. The method and/or heat dissipating system of clause 128, any other suitable clauses, or any combination of suitable clauses, wherein the refrigerant loop condenses water from the exhaust stream.

130. The method and/or heat dissipating system of clause 129, any other suitable clauses, or any combination of suitable clauses, wherein the condensed water is directed to the wetted medium and/or membrane intermediary that is next to the radiator.

131. The method and/or heat dissipating system of clause 1 and/or 2, any other suitable clauses, or any combination of suitable clauses, wherein the method and/or heat dissipating system further comprises an electronic horizon system.

132. The method and/or heat dissipating system of clause 131, any other suitable clauses, or any combination of suitable clauses, wherein the electronic horizon system provides limited look ahead data and/or information, road grade, speed limit, road sign, or any other look ahead data.

133. The method and/or heat dissipating system of clause 132, any other suitable clauses, or any combination of suitable clauses, wherein the look ahead data and/or information is incorporated by the controller to determine when and how to effectuate evaporative cooling.

134. The method and/or heat dissipating system of clause 131, any other suitable clauses, or any combination of suitable clauses, wherein the electronic horizon system uses a global positioning system and other onboard stored preloaded map data to provide the controller a look ahead window of information.

135. The method and/or heat dissipating system of clause 134, any other suitable clauses, or any combination of suitable clauses, wherein the look ahead window of information includes upcoming road grade, upcoming speed limit, and any other look ahead information.

136. The method and/or heat dissipating system of clause 134, any other suitable clauses, or any combination of suitable clauses, wherein the look ahead window is less than, at, about, or more than 2 km.

137. The method and/or heat dissipating system of clause 134, any other suitable clauses, or any combination of suitable clauses, wherein the look ahead window is stored as a rolling buffer of road grade corresponding to the look ahead window.

138. The method and/or heat dissipating system of clause 1 and/or 2, any other suitable clauses, or any combination of suitable clauses, wherein the method and/or heat dissipating system further comprises a fuel cell circuit and/or a battery circuit.

139. The method and/or heat dissipating system of clause 138, any other suitable clauses, or any combination of suitable clauses, wherein the fuel cell circuit and/or the battery circuit utilizes the coolant.

140. The method and/or heat dissipating system of clause 138, any other suitable clauses, or any combination of suitable clauses, wherein the fuel cell circuit comprises one or more fuel cells, fuel cell stacks, and/or fuel cell systems, one or more valves, one or more sensors, one or more pumps, and the radiator.

141. The method and/or heat dissipating system of clause 140, any other suitable clauses, or any combination of suitable clauses, wherein the one or more valves start, stop, or change the flow of the coolant and/or any other fluid such that the flow of the coolant and/or any other fluid splits into at least two flow pather when entering or exiting the fuel cell system, the thermal management system, the radiator, or any other heating dissipation system component.

142. The method and/or heat dissipating system of clause 140, any other suitable clauses, or any combination of suitable clauses, wherein the one or more valves are bypass valves or any valve or mechanism able to start, stop, or change the direction of the flow path of a fluid and/or the coolant.

143. The method and/or heat dissipating system of clause 140, any other suitable clauses, or any combination of suitable clauses, wherein the one or more valves includes multiple or a plurality of valves.

144. The method and/or heat dissipating system of clause 140, any other suitable clauses, or any combination of suitable clauses, wherein at least one of the one or more valves is positioned before and/or after the coolant enter and/or exits the fuel cell system.

145. The method and/or heat dissipating system of clause 140, any other suitable clauses, or any combination of suitable clauses, wherein at least one of the one or more sensors is configured to be associated with the fuel cell system and/or is positioned before and/or after the inlet or outlet where the coolant and/or exits the fuel cell system.

146. The method and/or heat dissipating system of clause 140, any other suitable clauses, or any combination of suitable clauses, wherein the one or more sensors are positioned before and/or after the inlet or outlet of the radiator and/or any other component to measure, monitor, assess, ascertain, estimate and/or predict the temperature of the coolant at the radiator and/or any other component.

147. The method and/or heat dissipating system of clause 140, any other suitable clauses, or any combination of suitable clauses, wherein the one or more pumps drive the coolant throughout the fuel cell circuit and/or into the fuel cell system after the coolant exits the radiator.

148. The method and/or heat dissipating system of clause 140, any other suitable clauses, or any combination of suitable clauses, wherein the one or more pumps are any pump known in the art for providing momentum to drive the flow of the coolant or any other fluid in the heat dissipating system, the fuel cell circuit, and/or the battery circuit.

149. The method and/or heat dissipating system of clause 138, any other suitable clauses, or any combination of suitable clauses, wherein the battery circuit comprises one or more batteries, one or more pumps, one or more evaporators, one or more compressors, one or more condensers, and/or one or more valves.

150. The method and/or heat dissipating system of clause 149, any other suitable clauses, or any combination of suitable clauses, wherein the one or more batteries are any battery used to operate a vehicle, powertrain, or engine, and/or any battery known in the art for use with a fuel cell and/or fuel cell system.

151. The method and/or heat dissipating system of clause 149, any other suitable clauses, or any combination of suitable clauses, wherein the one or more pumps drive battery circuit coolant throughout the battery circuit.

152. The method and/or heat dissipating system of clause 149, any other suitable clauses, or any combination of suitable clauses, wherein the one or more pumps are any pump known for driving battery circuit coolant or any other fluid in a battery circuit.

153. The method and/or heat dissipating system of clause 149, any other suitable clauses, or any combination of suitable clauses, wherein the one or more valves expand high pressure liquid into low pressure liquid and/or vapor.

154. The method and/or heat dissipating system of clause 149, any other suitable clauses, or any combination of suitable clauses, wherein the one or more valves are expansion valves and/or any other valve that expands and/or lowers the pressure of a liquid.

155. The method and/or heat dissipating system of clause 149, any other suitable clauses, or any combination of suitable clauses, wherein the evaporator produces evaporated coolant.

156. The method and/or heat dissipating system of clause 155, any other suitable clauses, or any combination of suitable clauses, wherein the evaporated coolant flows from the evaporator of the battery circuit directly to the fuel cell circuit.

157. The method and/or heat dissipating system of clause 155, any other suitable clauses, or any combination of suitable clauses, wherein the evaporated coolant generates a power load that relies on the battery and/or affect the chiller top tank.

158. The method and/or heat dissipating system of clause 1 and/or 2, any other suitable clauses, or any combination of suitable clauses, wherein the method and/or heat dissipating system further comprises one or more valves, multiple valves, and/or a plurality of valves.

159. The method and/or heat dissipating system of clause 158, any other suitable clauses, or any combination of suitable clauses, wherein the valves are located at or near the fuel cell system and/or any other component in the heat dissipating system.

160. The method and/or heat dissipating system of clause 1 and/or 2, any other suitable clauses, or any combination of suitable clauses, wherein the method and/or heat dissipating system further comprises a stored water tank.

161. The method and/or heat dissipating system of clause 160, any other suitable clauses, or any combination of suitable clauses, wherein the stored water tank collects water.

162. The method and/or heat dissipating system of clause 161, any other suitable clauses, or any combination of suitable clauses, wherein the water collected by the stored water tank is excess water generated as a byproduct during operation of a fuel cell circuit and/or fuel cell system.

163. The method and/or heat dissipating system of clause 161, any other suitable clauses, or any combination of suitable clauses, wherein the water collected by the stored water tank assists with heating or cooling the coolant of the fuel cell circuit and/or fuel cell system, and/or heating or cooling the coolant of the battery circuit.

164. The method and/or heat dissipating system of clause 163, any other suitable clauses, or any combination of suitable clauses, wherein cooling the coolant of the fuel cell circuit and/or fuel cell system and/or cooling the coolant of the battery circuit occurs when ambient air and/or environmental air is warm, at or about 45° C. or higher, and/or at 46° C., 47° C., 48° C., 49° C. or higher.

165. The method and/or heat dissipating system of clause 164, any other suitable clauses, or any combination of suitable clauses, wherein ambient air is in the range of at or about 8° C. to about 45° C., and/or any specific or range of temperatures comprised therein.

166. The method and/or heat dissipating system of clause 163, any other suitable clauses, or any combination of suitable clauses, wherein heating the coolant of the fuel cell circuit and/or fuel cell system and/or heating the coolant of the battery circuit occurs when ambient air and/or environmental air is cool to cold, and/or at or about 8° C. or lower.

167. The method and/or heat dissipating system of clause 160, any other suitable clauses, or any combination of suitable clauses, wherein the stored water tank is any container, tank, or vessel known to store a fluid or the coolant, and/or any type of water tank known in the art.

168. The method and/or heat dissipating system of clause 160, any other suitable clauses, or any combination of suitable clauses, wherein the stored water tank is not insulated.

169. The method and/or heat dissipating system of clause 160, any other suitable clauses, or any combination of suitable clauses, wherein the stored water tank is insulated.

170. The method and/or heat dissipating system of clause 169, any other suitable clauses, or any combination of suitable clauses, wherein the insulated stored water tank prevents and/or reduces the amount of fluctuation in the temperature of the water held within the stored water tank.

171. The method and/or heat dissipating system of clause 169, any other suitable clauses, or any combination of suitable clauses, wherein the insulated stored water tank is insulated by any material known in the art to insulate a stored water tank.

172. The method and/or heat dissipating system of clause 1 and/or 2, any other suitable clauses, or any combination of suitable clauses, wherein the method and/or heat dissipating system further comprises one or more heat exchangers.

173. The method and/or heat dissipating system of clause 172, any other suitable clauses, or any combination of suitable clauses, wherein the heat exchanger heats or cools the coolant of the fuel cell system and/or fuel cell circuit.

174. The method and/or heat dissipating system of clause 172, any other suitable clauses, or any combination of suitable clauses, wherein the heat exchanger is coupled to or near a sensor.

175. The method and/or heat dissipating system of clause 174, any other suitable clauses, or any combination of suitable clauses, wherein the sensor helps detect or determine when the heat dissipating system should be used.

176. The method and/or heat dissipating system of clause 174, any other suitable clauses, or any combination of suitable clauses, wherein the sensor includes one or more sensors.

177. The method and/or heat dissipating system of clause 176, any other suitable clauses, or any combination of suitable clauses, wherein the one or more sensors detect the temperature of the water in the stored water tank and/or the temperature of the ambient air.

178. The method and/or heat dissipating system of clause 176, any other suitable clauses, or any combination of suitable clauses, wherein the one or more sensors communicate the temperature of the water in the stored water tank and/or the temperature of the ambient air to the controller.

179. The method and/or heat dissipating system of clause 178, any other suitable clauses, or any combination of suitable clauses, wherein the controller determines a temperature difference or lack hereof between the temperature of the water in the stored water tank and the ambient air.

180. The method and/or heat dissipating system of clause 176, any other suitable clauses, or any combination of suitable clauses, wherein when the temperature of the water in the stored water tank is less than the temperature of the ambient air, the controller instructs the heat dissipating system to heat the coolant of the fuel cell system and/or the fuel cell circuit.

181. The method and/or heat dissipating system of clause 180, any other suitable clauses, or any combination of suitable clauses, wherein the coolant is heated to operational temperatures.

182. The method and/or heat dissipating system of clause 176, any other suitable clauses, or any combination of suitable clauses, wherein when the temperature of the water in the storage tank is more than the temperature of the ambient air, the controller instructs the heat dissipating system to cool the coolant of the fuel cell system and/or the fuel cell circuit.

183. The method and/or heat dissipating system of clause 172, any other suitable clauses, or any combination of suitable clauses, wherein the heat exchanger is positioned between a battery and the fuel cell system.

184. The method and/or heat dissipating system of clause 172, any other suitable clauses, or any combination of suitable clauses, wherein the heat exchanger directly warms the coolant of and/or exiting the fuel cell system and/or the fuel cell circuit and/or warms the water stored in the stored water tank.

185. The method and/or heat dissipating system of clause 172, any other suitable clauses, or any combination of suitable clauses, wherein the heat exchanger is positioned between, adjacent to, and/or connects to a chiller top tank of a battery circuit and the stored water tank.

186. The method and/or heat dissipating system of clause 185, any other suitable clauses, or any combination of suitable clauses, wherein the chiller top tank is any container, tank, or vessel known to store a fluid or coolant.

187. The method and/or heat dissipating system of clause 185, any other suitable clauses, or any combination of suitable clauses, wherein the chiller top tank stores a battery circuit coolant and/or water.

188. The method and/or heat dissipating system of clause 187, any other suitable clauses, or any combination of suitable clauses, wherein the battery circuit coolant is water.

189. The method and/or heat dissipating system of clause 187, any other suitable clauses, or any combination of suitable clauses, wherein the battery circuit coolant generally has a cooler temperature than the water in the stored water tank, and/or a cool temperature of at or about 25° C.

190. The method and/or heat dissipating system of clause 187, any other suitable clauses, or any combination of suitable clauses, wherein the battery circuit coolant is a battery coolant.

191. The method and/or heat dissipating system of clause 190, any other suitable clauses, or any combination of suitable clauses, wherein the battery coolant is the coolant, water, any coolant known to be used to operate a battery circuit, and/or any coolant that is known to be used to operate any component of a vehicle, such as an engine, powertrain, fuel cell, and/or fuel cell system.

192. The method and/or heat dissipating system of clause 185, any other suitable clauses, or any combination of suitable clauses, wherein the chiller top tank is incorporated into the heat dissipating system prefilled with the battery circuit coolant and/or water.

193. The method and/or heat dissipating system of clause 172, any other suitable clauses, or any combination of suitable clauses, wherein the heat exchanger is a heat tube.

194. The method and/or heat dissipating system of clause 172, any other suitable clauses, or any combination of suitable clauses, wherein the heat exchanger and/or the chiller top tank are configured to remain cool and/or at or about 25° C. when the ambient temperature is low.

195. The method and/or heat dissipating system of clause 172, any other suitable clauses, or any combination of suitable clauses, wherein the heat exchanger enables the flow of the battery circuit coolant and/or water having a temperature at or about 25° C. from the chiller top tank to the stored water tank holding and/or storing warmer water and/or water above above 25° C., or water about 45° C. to 49° C. or higher.

196. The method and/or heat dissipating system of clause 1 and/or 2, any other suitable clauses, or any combination of suitable clauses, wherein the method and/or heat dissipating system further comprises an evaporative pad.

197. The method and/or heat dissipating system of clause 196, any other suitable clauses, or any combination of suitable clauses, wherein the evaporative pad is comprised by the fuel cell circuit.

198. The method and/or heat dissipating system of clause 196, any other suitable clauses, or any combination of suitable clauses, wherein the application of the water to the evaporative pad is achieved with dripping, flowing, drenching, spraying, dipping, and/or any other mechanism.

199. The method and/or heat dissipating system of clause 196, any other suitable clauses, or any combination of suitable clauses, wherein the evaporative pad is configured to receive cooled water from the stored water tank and/or is configured to receive the ambient air.

200. The method and/or heat dissipating system of clause 196, any other suitable clauses, or any combination of suitable clauses, wherein the evaporative pad is configured to receive cooled water from the stored water tank to cool the ambient air by evaporative cooling before the ambient air dissipates, relocates, and/or is received by the radiator.

201. The method and/or heat dissipating system of clause 196, any other suitable clauses, or any combination of suitable clauses, wherein the evaporative pad comprises cellulose, any permeable and/or water absorbing material, and/or one or more evaporative materials known to assist with cooling and/or warming ambient air by evaporation or other means.

202. The method and/or heat dissipating system of clause 196, any other suitable clauses, or any combination of suitable clauses, wherein the evaporative pad comprises two pads, three pads, four pads, five pads, and/or more than one pad.

203. The method and/or heat dissipating system of clause 196, any other suitable clauses, or any combination of suitable clauses, wherein the evaporative pad comprises multiple evaporative pads that are not configured to be coupled, connected, and/or attached together to produce and/or present as a single pad.

204. The method and/or heat dissipating system of clause 196, any other suitable clauses, or any combination of suitable clauses, wherein the evaporative pad comprises multiple evaporative pads that are configured to be coupled, connected, and/or attached to each other to produce and/or present as a single pad.

205. The method and/or heat dissipating system of clause 196, any other suitable clauses, or any combination of suitable clauses, wherein the evaporative pad warms the ambient air, and/or warms the ambient air by receiving warmed water from the stored water tank and/or warmed coolant from the battery circuit, the battery, and/or other components of the heat dissipating system.

206. The method and/or heat dissipating system of clause 1 and/or 2, any other suitable clauses, or any combination of suitable clauses, wherein the method and/or heat dissipating system further comprises applying the battery circuit coolant and/or water received by the stored water tank via the heat tube and the chiller top tank to an evaporative cooler.

207. The method and/or heat dissipating system of clause 1 and/or 2, any other suitable clauses, or any combination of suitable clauses, wherein the method and/or heat dissipating system further comprises utilizing both the fuel cell circuit and the battery circuit.

208. The method and/or heat dissipating system of clause 207, any other suitable clauses, or any combination of suitable clauses, wherein utilizing both the fuel cell circuit and the battery circuit generates the power necessary to cool the fuel cell coolant to operational temperatures, and/or to about 60° C. to about 65° C.

209. The method and/or heat dissipating system of clause 208, any other suitable clauses, or any combination of suitable clauses, wherein generating the power necessary to cool the fuel cell coolant to operational temperatures, and/or to about 60° C. to about 65° C. occurs when the ambient temperature ranges from about 45° C. to about 47° C., including any specific temperature or range of temperatures comprised therein.

210. The method and/or heat dissipating system of clause 207, any other suitable clauses, or any combination of suitable clauses, wherein utilizing both the fuel cell circuit and the battery circuit generates the power necessary to warm the battery coolant to operational temperatures, and/or to about 60° C. to about 65° C.

211. The method and/or heat dissipating system of clause 210, any other suitable clauses, or any combination of suitable clauses, wherein generating the power necessary to warm the battery coolant to operational temperatures, and/or to about 60° C. to about 65° C. occurs when the ambient temperature is at or below about 8° C. to about 45° C., including any specific temperature or range of temperatures comprised therein.

212. The method and/or heat dissipating system of clause 210, any other suitable clauses, or any combination of suitable clauses, wherein generating the power necessary to warm the battery coolant to operational temperatures, and/or to about 60° C. to about 65° C. does not use evaporative cooling.

213. The method and/or heat dissipating system of clause 210, any other suitable clauses, or any combination of suitable clauses, wherein generating the power necessary to warm the battery coolant to operational temperatures, and/or to about 60° C. to about 65° C. includes recovering waste heat from the radiator and fuel cell system.

214. The method and/or heat dissipating system of clause 210, any other suitable clauses, or any combination of suitable clauses, wherein generating the power necessary to warm the battery coolant to operational temperatures, and/or to about 60° C. to about 65° C. heats the battery and/or the fuel cell system.

215. The method and/or heat dissipating system of clause 210, any other suitable clauses, or any combination of suitable clauses, wherein generating the power necessary to warm the battery coolant to operational temperatures, and/or to about 60° C. to about 65° C. further comprises the heat exchanger.

216. The method and/or heat dissipating system of clause 215, any other suitable clauses, or any combination of suitable clauses, wherein the heat exchanger utilizes the heat from the fuel cell coolant exiting the fuel cell system.

217. The method and/or heat dissipating system of clause 216, any other suitable clauses, or any combination of suitable clauses, wherein the utilized heat from the fuel cell coolant heats the battery.

218. The method and/or heat dissipating system of clause 217, any other suitable clauses, or any combination of suitable clauses, wherein the heated battery warms the battery coolant.

219. The method and/or heat dissipating system of clause 218, any other suitable clauses, or any combination of suitable clauses, wherein the warmed battery coolant is pumped directly back into the heat exchanger and/or the fuel cell stack, system, or circuit.

220. The method and/or heat dissipating system of clause 218, any other suitable clauses, or any combination of suitable clauses, wherein the warmed battery coolant directly heats the fuel cell coolant.

221. The method and/or heat dissipating system of clause 1 and/or 2, any other suitable clauses, or any combination of suitable clauses, wherein the method and/or heat dissipating system further comprises utilizing the fuel cell circuit and/or utilizing the fuel cell circuit independent of the battery circuit.

222. The method and/or heat dissipating system of clause 221, any other suitable clauses, or any combination of suitable clauses, wherein utilizing the fuel cell circuit independent of the battery circuit generates the power necessary to cool the fuel cell coolant to operational temperatures, and/or to about 60° C. to about 65° C.

223. The method and/or heat dissipating system of clause 221, any other suitable clauses, or any combination of suitable clauses, wherein utilizing the fuel cell circuit independent of the battery circuit occurs when the ambient temperature ranges from about 8° C. to about 45° C., including any specific temperature or range of temperatures comprised therein.

224. The method and/or heat dissipating system of clause 1 and/or 2, any other suitable clauses, or any combination of suitable clauses, wherein the method and/or heat dissipating system further comprises cooling excess water with the heat exchanger and the battery circuit coolant and/or water and/or distributing the cooled water over the radiator.

225. The method and/or heat dissipating system of clause 1 and/or 2, any other suitable clauses, or any combination of suitable clauses, wherein the coolant exits the fuel cell system at a higher temperature and reaches the radiator after passing through the thermal management system.

226. The method and/or heat dissipating system of clause 1 and/or 2, any other suitable clauses, or any combination of suitable clauses, wherein the coolant is returned to the fuel cell system after being passed through the radiator.

227. The method and/or heat dissipating system of clause 1 and/or 2, any other suitable clauses, or any combination of suitable clauses, wherein the coolant is passed through the radiator after passing through the heat exchanger and before being directed back to the fuel cell system.

228. The method and/or heat dissipating system of clause 1 and/or 2, any other suitable clauses, or any combination of suitable clauses, wherein the coolant passes through the thermal management system and is collected in the coolant reservoir.

229. The method and/or heat dissipating system of clause 1 and/or 2, any other suitable clauses, or any combination of suitable clauses, wherein the coolant is a fuel cell coolant, a battery coolant, water, and/or any coolant known to be used to operate any component of a vehicle, such as an engine, powertrain, battery, or a fuel cell, fuel cell stack, and/or fuel cell system.

230. The method and/or heat dissipating system of clause 229, any other suitable clauses, or any combination of suitable clauses, wherein the temperature of the fuel cell coolant is at or about 60° C. to about 65° C., and/or at or about 65° C.

231. The method and/or heat dissipating system of clause 1 and/or 2, any other suitable clauses, or any combination of suitable clauses, wherein the coolant comprises the coolant from the fuel cell circuit and the coolant from the battery circuit.

232. The method and/or heat dissipating system of clause 1 and/or 2, any other suitable clauses, or any combination of suitable clauses, wherein the fuel cell system manages the heat produced by the fuel cell system using the radiator.

233. The method and/or heat dissipating system of clause 1 and/or 2, any other suitable clauses, or any combination of suitable clauses, wherein the fuel cell system has inputs of water, air, and/or coolant.

234. The method and/or heat dissipating system of clause 1 and/or 2, any other suitable clauses, or any combination of suitable clauses, wherein the radiator is placed below the fuel cell system and/or in a lower plane than the fuel cell system, or is located above and/or in a higher plane than the fuel cell system.

235. The method and/or heat dissipating system of clause 1 and/or 2, any other suitable clauses, or any combination of suitable clauses, wherein the radiator is at a higher temperature and/or at temperatures ranging from about 60° C. to about 65° C.

236. The method and/or heat dissipating system of clause 1 and/or 2, any other suitable clauses, or any combination of suitable clauses, wherein the radiator is reduced in size, reduced in size by about 40%, between about 10% and about 40%, between 10% and about 30%, or between about 20% and about 30%.

237. The method and/or heat dissipating system of clause 1 and/or 2, any other suitable clauses, or any combination of suitable clauses, wherein the water output from the fuel cell system is passed through the wetted medium and/or membrane intermediary.

238. The method and/or heat dissipating system of clause 1 and/or 2, any other suitable clauses, or any combination of suitable clauses, wherein the water output from the fuel cell system is channeled through a nozzle, a mister, or a gap next to the radiator.

239. The method and/or heat dissipating system of clause 238, any other suitable clauses, or any combination of suitable clauses, wherein the nozzle or the mister produces one or more water particles.

240. The method and/or heat dissipating system of clause 239, any other suitable clauses, or any combination of suitable clauses, wherein the one or more water particles comprise a diameter of about 1 mm in diameter to about 2 mm in diameter, and any diameter comprised therein.

241. The method and/or heat dissipating system of clause 240, any other suitable clauses, or any combination of suitable clauses, wherein the size of the one or more water particles causes more effective and/or improved heat removal.

242. The method and/or heat dissipating system of clause 238, any other suitable clauses, or any combination of suitable clauses, wherein the nozzle is a convergent or a divergent nozzle.

243. The method and/or heat dissipating system of clause 242, any other suitable clauses, or any combination of suitable clauses, wherein the convergent or the divergent nozzle allows for exhaust and water from the fuel cell system to pass through.

244. The method and/or heat dissipating system of clause 243, any other suitable clauses, or any combination of suitable clauses, wherein the temperature drops across the convergent or the divergent nozzle.

245. The method and/or heat dissipating system of clause 243, any other suitable clauses, or any combination of suitable clauses, wherein water vapor saturation pressure drops, and/or drops from about 90 kPa at about 70° C. to about 1.7 kPa at about 15° C.

246. The method and/or heat dissipating system of clause 243, any other suitable clauses, or any combination of suitable clauses, wherein the water from the fuel cell system condenses when it comes out of the convergent or the divergent nozzle.

247. The method and/or heat dissipating system of clause 238, any other suitable clauses, or any combination of suitable clauses, wherein the the nozzle or the mister is used with the wetted medium and/or membrane intermediary.

248. The method and/or heat dissipating system of clause 238, any other suitable clauses, or any combination of suitable clauses, wherein the gap is on either side of the wetted medium and/or membrane intermediary and between one or more surfaces of the wetted medium or membrane intermediary and one or both of the radiator and/or the radiator fan.

249. The method and/or heat dissipating system of clause 238, any other suitable clauses, or any combination of suitable clauses, wherein the nozzle or the mister is used to channel the water through the gap or passage between the medium and/or membrane intermediary and the radiator, and/or used to direct water onto the medium or membrane intermediary via the gap.

250. The method and/or heat dissipating system of clause 238, any other suitable clauses, or any combination of suitable clauses, wherein the nozzle or mister is used along with or without the wetted medium and/or membrane intermediary.

251. The method and/or heat dissipating system of clause 1 and/or 2, any other suitable clauses, or any combination of suitable clauses, wherein the water output from the fuel cell system is collected in the sump.

252. The method and/or heat dissipating system of clause 1 and/or 2, any other suitable clauses, or any combination of suitable clauses, wherein the water output from the fuel cell system is passed through the pump before being passed through the radiator.

253. The method and/or heat dissipating system of clause 1 and/or 2, any other suitable clauses, or any combination of suitable clauses, wherein the water output from the fuel cell system is at a maximum temperature of about 30° C. to about 35° C.

254. The method and/or heat dissipating system of clause 1 and/or 2, any other suitable clauses, or any combination of suitable clauses, wherein the water output from the fuel cell system is dripped in contact with the radiator.
255. The method and/or heat dissipating system of clause 1 and/or 2, any other suitable clauses, or any combination of suitable clauses, wherein the water output causes the heat dissipating system to avoid carrying water weight.
256. The method and/or heat dissipating system of clause 1 and/or 2, any other suitable clauses, or any combination of suitable clauses, wherein the water output is sprayed on the hottest parts of the radiator.
257. The method and/or heat dissipating system of clause 1 and/or 2, any other suitable clauses, or any combination of suitable clauses, wherein the water output is used along the wetted medium and/or membrane intermediary and/or passed through the nozzle or the mister after passing through the pump attached to the sump.
258. The method and/or heat dissipating system of clause 1 and/or 2, any other suitable clauses, or any combination of suitable clauses, wherein the water output is passed through the heat exchanger after passing through the pump.
259. The method and/or heat dissipating system of clause 1 and/or 2, any other suitable clauses, or any combination of suitable clauses, wherein the water output and the coolant are passed through the heat exchanger before being passed to the radiator, the water output is passed to both the heat exchanger and the radiator, the water output and the coolant are passed through the heat exchanger before being passed to the radiator, and/or the water is simultaneously passed directly to the radiator without being passed through the heat exchanger.
260. The method and/or heat dissipating system of clause 1 and/or 2, any other suitable clauses, or any combination of suitable clauses, wherein the water output is passed through a chiller before being passed to the radiator.
261. The method and/or heat dissipating system of clause 1 and/or 2, any other suitable clauses, or any combination of suitable clauses, wherein the water output is collected in the water reservoir of the integrated sump and coolant reservoir.
262. The method and/or heat dissipating system of clause 261, any other suitable clauses, or any combination of suitable clauses, wherein the water collected in the water reservoir cools the radiator, targets the heated component of the radiator, and/or creates the evaporative cooling effect on the radiator.
263. The method and/or heat dissipating system of clause 261, any other suitable clauses, or any combination of suitable clauses, wherein the water collected in the water reservoir is dumped by the electrically actuated valve or the mechanical actuated valve.
264. The method and/or heat dissipating system of clause 1 and/or 2, any other suitable clauses, or any combination of suitable clauses, wherein the water output and the coolant are collected in a collection reservoir.
265. The method and/or heat dissipating system of clause 264, any other suitable clauses, or any combination of suitable clauses, wherein the collection reservoir allows water to be collected in a first, bottom portion of the collection reservoir or a second, top portion of the collection reservoir.
266. The method and/or heat dissipating system of clause 264, any other suitable clauses, or any combination of suitable clauses, wherein the collection reservoir allows the coolant to be collected in the second, top portion of the collection reservoir or the first, top portion of the collection reservoir.
267. The method and/or heat dissipating system of clause 1 and/or 2, any other suitable clauses, or any combination of suitable clauses, wherein the water output is drained and not used to create the evaporative cooling effect on the radiator.
268. The method and/or heat dissipating system of clause 1 and/or 2, any other suitable clauses, or any combination of suitable clauses, wherein the evaporative cooling effect is a direct evaporative cooling effect, a passive direct evaporative cooling effect, or an indirect evaporative cooling effect.
269. The method and/or heat dissipating system of clause 268, any other suitable clauses, or any combination of suitable clauses, wherein the direct evaporative cooling effect comprises the wetted medium and/or membrane intermediary, the mister, or the nozzle.
270. The method and/or heat dissipating system of clause 268, any other suitable clauses, or any combination of suitable clauses, wherein the direct evaporative cooling effect lowers the temperature and increases the humidity of air by using latent heat of evaporation, and/or changes liquid water to water vapor.
271. The method and/or heat dissipating system of clause 268, any other suitable clauses, or any combination of suitable clauses, wherein the direct evaporative cooling effect does not change the energy in the air.
272. The method and/or heat dissipating system of clause 268, any other suitable clauses, or any combination of suitable clauses, wherein the direct evaporative cooling effect changes warm dry air to cool moist air.
273. The method and/or heat dissipating system of clause 268, any other suitable clauses, or any combination of suitable clauses, wherein the direct evaporative cooling effect uses the heat of the outside air to evaporate water.
274. The method and/or heat dissipating system of clause 268, any other suitable clauses, or any combination of suitable clauses, wherein the direct evaporative cooling effect causes the humidity to about 70% to about 90%.
275. The method and/or heat dissipating system of clause 268, any other suitable clauses, or any combination of suitable clauses, wherein the direct evaporative cooling effect continually and externally releases the moist air.
276. The method and/or heat dissipating system of clause 1 and/or 2, any other suitable clauses, or any combination of suitable clauses, wherein the evaporative cooling effect is extended to other radiators and systems on the heat dissipating system, and/or is used for power electronics cooling, battery cooling, traction system cooling, fuel cell ambient air cooling, cabin cooling, and any other cooling functionality known in the art.
277. The method and/or heat dissipating system of clause 1 and/or 2, any other suitable clauses, or any combination of suitable clauses, wherein the evaporative cooling effect is optimized with additional features and/or enhancements implemented in the heat dissipating system and/or fuel cell system.
278. The method and/or heat dissipating system of clause 1 and/or 2, any other suitable clauses, or any combination of suitable clauses, wherein the evaporative cooling effect is created through the wetted medium and/or membrane intermediary, and or the mister.
279. The method and/or heat dissipating system of clause 206, any other suitable clauses, or any combination of suitable clauses, wherein the evaporative cooler is within or comprised by the fuel cell circuit.
280. The method and/or heat dissipating system of clause 206, any other suitable clauses, or any combination of suitable clauses, wherein the evaporative cooler is a sealed, closed, and/or airtight tank or vessel that comprises the evaporative pad.

281. The method and/or heat dissipating system of clause 20, any other suitable clauses, or any combination of suitable clauses, wherein the controller determines in real time when to create an evaporative cooling effect.

282. The method and/or heat dissipating system of clause 20, any other suitable clauses, or any combination of suitable clauses, wherein the heat dissipating system and/or the controller implements and/or utilizes various control strategies, methods, and/or processes.

283. The method and/or heat dissipating system of clause 282, any other suitable clauses, or any combination of suitable clauses, wherein the various control strategies, methods, and/or processes include a control strategy for a fuel cell system, stack, or fuel cell, a control strategy for evaporative cooling of a fuel cell system, stack, or fuel cell, a control strategy for utilizing waste heat recovery and the insulated stored water tank to cool a fuel cell system, stack, or fuel cell, and/or a control strategy for utilizing waste heat recovery to cool the battery.

284. The method and/or heat dissipating system of clause 282, any other suitable clauses, or any combination of suitable clauses, wherein the various control strategies, methods, and/or processes thermally manage the heat in the fuel cell system and/or battery.

285. The method and/or heat dissipating system of clause 185, any other suitable clauses, or any combination of suitable clauses, wherein the chiller comprises a battery chiller to cool the battery and/or a fuel cell chiller to cool the fuel cell.

286. The method and/or heat dissipating system of clause 285, any other suitable clauses, or any combination of suitable clauses, wherein a first cooling combination includes 850 kW of load from the radiator only to cool the fuel cell and a 50 kW battery chiller to cool the battery.

287. The method and/or heat dissipating system of clause 286, any other suitable clauses, or any combination of suitable clauses, wherein the first cooling combination generates a parasitic load of about 120 kW.

288. The method and/or heat dissipating system of clause 285, any other suitable clauses, or any combination of suitable clauses, wherein a second cooling combination includes 550 kW of load from the radiator and 300 kW of load from the fuel cell chiller to cool the fuel cell, and/or the 50 kW battery chiller to cool the battery.

289. The method and/or heat dissipating system of clause 288, any other suitable clauses, or any combination of suitable clauses, wherein the second cooling combination generates a parasitic load of about 187 kW.

290. The method and/or heat dissipating system of clause 285, any other suitable clauses, or any combination of suitable clauses, wherein a third cooling combination includes 550 kW of load from the radiator, 25 kW of load from the fuel cell chiller, and 275 kW of load from the evaporative cooler to cool the fuel cell, and/or the 50 kW battery chiller.

291. The method and/or heat dissipating system of clause 290, any other suitable clauses, or any combination of suitable clauses, wherein the evaporative cooler tank has about 600 L of water cooling capacity to cool the fuel cell.

292. The method and/or heat dissipating system of clause 290, any other suitable clauses, or any combination of suitable clauses, wherein the third cooling combination generates a parasitic load of about 95 kW.

293. The method and/or heat dissipating system of clause 285, any other suitable clauses, or any combination of suitable clauses, wherein a fourth cooling combination includes 550 kW of load from the radiator and 300 kW of load from the evaporative cooler to cool the fuel cell, and/or the 50 kW battery chiller to cool the battery.

294. The method and/or heat dissipating system of clause 293, any other suitable clauses, or any combination of suitable clauses, wherein the evaporative cooler tank has about 860 L of water cooling capacity to cool the fuel cell.

295. The method and/or heat dissipating system of clause 293, any other suitable clauses, or any combination of suitable clauses, wherein the fourth cooling combination generates a parasitic load of about 102 kW.

296. The method and/or heat dissipating system of clause 260, any other suitable clauses, or any combination of suitable clauses, wherein the chiller top tank comprises the battery chiller to cool the battery and/or the fuel cell chiller to cool the fuel cell.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of dissipating heat in a system comprising:
   passing a coolant used in a fuel cell system through a radiator,
   dissipating heat produced by the fuel cell system by using water output from the fuel cell system,
   evaporating the water output from the fuel cell system,
   operating at least one fan arranged adjacent the radiator to direct air flow toward the radiator,
   cooling the radiator by the evaporated water output from the fuel cell system to produce an evaporative cooling effect, and
   using a controller that comprises a look ahead power estimator, a fuel cell liquid water estimator, and an evaporative cooling benefit to determine when to create the evaporative cooling effect.

2. The method of dissipating heat in a system of claim 1, wherein the evaporative cooling effect is a direct evaporative cooling effect, a passive direct evaporative cooling effect, or an indirect evaporative cooling effect.

3. The method of dissipating heat in a system of claim 1, wherein the evaporative cooling effect is a direct evaporative cooling effect, and wherein the direct evaporative cooling effect comprises a wetted membrane, a mister, or a nozzle.

4. The method of dissipating heat in a system of claim 1, further comprising collecting the water output produced by the fuel cell system in a sump or a stored water tank before using the water output to create the evaporative cooling effect on the radiator.

5. The method of dissipating heat in a system of claim 4, further comprising passing the water output collected in the sump or the stored water tank through a pump or an evaporative cooling pad before using the water output to create the evaporative cooling effect on the radiator.

6. The method of dissipating heat in a system of claim 4, further comprising passing the water output collected in the sump or the stored water tank through a heat exchanger and passing the coolant through the heat exchanger before the coolant is passed through the radiator.

7. The method of dissipating heat in a system of claim 1, wherein the method further comprises using the controller to determine in real time when to create the evaporative cooling effect.

8. The method of dissipating heat in a system of claim 1, wherein the controller communicates with sensors providing information including coolant temperature, radiator fan speed, fuel cell power, fuel cell coolant temperature target, sump water level, sump pump speed, and vehicle speed.

9. The method of dissipating heat in a system of claim 1, wherein the fuel cell liquid water estimator receives input or communication from the look ahead power estimator.

10. A heat dissipating system comprising:
    a fuel cell system;
    a coolant;
    water output from the fuel cell system;
    a radiator; and
    a wetted membrane located adjacent the radiator;

wherein the water output from the fuel cell system is used to dissipate heat by evaporative cooling of the radiator through which the coolant is passed.

11. The heat dissipating system of claim 10, wherein the water output from the fuel cell system is passed through a heat exchanger and the wetted membrane.

12. The heat dissipating system of claim 11, wherein the water output from the fuel cell system is channeled through a nozzle, a mister, or a gap next to the radiator.

13. The heat dissipating system of claim 10, wherein the radiator is arranged in a first plane and the fuel cell system is arranged in a second plane, and the first plane is lower than the second plane so that gravity directs the water output to the radiator.

14. The heat dissipating system of claim 10, wherein the water output is collected in a sump and passed through a pump before being passed through the radiator.

15. The heat dissipating system of claim 10, further comprising a heat exchanger, wherein the water output from the fuel cell system is passed through the heat exchanger and the coolant is passed through the heat exchanger before being passed through the radiator.

16. The heat dissipating system of claim 10, further comprising at least one radiator fan arranged adjacent the wetted membrane to locate the wetted membrane between the at least one radiator fan and the radiator.

17. The heat dissipating system of claim 10, further comprising a heat exchanger, wherein the water output from the fuel cell system is passed through the heat exchanger before being passed through the radiator and the coolant is passed through the heat exchanger before being passed through the radiator.

18. The heat dissipating system of claim 10, further comprising a heat exchanger, wherein the water output from the fuel cell system directly passes through the radiator, and the coolant is passed through the heat exchanger before being passed through the radiator.

19. The heat dissipating system of claim 10, further comprising a system controller or a thermal management controller for determining in real time when to create an evaporative cooling effect using information including coolant temperature, radiator fan speed, fuel cell power, fuel cell coolant temperature target, sump water level, sump pump speed, and vehicle speed.

* * * * *